United States Patent
Takeuchi

(10) Patent No.: US 8,089,231 B2
(45) Date of Patent: Jan. 3, 2012

(54) ELECTRIC MOTOR, METHOD FOR CORRECTING SENSOR OUTPUT FOR THE SAME, AND CONTROL CIRCUIT

(75) Inventor: Kesatoshi Takeuchi, Shioziri (JP)

(73) Assignee: Seiko Epson Corporation (JP)

(*) Notice: Subject to any disclaimer, the term of this patent is extended or adjusted under 35 U.S.C. 154(b) by 461 days.

(21) Appl. No.: 12/227,726

(22) PCT Filed: Jun. 20, 2007

(86) PCT No.: PCT/JP2007/062831
§ 371 (c)(1),
(2), (4) Date: Nov. 25, 2008

(87) PCT Pub. No.: WO2008/007544
PCT Pub. Date: Jan. 17, 2008

(65) Prior Publication Data
US 2009/0195202 A1    Aug. 6, 2009

(30) Foreign Application Priority Data

| Jul. 10, 2006 | (JP) | 2006-189225 |
| Jul. 10, 2006 | (JP) | 2006-189233 |
| Jul. 13, 2006 | (JP) | 2006-192506 |
| May 14, 2007 | (JP) | 2007-128228 |
| May 28, 2007 | (JP) | 2007-140791 |

(51) Int. Cl.
*H02P 21/00* (2006.01)

(52) U.S. Cl. .......... 318/400.02; 318/400.37; 318/400.11

(58) Field of Classification Search ............. 318/400.02, 318/400.37, 400.11, 400.09, 400.34, 376, 318/432; 361/89
See application file for complete search history.

(56) References Cited

U.S. PATENT DOCUMENTS

| 7,095,155 B2 | 8/2006 | Takeuchi | |
| 7,211,974 B2 | 5/2007 | Takeuchi | |
| 2002/0101215 A1 | 8/2002 | Lydegraf et al. | |
| 2003/0102832 A1* | 6/2003 | Iwanaga et al. | 318/268 |
| 2006/0244409 A1* | 11/2006 | Takeuchi et al. | 318/811 |
| 2007/0188121 A1 | 8/2007 | Takeuchi | |
| 2009/0295318 A1 | 12/2009 | Takeuchi | |

FOREIGN PATENT DOCUMENTS

| EP | 0 812 753 A | 12/1997 |
| JP | 54-129417 | 10/1979 |
| JP | 61-001294 A | 1/1986 |
| JP | 04-101694 A | 4/1992 |
| JP | 06-311759 A | 11/1994 |
| JP | 09-093986 A | 4/1997 |
| JP | 09-149675 A | 6/1997 |

(Continued)

*Primary Examiner* — Karen Masih
(74) *Attorney, Agent, or Firm* — Harness, Dickey & Pierce, P.L.C.

(57) ABSTRACT

The electric motor includes a coil array having a plurality of magnetic coils; a magnet array having a plurality of permanent magnets; a magnetic sensor outputting an output signal that changes in analog fashion depending on relative location of the magnet array and the coil array; a drive control circuit; and an output waveform correcting unit. The output waveform correcting unit corrects the waveform of the output signal of the magnetic sensor based on the voltage level of the output signal of the magnetic sensor, in such a way that the output signal of the magnetic sensor is shaped to prescribed waveform shape during operation of the electric motor.

4 Claims, 39 Drawing Sheets

FOREIGN PATENT DOCUMENTS

| | | |
|---|---|---|
| JP | 2001-298982 A | 10/2001 |
| JP | 2002-315374 A | 10/2002 |
| JP | 2004-104954 | 4/2004 |
| JP | 2004 104954 A | 4/2004 |
| JP | 2005-110363 | 4/2005 |
| JP | 2005-261135 | 9/2005 |
| JP | 2005-295721 A | 10/2005 |

* cited by examiner

AC drive signal

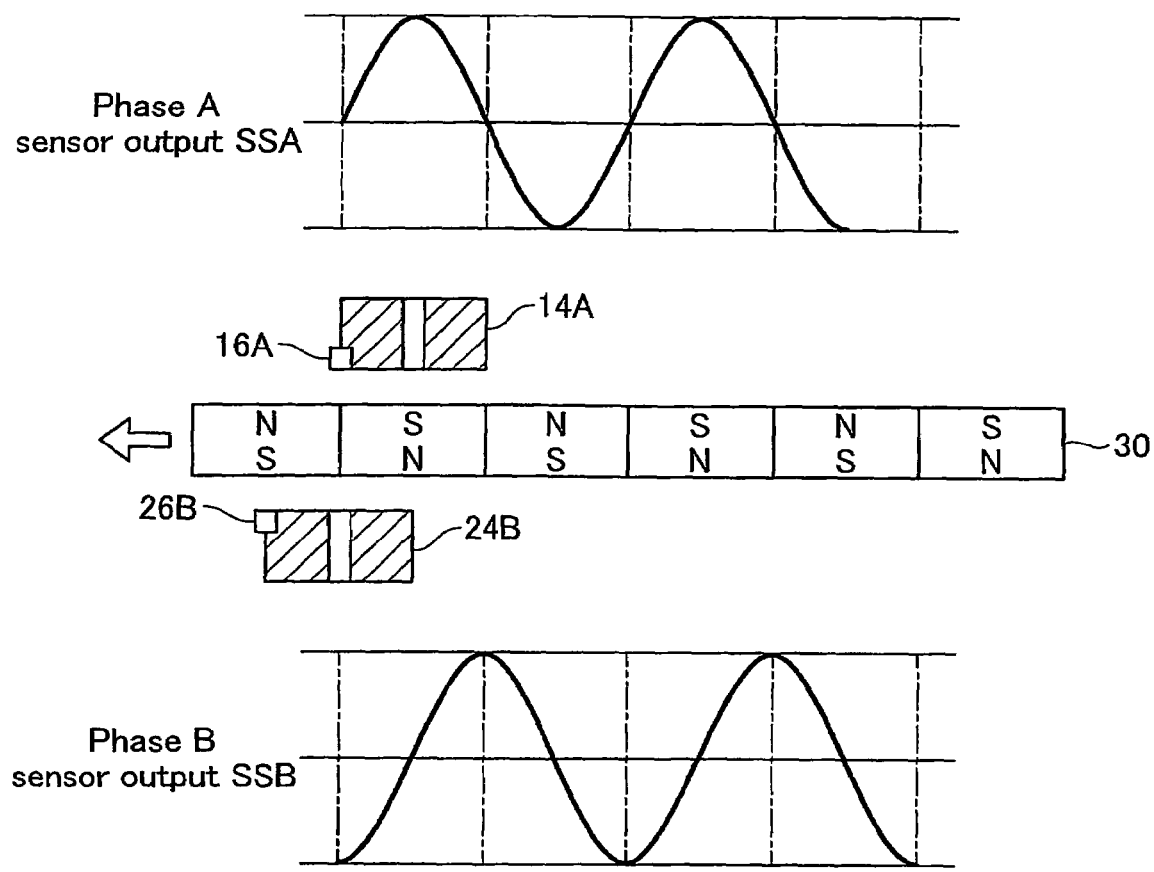

Phase = just prior to 2π (Phase A reverses polarity at 2π)

Phase = π/4

Phase = just prior to π/2 (Phase B reverses polarity at π/2)

Phase = 3π/4

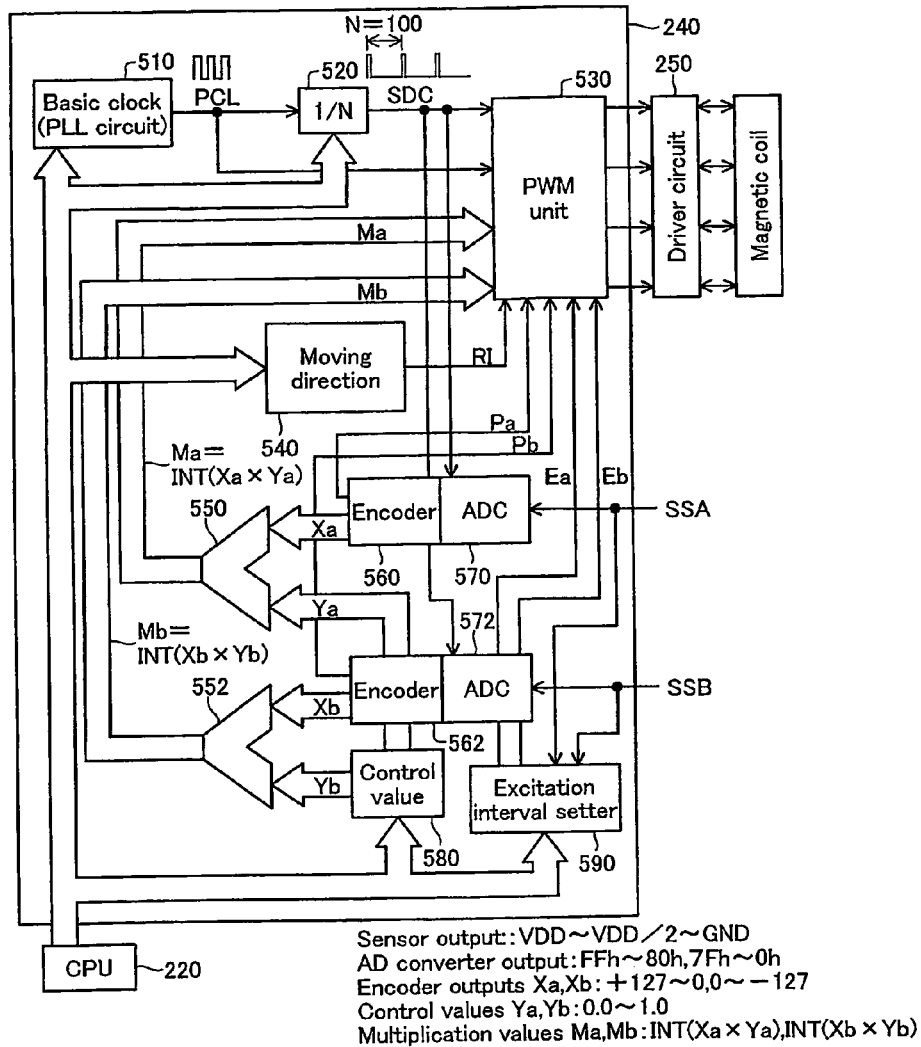

Desired sensor output

Vertical offset Poffset1 for use in sensor output correction

Sideways offset Poffset2 for use in sensor output correction

Desired sensor output

Pgain1 for use in sensor output correction $\geq 1$

Pgain1 for use in sensor output correction $\leq 1$

Configuration during calibration of sensor waveform

Configuration during actual use

SSA0

SSB0

Conversion table

Eca(=SSA)

Ecb(=SSB)

DRVA1+DRVA2 — HiZ

DRVB1+DRVB2 — HiZ

Fig.37A $S_{sw} = 0$ (sinusoidal wave drive)
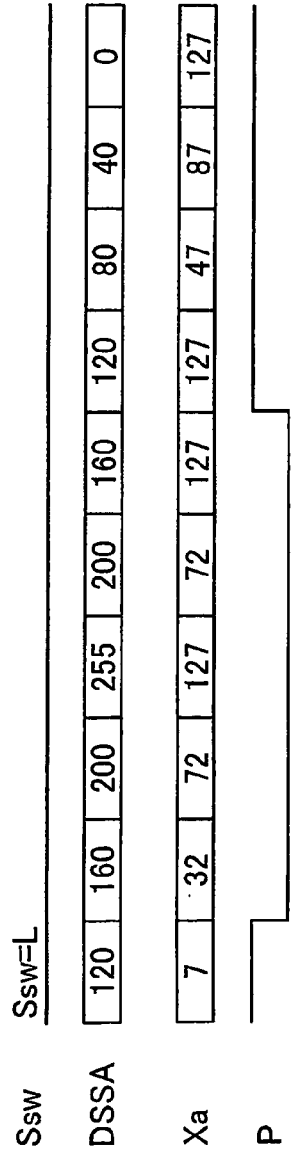
| Ssw | Ssw=L | | | | | | | | |
|---|---|---|---|---|---|---|---|---|---|
| DSSA | 120 | 160 | 200 | 255 | 200 | 160 | 120 | 80 | 40 | 0 |
| Xa | 7 | 32 | 72 | 127 | 72 | 127 | 47 | 87 | 127 |
| P | | | | | | | | | |
If DSSA ≦ 128, Xa = (DSSA − 128) and Pa = 1.
If 128 < DSSA, Xa = (127 − DSSA) and Pa = 0.
Fig.37B $S_{sw}=1$ (rectangular wave drive)
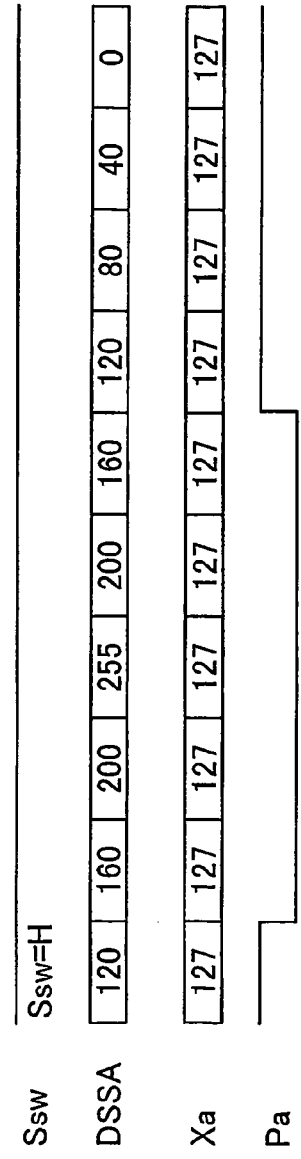
| Ssw | Ssw=H | | | | | | | | |
|---|---|---|---|---|---|---|---|---|---|
| DSSA | 120 | 160 | 200 | 255 | 200 | 160 | 120 | 80 | 40 | 0 |
| Xa | 127 | 127 | 127 | 127 | 127 | 127 | 127 | 127 | 127 |
| Pa | | | | | | | | | |
If DSSA ≦ 128, Xa = 127 and Pa = 1.
If 128 < DSSA, Xa = 127 and Pa = 0.

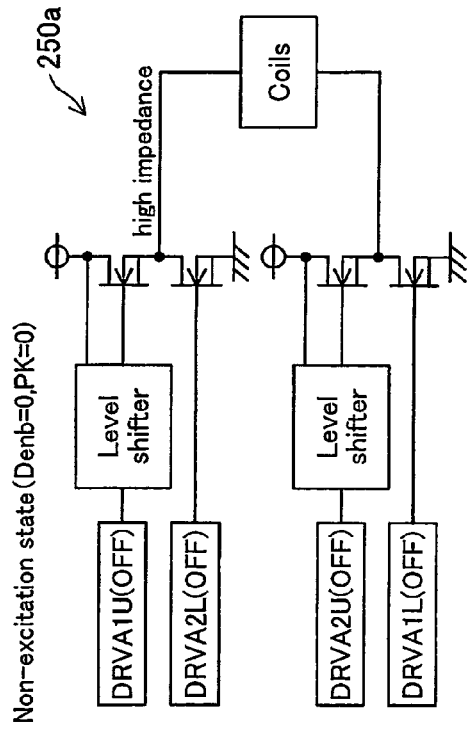
Fig.39A During operation(Denb=1,PK=0)
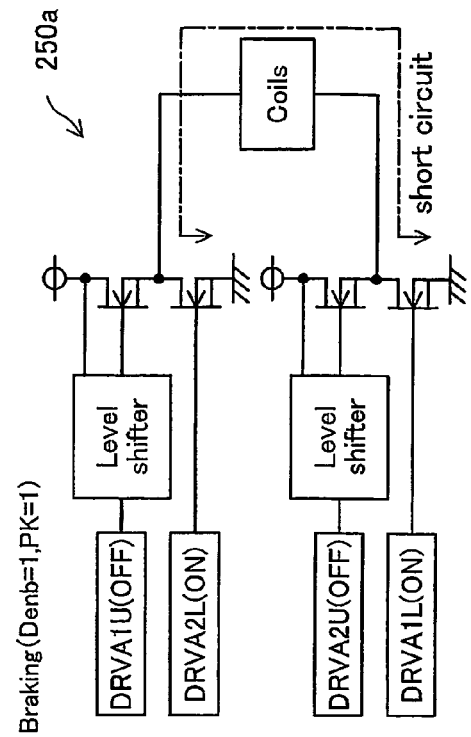
Fig.39B Non-excitation state(Denb=0,PK=0)
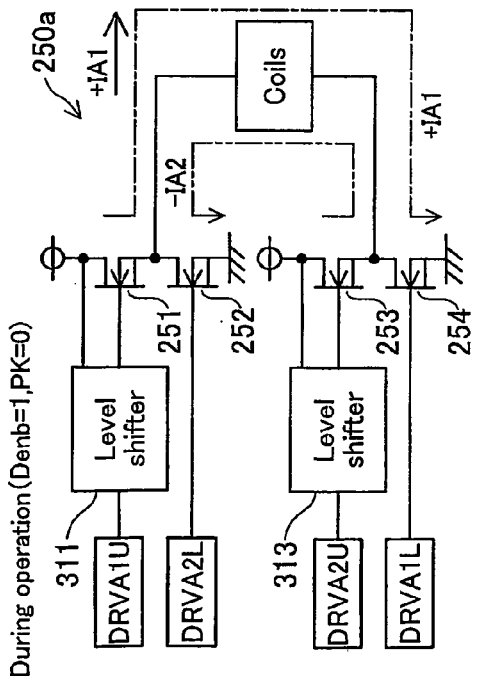
Fig.39C Braking(Denb=1,PK=1)
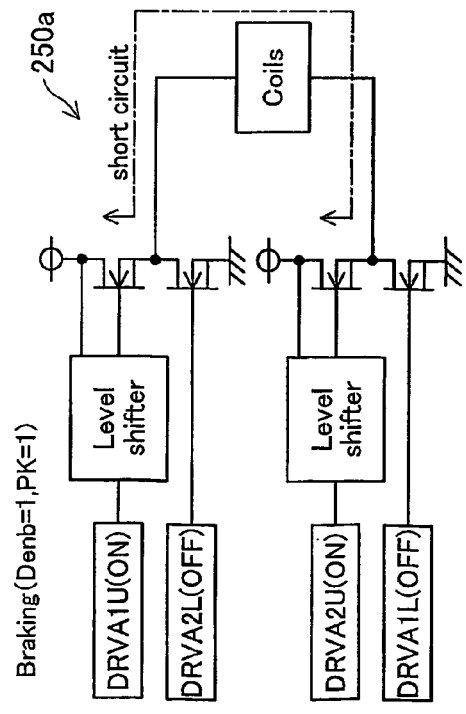
Fig.39D Braking(Denb=1,PK=1)

ELECTRIC MOTOR, METHOD FOR CORRECTING SENSOR OUTPUT FOR THE SAME, AND CONTROL CIRCUIT

TECHNICAL FIELD

The present invention relates to an electric motor that utilizes permanent magnets and magnet coils, and to correction of output of a sensor for electric motor.

BACKGROUND ART

Electric motors that utilize permanent magnets and magnet coils are known, having been disclosed in JP2001-298982A, for example.

In the prior art electric motors, motor control is carried out using an on/off signal from a digital magnetic sensor. Specifically, the timing for reversing the polarity of the voltage applied to the magnet coil is determined using the on/off signal from the digital magnetic sensor.

Magnetic sensors having analog output are also available. However, where an analog magnetic sensor is used to control a motor, considerable error in sensor output can occur due to manufacturing errors of various kinds among motors, making it impossible in some instances to carry out motor control satisfactorily. Examples of manufacturing errors among motors that can have an effect on output of an analog magnetic sensor are error in the installation location of the magnetic sensor; error in the location of the N pole/S pole boundary due to magnetization error of the permanent magnet; and error in mounting location of elements inside the magnetic sensor. However, to date there have yet to be devised satisfactory technology for achieving accurate motor control using analog magnetic sensors, while taking such errors into consideration. This problem is not limited to cases where analog magnetic sensors are used; the problem is encountered also in cases where digital magnetic sensors having multi-value analog output are used.

Moreover, in conventional control employing the on/off signal from a digital magnetic sensor, since the effective voltage applied to the electric motor has rectangular shape, efficiency declines at the edge of the rectangular voltage waveform, and this creates the problem of considerable noise and vibration.

Incidentally, PWM control circuits for use in motor control typically produce PWM signals by comparing a reference triangular signal and a sinusoidal signal which is generated from a motor sensor output. In response to variation of load change for the motor, the level of the triangular signal is modified so as to make the motor to properly operate according to the load. However, conventional PWM control circuits have fairly complicated circuitry structure in order to generate the PWM signals in response to a motor load change. This problem is not limited to the PWM control circuits for motor control, but in common with various PWM control circuits for other purposes.

DISCLOSURE OF THE INVENTION

A first object of the present invention is to provide technology for achieving accurate motor control, while taking into account errors relating to magnetic sensor output.

A second object of the present invention is to provide technology for achieving efficient motor control using magnetic sensor output.

A third object of the present invention is to provide technology for generating PWM signals in response to a load change with simple circuit structure.

According to an aspect of the present invention, there is provided a method for use in an electric motor including a coil array having a plurality of magnetic coils, a magnet array having a plurality of permanent magnets, and a magnetic sensor outputting an output signal that changes in analog fashion depending on relative location of the magnet array and the coil array. The method is adapted to correct waveform of the output signal of the magnetic sensor. The method includes the steps of (a) acquiring a voltage level of the output signal of the magnetic sensor; and (b) based on the acquired voltage level, correcting the waveform of the output signal of the magnetic sensor such that the output signal of the magnetic sensor assumes a prescribed waveform shape during operation of the electric motor.

According to this method, since the magnetic sensor output signal is corrected so as to produce a prescribed waveform shape, analog change in the output signal of the magnetic sensor is utilized in order to apply application voltage of desired waveform to the coil array. As a result, it is possible to achieve accurate motor control irrespective of errors in magnetic sensor output.

The method may include: performing offset correction of the output signal of the magnetic sensor by executing the steps (a) and (b); and performing gain correction of the output signal of the magnetic sensor by executing the steps (a) and (b).

By carrying out the gain correction and offset correction, it is possible to easily correct the magnetic sensor output signal to the prescribed waveform shape.

The step of performing the offset correction may include the steps of: rotating a rotor of the electric motor and acquiring a plurality of peak values of the output signal of the magnetic sensor; and determining a correction value for the offset correction, based on the plurality of peak values.

The step of performing the gain correction may include the steps of: rotating a rotor of the electric motor and acquiring a plurality of peak values of the output signal of the magnetic sensor; and determining a correction value for the gain correction, based on the plurality of peak values.

Where multiple peak values of the magnetic sensor output signal are utilized in the offset correction and gain correction, it is possible to obtain the desired output signal waveform, with consideration given to multiple magnets as a whole.

The method may further include storing the correction value of gain correction and the correction value of offset correction to a nonvolatile memory furnished in the electric motor.

With this arrangement, once the gain correction value and offset correction value have been set, it is possible to obtain the prescribed sensor output at any time.

According to another aspect of the present invention, there is provided an electric motor comprising: a coil array having a plurality of magnetic coils; a magnet array having a plurality of permanent magnets; a magnetic sensor configured to output an output signal that changes in analog fashion depending on relative location of the magnet array and the coil array; a drive control circuit that, utilizing analog change in the output signal of the magnetic sensor, generates application voltage for application to the coil array; and an output waveform correcting unit configured to correct a waveform of the output signal of the magnetic sensor such that the output signal of the magnetic sensor assumes a prescribed waveform shape during operation of the electric motor.

Since this electric motor is furnished with an output waveform correcting unit for performing correction of the output signal of the magnetic sensor so as to give a waveform of prescribed shape, the drive control circuit, utilizing analog change in the output signal of the magnetic sensor, can apply application voltage of the preferred waveform to the coil array. As a result, it will be possible to achieve accurate motor control irrespective of errors in the output of the magnetic sensor.

The output waveform correcting unit may execute gain correction and offset correction of the output signal of the magnetic sensor.

Where gain correction and offset correction are employed, the output signal of the magnetic sensor will be easily corrected to the desired waveform shape.

The output waveform correcting unit may have a nonvolatile memory for storing a gain correction value and an offset correction value.

With this arrangement, once a gain correction value and an offset correction value have been established, it becomes possible to obtain the desired sensor output at any time.

The electric motor may further include a communication unit for receiving the gain correction value and the offset correction value from an external device.

With this arrangement, correction values can be transmitted to the motor from the external device and stored during manufacturing of the electric motor, for example.

The prescribed waveform shape may be a back electromotive force waveform of the magnetic coils, or a sine wave waveform.

Since this electric motor is furnished with an output waveform correcting unit for performing correction of the output signal of the magnetic sensor so as to give a back electromotive force waveform of the magnetic coils, or a sine wave waveform, the drive control circuit, utilizing analog change in the output signal of the magnetic sensor, can apply application voltage of the preferred waveform to the coil array. As a result, it will be possible to achieve highly efficient motor control utilizing the output of the magnetic sensor.

The output waveform correcting unit may include: a lookup table having an input and an output, the input being the level of the output signal of the magnetic sensor, the output being a correction value for use in correcting the output signal; and a correction execution unit configured to obtain the correction value by looking up in the lookup table, and to execute correction of the output signal of the magnetic sensor using the correction value.

Alternatively, the output waveform correcting unit may include: a function coefficient memory for storing a coefficient of a mathematical function having an argument and a function value, the argument being the level of the output signal of the magnetic sensor, the function value being a correction value for use in correcting the output signal; and a correction execution unit configured to obtain the correction value according to the mathematical function while referring to the function coefficient, and to execute correction of the output signal of the magnetic sensor using the correction value.

By utilizing a lookup table or a mathematical function, the output signal of the magnetic sensor can be easily corrected to the desired waveform shape.

The correction value may be a difference between the level of the output signal of the magnetic sensor and the level of the corrected output signal having the prescribed waveform shape.

With this arrangement, the desired waveform shape will be obtained easily by adding the difference to the original signal level.

The output waveform correcting unit may further include: an offset correcting unit configured to execute offset correction of the output signal of the magnetic sensor, prior to correction by the correction execution unit.

With this arrangement, even if deviation in the output signal of the magnetic sensor occurs due to errors relating to the magnetic sensor, the deviation will be corrected. Consequently, an output signal of the desired waveform shape will be easily obtained on the basis of the deviation-corrected output signal.

According to another aspect of the present invention, there is provided a PWM control circuit for generating a PWM signal for use in controlling a control target device. The PWM comprises: a multiplication unit configured to multiply a signal value of a changing signal whose level is changing over time, and a control value which is set arbitrarily in a predetermined range, to thereby obtain a multiplication value; and a PWM signal generation circuit for generating a PWM signal having a pulse width corresponding to the multiplication value by executing PWM on the multiplication value.

Since the PWM control circuit executes PWM on the multiplication value obtained by multiplication of the changing signal value and the control value, the PWM signal can be generated responsive to load change with simple circuit structure.

The PWM control circuit may further comprise a masking circuit for masking part of the PWM signal, responsive to a required output for the control target device.

This structure easily generates the PWM signal responsive to the required output by simply masking the PWM signal.

The PWM control circuit may further comprise an adjustment unit configured to adjust both the control value and a masking amount in the masking circuit, responsive to the required output for the control target device.

This structure will satisfy the required output under consideration of various factors including efficiency, by adjusting both the control value and the masking amount.

The masking circuit may set the masking amount at a predetermined minimum value at startup of the control target device, and set the masking amount at a value greater than the minimum value after the startup of the control target device.

This structure will assure the startup of the control target device while improving the efficiency of the control target device after the startup.

The predetermined range of the control value may be from 0% to 100%.

This arrangement will generate the PWM signal whose level is proportional to the changing signal level, and whose effective amplitude is less than that in the case where the changing signal itself is subject to PWM.

The multiplication unit may include multi-staged multipliers for multiplying the changing signal value with two or more control values to obtain the multiplication value.

This arrangement will easily set the multiplication value at a desired value using the plural control values.

The changing signal may be a sinusoidal wave signal outputted from a sensor installed in the control target device.

This arrangement will generate the PWM signal responsive to the change of the sinusoidal wave signal.

The PWM control circuit may further comprise a digital decoder for digitizing the sinusoidal wave signal outputted from the sensor installed in the control target device to thereby generate the changing signal value and to generate a positive/negative sign signal indicating either an upper half or a lower half of the sinusoidal wave signal. The digital decoder may be selectively operable in either of:

(i) a first operation mode in which the digital decoder generates the changing signal value to indicate a change of the sinusoidal wave signal that changes in analog fashion; and (ii) a second operation mode in which the digital decoder generates the changing signal value to have a constant value irrespective of the change of the sinusoidal wave signal that changes in analog fashion.

This structure will enable the user to operate the control target device under consideration of various factors including the efficiency and operability of the control target device.

The PWM signal generation circuit may generate the PWM signal to have a duty ratio which is equal to a ratio of the multiplication value to a predetermined constant value.

This arrangement readily generates the PWM signal with simple circuit structure.

The PWM signal generation circuit may have a braking mode in which the PWM signal generation circuit sets the PWM signal so as to put the control target device in a braking state where the control target device is prevented from operation.

This arrangement will put the control target device in the operation state or in the braking state by setting the PWM signal.

It is possible for the present invention to be reduced to practice in various ways, for example, an electric motor, a method and circuit for controlling the same; a method and device for correcting an electric motor sensor; an actuator, an electronic device, and an electric appliance employing these.

BRIEF DESCRIPTION OF THE DRAWINGS

FIG. 3 illustrates magnetic sensor waveforms;

FIGS. 10A through 10E show the internal configuration and operation of a PWM controller;

FIGS. 37A and 37B are timing charts showing the operation of the encoder;

FIGS. 39A through 39D show operation of the driver circuit responsive to an operation enable signal Denb and a braking control signal PK.

BEST MODE FOR CARRYING OUT THE INVENTION

The embodiments of the present invention will be discussed in the order indicated below.
1. Embodiment 1
  1-A. Configuration of Electric Motor
  1-B. Configuration of Drive Control Circuit
  1-C. Correction of Sensor Output
  1-D. Modification Example of Drive Control Circuit
  1-E. Other Procedure for Implementing Sensor Output Correction
2. Embodiment 2
3. Embodiment 3
4. Other Modification Examples

1. Embodiment 1

1-A. Configuration of Electric Motor

Figure 1B:
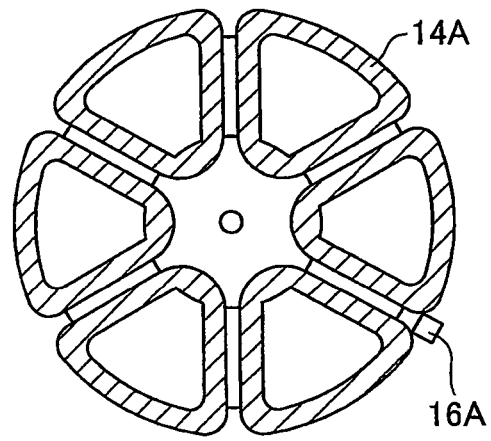
FIGS. 1A through 1D are sectional views showing the configuration of the motor unit of an electric motor in Embodiment 1.
Figure 1A:
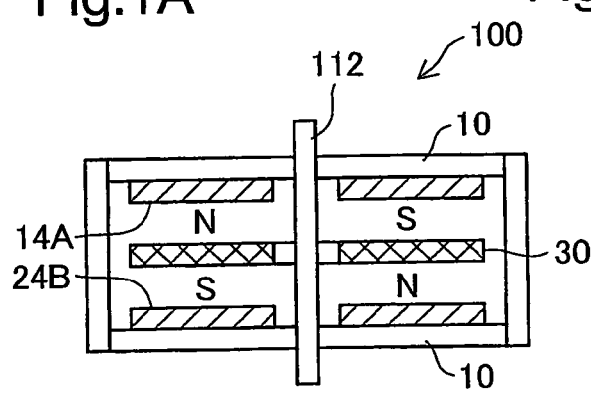

FIG. 1A is a sectional view showing the configuration of the motor unit of an electric motor in one embodiment of the present invention. This motor unit 100 has a stator unit 10 and a rotor unit 30, each of generally disk shape. The rotor unit 30 has a magnet array 34M composed of a number of magnets, and is affixed to a rotating shaft 112. The direction of magnetization of the magnet array 34M is the vertical direction. The stator unit 10 has a Phase A coil array 14A positioned above the rotor unit 30, and a Phase B coil array 24B positioned below the rotor unit 30.

Figure 1C:
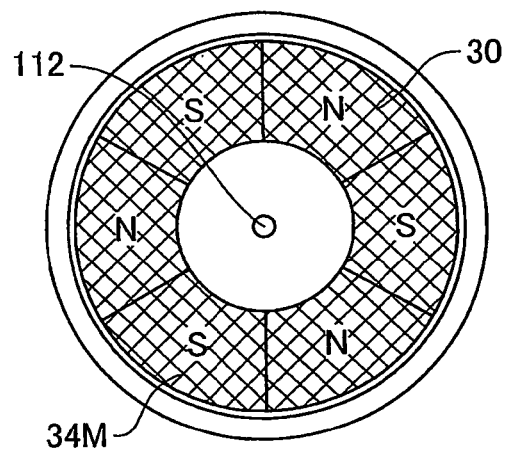
Figure 1D:
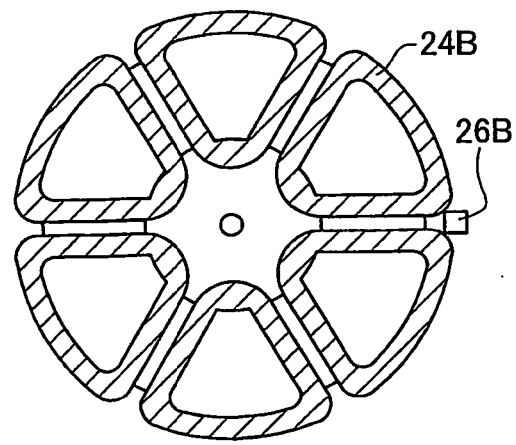

FIGS. 1B to 1D depict, in detached form, the first coil array 14A of the stator unit 10, the rotor unit 30, and the second coil array 24B of the stator unit 10, respectively. In this example, the Phase A coil array 14A and the Phase B coil array 24B each have six coils; likewise, the magnet array 34M has six magnets. However, it is possible to set the number of coils and magnets to any value.

Figure 2A:
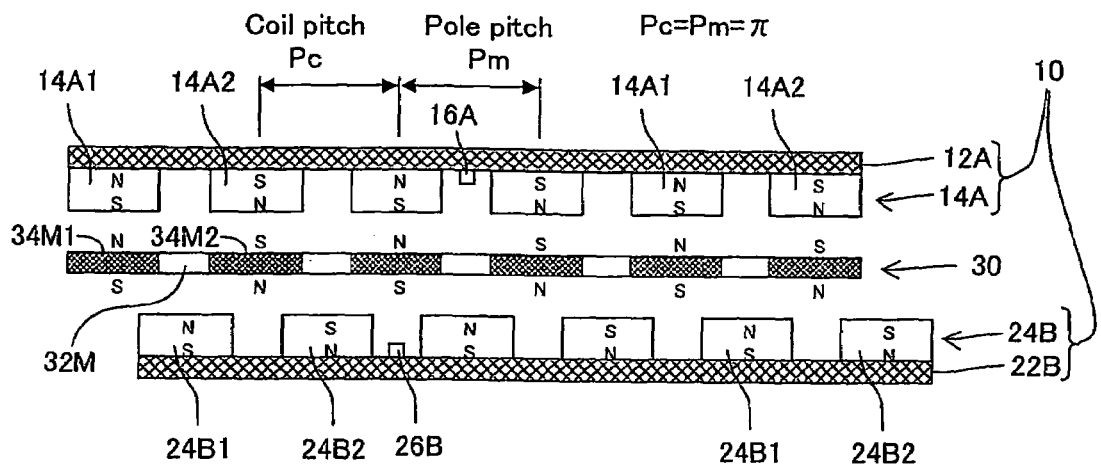
FIGS. 2A and 2B illustrate the positional relationship of coil arrays and a magnet array in Embodiment 1.

FIG. 2A depicts the positional relationship of coil arrays 14A, 24B and the magnet array 34M. The Phase A coil array 14A is affixed to a support member 12A, while the Phase B coil array 24B is affixed to a support member 22B. The Phase A coil array 14A includes two types of coils 14A1, 14A2 excited in opposite directions and arranged in alternating fashion at a constant pitch Pc. In the state shown in FIG. 2A, the three coils 14A1 are excited such that their direction of magnetization (the direction from the N pole to the S pole) is oriented downward; the other three coils 14A2 are excited such that their direction of magnetization is oriented upward. Likewise, the Phase B coil array 24B is composed of two types of coils 24B1, 24B2 excited in opposite directions and arranged in alternating fashion at the constant pitch Pc. Herein, "coil pitch Pc" is defined as the pitch of the coils of the Phase A coil array, or the pitch of the coils of the Phase B coil array.

The magnet array 34M of the rotor unit 30 is affixed to a support member 32M. The permanent magnets of this magnet array 34M are oriented respectively with their direction of magnetization facing in the direction perpendicular to the direction of placement of the magnet array 34M; the latter is the left-right direction in FIG. 2A. The magnets of the magnet array 34M are arranged at constant magnetic pole pitch Pm. In this example, the magnetic pole pitch Pm is equal to the coil pitch Pc, and in terms of electrical angle is equivalent to $\pi$. Electrical angle of $2\pi$ is associated with the mechanical angle or distance when the phase of the drive signal presented to the coil array changes by $2\pi$. In the present embodiment, when the phase of the drive signals of the Phase A coil array 14A and the Phase B coil array 24B changes by $2\pi$, the magnet array 34M undergoes displacement by the equivalent of twice the coil pitch Pc.

The Phase A coil array 14A and the Phase B coil array 24B are positioned at locations differing from one another by $\pi/2$ in terms of electrical angle. The Phase A coil array 14A and the Phase B coil array 24B differ only in location, and in other respects have substantially identical configuration. Consequently, only the example of the Phase A coil array 14A will be discussed below, except where there is a particular need during discussion of the coil array.

Figure 2B:
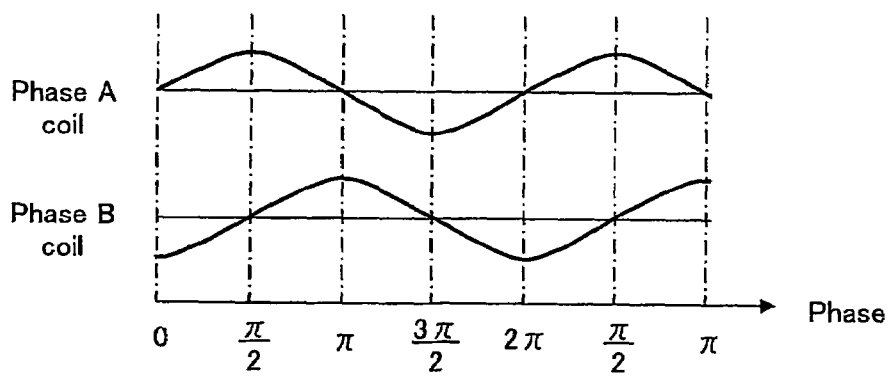

FIG. 2B depicts exemplary waveforms of AC drive signals presented to the Phase A coil array 14A and the Phase B coil array 24B. The Phase A coil array 14A and the Phase B coil array 24B are presented respectively with two-phase AC signals. The drive signals of the Phase A coil array 14A and the Phase B coil array 24B are phase-shifted by $\pi/2$ with respect to one another. The state of FIG. 2A corresponds to the zero phase or $2\pi$ state.

As shown in FIG. 2A, the motor unit 100 additionally has an analog magnetic sensor 16A for the Phase A coil array 14A, and an analog magnetic sensor 16B for the Phase B coil array 24B. Hereinafter these will be termed the "Phase A sensor" and the "Phase B sensor." The Phase A sensor 16A is situated at a location in the center between the two coils of the Phase A coil array 1A; the Phase B sensor 26B is situated at a location in the center between the two coils of the Phase B coil array 24B. In the present embodiment, the AC drive signals depicted in FIG. 2B are generated utilizing the analog output of these sensors 16A, 26B. Hall ICs that utilize the Hall effect can be employed as the sensors 16A, 26B, for example.

FIG. 3 is an illustration depicting magnetic sensor waveforms. In this example, the Phase A sensor output SSA and the Phase B sensor output SSB are both sine waves. These sensor outputs have waveform shape substantially identical to that of back electromagnetic force of the Phase A coil 14A and the Phase B coil 24B. The back electromagnetic force waveform is dependent on the shape of the coils and the positional relationship of the magnets and the coils, but is typically a sine wave or a shape very close to a sine wave. The "back electromagnetic force" may be also referred to as "induced voltage."

In general, an electric motor functions as an energy conversion device that converts between mechanical energy and electrical energy. The back electromagnetic force of the coils represents mechanical energy of the motor converted to electrical energy. Consequently, where electrical energy applied to the coils is converted to mechanical energy (that is, where the motor is driven), it is possible to drive the motor with maximum efficiency by means of application of voltage having waveform identical to that of the back electromagnetic force. As will be discussed below, "voltage having waveform identical to that of the back electromagnetic force" means voltage that generates current in the opposite direction to the back electromagnetic force.

Figure 4:
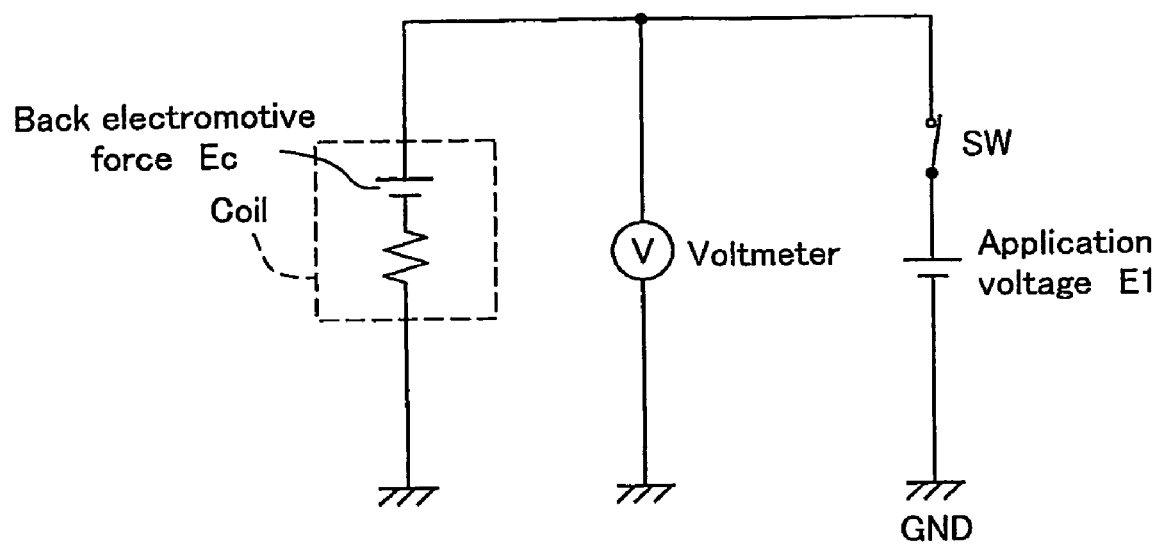
FIG. 4 is a schematic diagram depicting the relationship of coil application voltage and back electromotive force.

FIG. 4 is a schematic diagram depicting the relationship of coil application voltage and back electromotive force. Here, the coil is simulated in terms of back electromotive force Ec and resistance. In this circuit, a voltmeter V is parallel-connected to the application voltage E1 and the coil. When voltage E1 is applied to the motor to drive the motor, back electromotive force Ec is generated in the direction of reverse current flow to the application voltage E1. When a switch SW is opened while the motor is rotating, the back electromotive force Ec can be measured with the voltmeter V. The polarity of the back electromotive force Ex measured with the switch SW open will be the same as the polarity of the application voltage E1 measured with the switch SW closed. The phrase "application of voltage of waveform identical to that of the back electromagnetic force" hereinabove refers to application of voltage having the same polarity and waveform as the back electromotive force Ec measured by the voltmeter V.

As noted previously, when driving a motor, it is possible to drive the motor with maximum efficiency by means of application of voltage having waveform identical to that of the back electromagnetic force. It can be appreciated that energy conversion efficiency is relatively low in proximity to the middle point of the sinusoidal back electromotive force waveform (in proximity to 0 voltage), and conversely that energy conversion efficiency is relatively high in proximity to the peak of the back electromotive force waveform. Where the motor is driven by applying voltage of the same waveform as the back electromotive force, relatively high voltage will be applied during periods of relatively high energy conversion efficiency, thus improving efficiency of the motor. On the other hand, if the motor is driven with a simple rectangular waveform, considerable voltage will be applied in proximity to a location where back electromotive force is substantially 0 (at the middle point of its waveform), and efficiency of the motor will be lower. Also, the problem of vibration and noise occurring will arise when voltage is applied during such periods of low energy conversion efficiency.

As will be understood from the preceding discussion, advantages of driving a motor through application of voltage having the same waveform as back electromotive force are that efficiency of the motor will be improved, and that vibration and noise will be reduced.

Figure 5A:
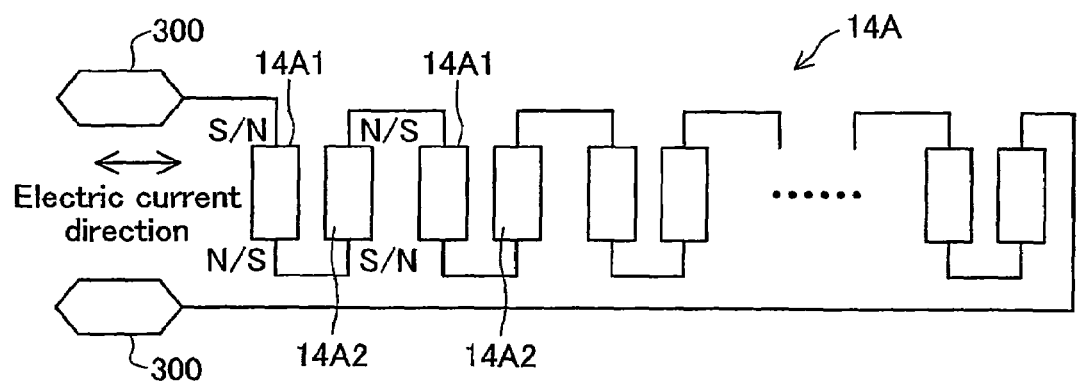
FIGS. 5A and 5B illustrate coil connecting methods.
Figure 5B:
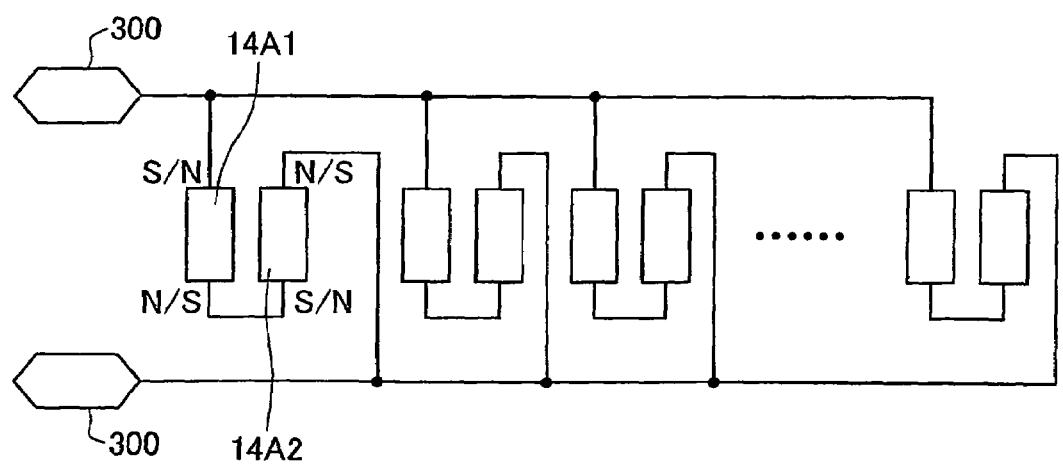

FIGS. 5A and 5B are diagrams depicting connection methods of the two types of coils 14A1, 12A2 of the Phase A coil array A1. With the connection method of FIG. 5A, all of the coils included in the Phase A coil array A1 are series-connected to drive control circuits 300. With the connection method of FIG. 5B, on the other hand, a plurality of series-connected pairs of coils 14A1, 12A2 are connected in parallel. With either connection method, the two types of coils 14A1, 12A2 will always be magnetized with opposite polarity.

FIGS. 6A to 6D depict operation of the electric motor of the present embodiment. In this example, rightward displacement of the magnet array 34M with respect to the coil arrays 14A, 24B over time is depicted. The left-right direction in the drawings can be understood to correspond to the rotation direction of the rotor unit 30 shown in FIG. 1A.

Figure 6A:
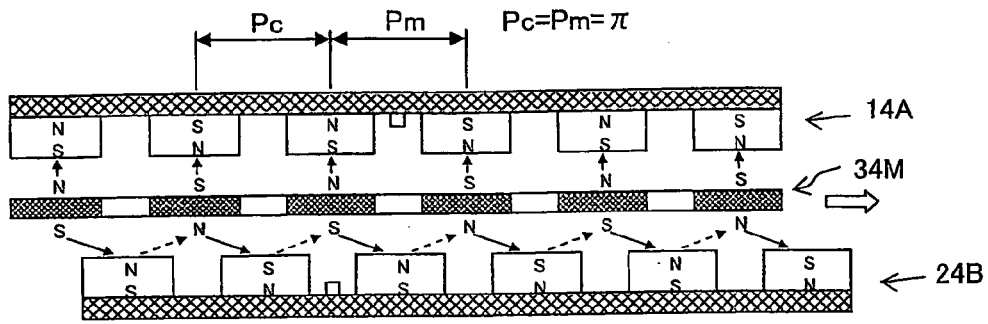
FIGS. 6A through 6D illustrate the basic principle of electric motor operation in Embodiment 1.

FIG. 6A depicts the state at the timing when the phase is just prior to $2\pi$. The solid arrows drawn between coils and magnets denote the attraction direction, and the broken arrows denote the repulsion direction. In this state, the Phase A coil array 14A does not impart driving force in the operating direction (left-right direction in the drawing) to the magnet array 34M, and magnetic force acts in the direction drawing the magnet array 34M towards the Phase A coil array 14A. Consequently, application voltage to the Phase A coil array 14A will preferably go to zero at the timing coincident with the phase of $2\pi$. On the other hand, the Phase B coil array 24B does impart driving force in the operating direction to the magnet array 34M. Moreover, since the Phase B coil array 24B imparts not only attracting force but also repelling force to the magnet array 34M, zero net force is applied in the vertical direction (direction perpendicular to the operating direction of the magnet array 34M) to the magnet array 34M by the Phase B coil array 24B. Consequently, application voltage to the Phase B coil array 24B will preferably go to peak value at the timing coincident with the phase of $2\pi$.

Figure 6B:
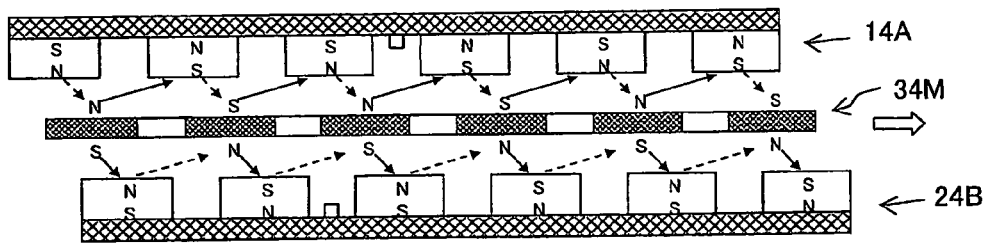
Figure 6C:
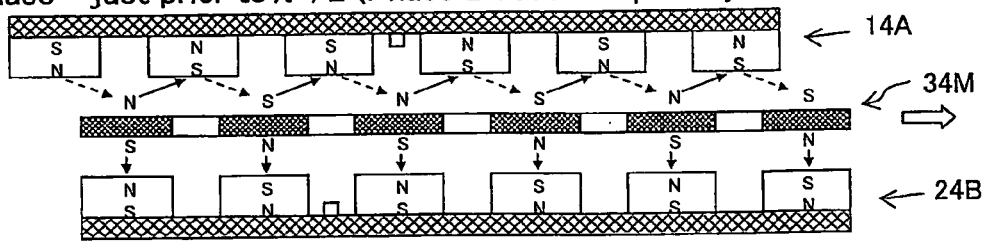
Figure 6D:
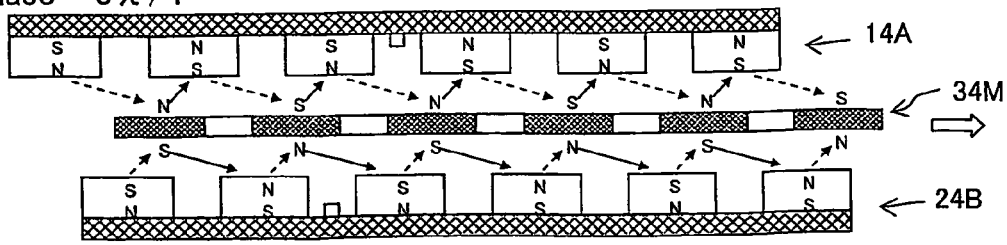

As shown in FIG. 6B, the Phase A coil array 14A reverses polarity at the timing coincident with the phase of $2\pi$. FIG. 6B depicts the state where the phase is $\pi/4$; polarity of the Phase A coil array 14A is now the reverse of that in FIG. 6A. In this state, both the Phase A coil array 14A and the Phase B coil array 24B impart identical driving force in the operating direction to the magnet array 34M. FIG. 6C depicts the state where the phase is just prior to $\pi/2$. In this state, which is the opposite of the state of FIG. 6A, only the Phase A coil array 14A imparts driving force in the operating direction to the magnet array 34M. At the timing coincident with the phase of $\pi/2$. the polarity of the Phase B coil array 24B reverses, producing the polarity depicted in FIG. 6D. FIG. 6D depicts the state where the phase is $3\pi/4$. In this state, both the Phase A coil array 14A and the Phase B coil array 24B impart identical driving force in the operating direction to the magnet array 34M.

As will be understood from FIGS. 6A to 6D, polarity of the Phase A coil array 14A switches at the timing when the coils of the Phase A coil array 14A are situated in opposition to the magnets of the magnet array 34M. The Phase B coil array behaves in the same way. As a result, driving force will be generated substantially constantly from all of the coils, making it possible to generate a high level of torque.

The operation during the period where the phase is between $\pi$ and $2\pi$ is substantially the same as that shown in FIGS. 6A to 6D, and need not be described in detail. However, it should be noted that polarity of the Phase A coil array 14A again reverses at the timing coincident with the phase of $\pi$, and polarity of the Phase B coil array 24B again reverses at the timing coincident with the phase of $3\pi/2$.

As will be understood from the preceding discussion, the electric motor of the present embodiment affords driving force of the magnet array 34M in the operating direction, by utilizing attracting force and repelling force between the magnet array 34M and the coil arrays 14A, 24B. In particular, in the present embodiment, since the coil arrays 14A, 24B are situated at opposite sides of the magnet array 34M, magnetic flux to both sides of the magnet array 34M will be utilized for generating driving force. Consequently, utilization of magnetic flux is higher in comparison to where only one side of the magnets is utilized for generating driving force as in conventional electric motors, thereby affording a motor with good efficiency and high torque. However, it would be possible to omit one of the two coil arrays 14A, 24B.

In preferred practice, the support members 12A, 22B, 32M will be respectively formed from nonmagnetic material. Also, in preferred practice, among the various components of the motor unit of the present embodiment, all components except for the electrical wiring including the coils and sensors, the magnets, and the rotating shaft and its bearings will be formed from materials that are nonmagnetic and electrically nonconductive. By dispensing with a core made of a magnetic body, it is possible to achieve smooth and consistent operation, without the occurrence of cogging. By dispensing with a yoke as part of the magnetic circuit, excitation loss (eddy-current loss) will be held to very low levels, and a motor with good efficiency attained.

1-B. Configuration of Drive Control Circuit

Figure 7A:
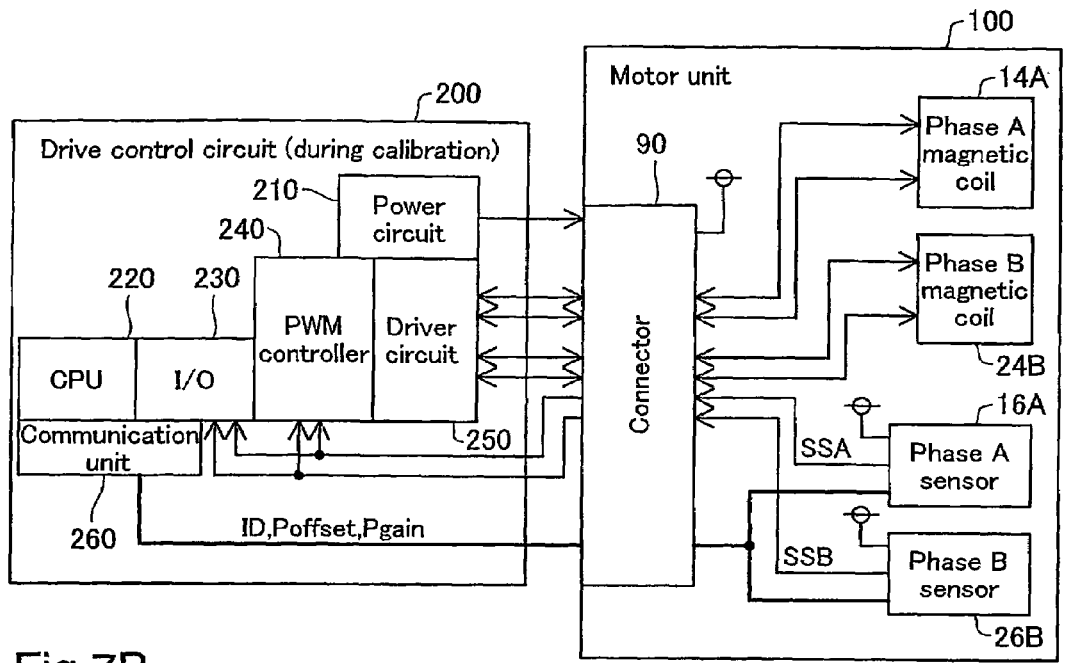
FIGS. 7A and 7B are block diagrams depicting the configuration of a drive control circuit of the motor of Embodiment 1.
Figure 7B:
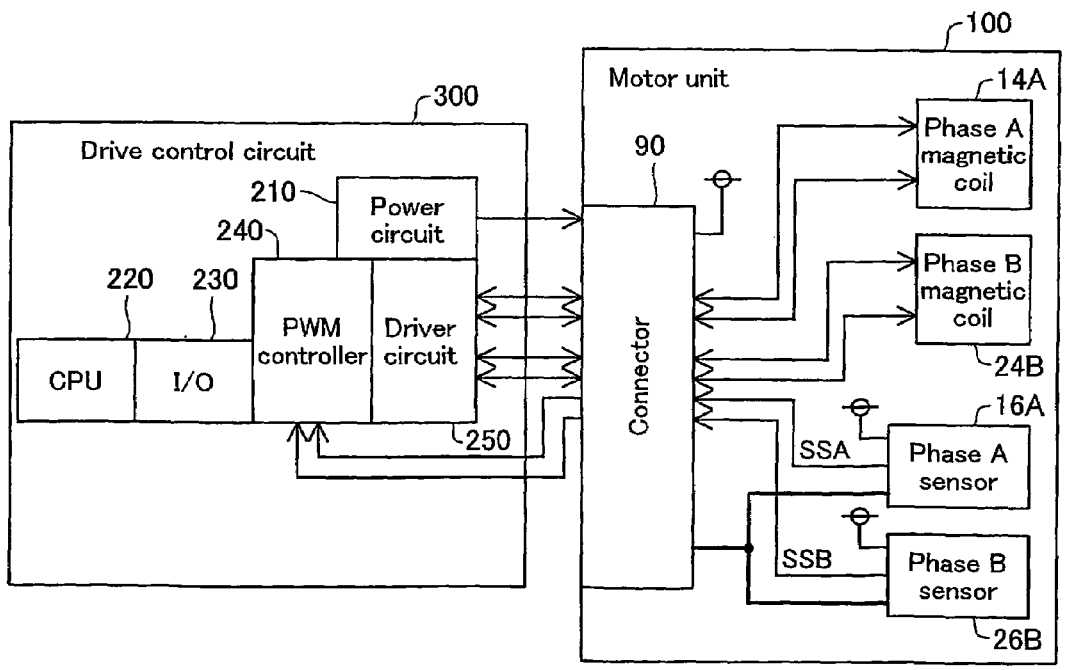

FIGS. 7A and 7B show the configuration of drive control circuits for the motor of Embodiment 1. FIG. 7A depicts the configuration during calibration of sensor waveform, and FIG. 7B depicts the configuration during actual use. "Calibration of sensor waveform" is used synonymously with "correction of sensor output waveform."

As shown in FIG. 7A, during calibration, a drive control circuit 200 for calibration purposes is connected to the connector 90 of the motor unit 100. This drive control circuit 200 has a power circuit 210, a CPU 220, an I/O interface 230, a PWM controller 240, a driver circuit 250, and a communication unit 260. The power circuit 210 supplies power to the circuits in the drive control circuit 200 and to the motor unit 100. The CPU 220 controls the operation of the drive control circuit 200 by means of making settings in the various circuits in the drive control circuit 200. The I/O interface 230 has the function of receiving sensor outputs SSA, SSB supplied from the motor unit 100, and supplying these to the CPU 220. The CPU 220 decides whether the received sensor outputs SSA, SSB have desired waveform shape, and determines an offset correction values Poffset and gain correction values Pgain that will give the desired waveform shape. The method for determination will be discussed in detail later. Hereinafter the offset correction value will be termed simply "offset," and the gain correction value will be termed simply correction value will be termed simply "gain."

The PWM controller 240 generates a PWM signal for driving the coils. The driver circuit 250 is a bridge circuit for driving the coils. The circuit design and operation of the PWM controller 240 and the driver circuit 250 will be discussed later. The communication unit 260 has a function whereby the sensors 16A, 26B are presented with and store in memory the offset correction values Poffset and the gain correction values Pgain that are determined through calibration. The communication unit 260 also has a function for transmitting the correction values Poffset, Pgain stored in the sensors 16A, 26B to an external device. In order to distinguish among correction values for the Phase A sensor 16A and correction values for the Phase B sensor 26B, the communication unit 260 sends and receives an ID code (identification signal) for each sensor, together with the correction values. Where correction values are transmitted using ID codes in this way, it is possible to transmit correction values for multiple sensors via a single communication bus, while distinguishing them from each other.

As shown in FIG. 7B, during actual use of the motor, a drive control circuit 300 which is different from that used during calibration is connected to the connector 90 of the motor unit 100. This drive control circuit 300 corresponds to the drive control circuit 200 for calibration, except that the communication unit 260 is omitted. The CPU 220 may be omitted in the configuration shown in FIGS. 7A and 7B. If the CPU 220 is omitted, the functions of the CPU 220 described in this embodiment will be performed by other circuitry such as a logic circuit and/or a non-volatile memory. Alternatively, the CPU 220 may be replaced with a communication circuit or an interface circuit, which receives various instructions from an external device and transfers the same to the circuit elements within the device control circuit 200 or 300.

Figure 8:
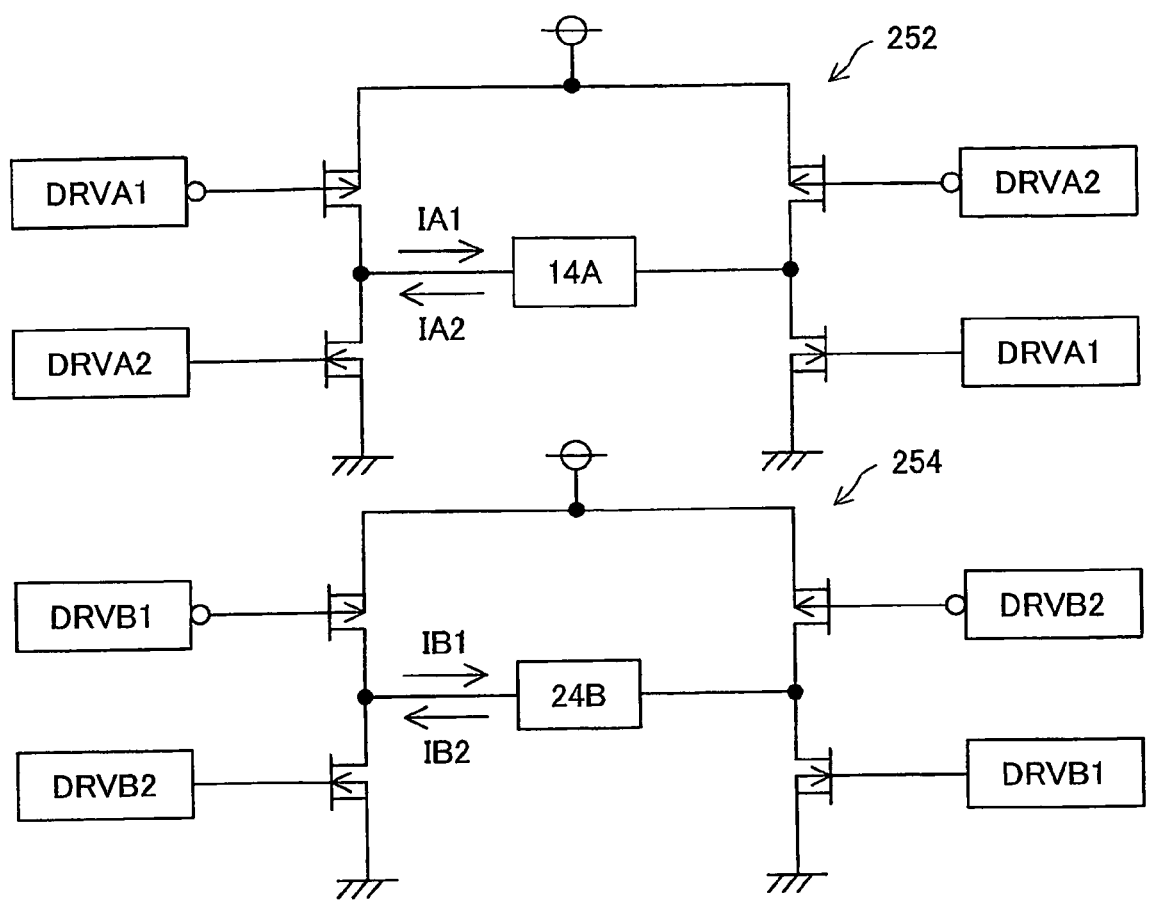
FIG. 8 is a diagram depicting the internal configuration of a driver circuit.

FIG. 8 is a diagram depicting the internal configuration of the driver circuit 250. The Phase A driver circuit 252 is a H-bridge circuit which drives the Phase A coil array 14A in response to AC drive signals DRVA1, DRVA2. The white circles at the terminal part of the blocks depicting the drive signals indicate negative logic, with the signal being inverted. The arrows labeled IA1, IA2 respectively indicate direction of current flow by the drive signals DRVA1, DRVA2. The configuration of the Phase B driver circuit 254 is the same as that of the Phase A driver circuit 252; flow of current IB1, IB2 by drive signals DRVB1, DRVB2 is shown.

Figure 9:
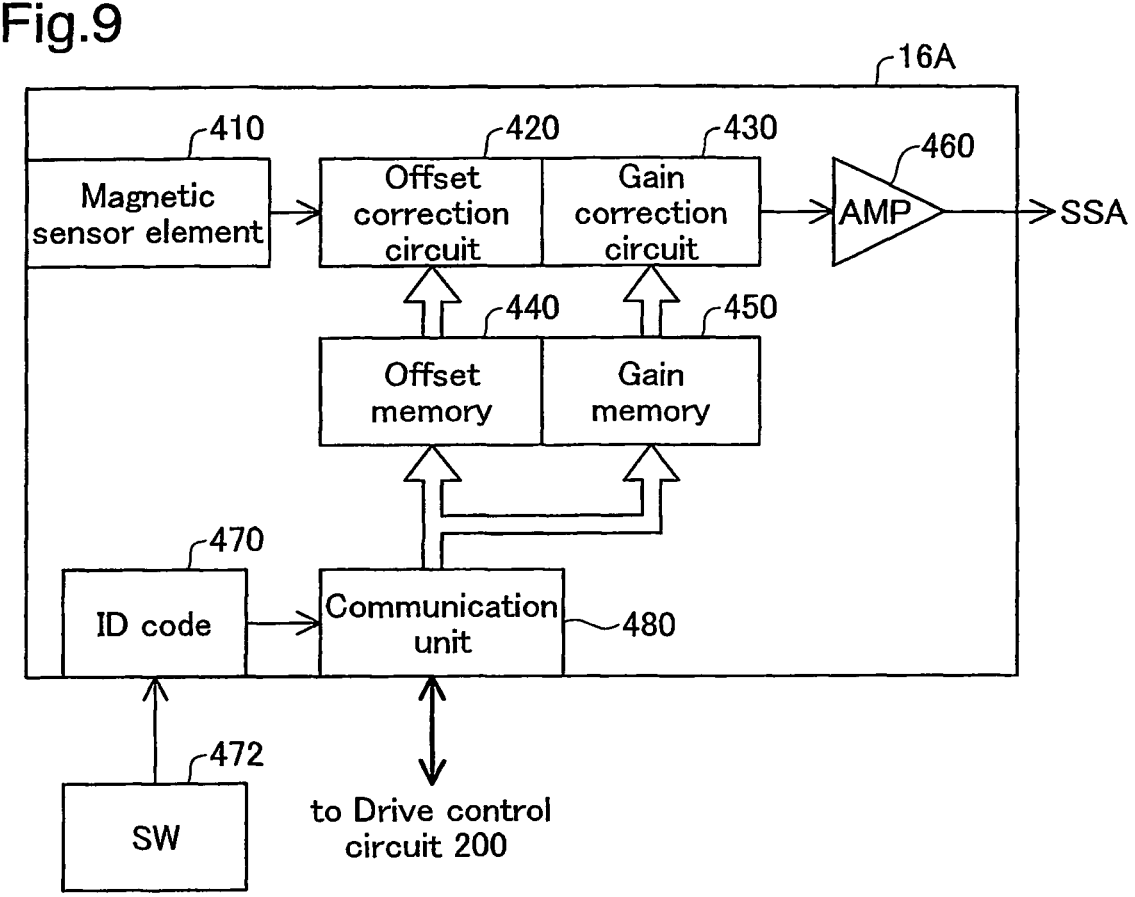
FIG. 9 is a diagram depicting the internal configuration of a magnetic sensor.

FIG. 9 is a diagram depicting the internal configuration of the magnetic sensor 16A used in Embodiment 1. Since the Phase A sensor 16A and the Phase B sensor 26B have identical configuration, only the Phase A sensor 16A will be discussed below.

The magnetic sensor 16A has a magnetic sensor element 410, an offset correction circuit 420, a gain correction circuit 430, an offset memory 440, a gain memory 450, an amplifier 460, an ID code register 470, and a communication unit 480. The magnetic sensor element 410 is a Hall element, for example.

During calibration (FIG. 7A), the communication unit 480 communicates with the drive control circuit 200 and receives an offset correction value Poffset and a gain correction value Pgain for sensor output, together with a sensor ID. An ID unique to the sensor may be recorded in the ID code register 470 inside the sensor, or an ID may be set using an external switch. In the example of FIG. 9, an ID may be set using an external switch 472 such as a DIP switch. However, it is possible for the ID code to be recorded in the motor by any of various other means besides a DIP switch. For example, it would be possible to eliminate the external switch 472 and instead construct the ID code register 470 from nonvolatile memory. In the event that the ID provided by the drive control circuit 200 matches the ID in the ID code register 470, the communication unit 480 will store the offset correction value Poffset and the gain correction value Pgain in the memory 440, 450 respectively. The offset correction circuit 420 and the gain correction circuit 430 will correct the waveform of the magnetic sensor element 410 in accordance with these correction values Poffset, Pgain. The corrected sensor output is then amplified by the amplifier 460, and output as the sensor output SSA.

As will be understood from the discussion above, the circuit elements 420, 430, 440, 450 of FIG. 9 function as the output waveform correcting unit for correcting the output waveform of the sensor 16A. In preferred practice the memory 440, 450 will be composed of nonvolatile memory.

FIGS. 10A to 10E show the internal configuration and operation of the PWM controller 240 (FIG. 7A). The PWM controller 240 has a basic clock generating circuit 510, a 1/N frequency divider 520, a PWM unit 530, a moving direction register 540, multipliers 550, 552, encoders 560, 562, AD converters 570, 572, a voltage control value register 580, and an excitation interval setting unit 590.

The basic clock generating circuit 510 is a circuit that generates a clock signal PCL of prescribed frequency, and is composed of a PLL circuit, for example. The frequency divider 520 generates a clock signal SDC of a frequency which is 1/N the frequency of the clock signal PCL. The value of N is set to a prescribed constant. This value of N has been previously established in the frequency divider 520 by the CPU 220 (FIG. 7A). The PWM unit 530 generates AC drive signals DRVA1, DRVA2, DRVB1, DRVB2 (FIG. 8) in response to the clock signals PCL, SDC, multiplication values supplied by the multipliers 550, 552, a moving direction value RI supplied by the moving direction value register 540, positive/negative sign signals Pa, Pb supplied by the encoders 560, 562, and excitation interval signals Ea, Eb supplied by the excitation interval setting unit 590. This operation will be discussed later.

A value RI indicating the direction of rotation of the motor is established in the moving direction value register 540 by the CPU 220. In the present embodiment, the motor undergoes forward rotation when the moving direction value RI is L level, and reverse rotation when it is H level.

The other signals Ma, Mb, Pa, Pb, Ea, Eb presented to the PWM unit 530 are determined in the manner described below. The multiplier 550, the encoder 560, and the AD converter 570 are circuits for use in Phase A; the multiplier 552, the encoder 562, and the AD converter 572 are circuits for use in Phase B. Since these circuit groups have identical operation, the discussion hereinbelow will mainly focus on operation of the Phase A circuits.

The magnetic sensor output SSA is presented to the AD converter 570. This sensor output SSA has a range, for example, of from GND (ground potential) to VDD (power supply voltage), with the middle point (=VDD/2) being the middle point of the output waveform (the point at which the sine wave passes through the origin). The AD converter 570 performs AD conversion of this sensor output SSA to generate a digital value of sensor output. The output of the AD converter 570 has a range, for example, of FFh to 0h (the "h" suffix denotes hexadecimal), with the median value of 80h corresponding to the middle point of the output waveform.

The encoder 560 converts the range of the sensor output value subsequent to AD conversion, and sets the value of the middle point of the output waveform to 0. As a result, the sensor output value Xa generated by the encoder 560 assumes a prescribed range on the positive side (e.g. +127 to 0) and a prescribed range on the negative side (e.g. 0 to −127). However, the value presented by the encoder 560 to the multiplier 560 is the absolute value of the sensor output value Xa; the positive/negative sign thereof is presented to the PWM unit 530 as the positive/negative sign signal Pa.

The voltage control value register 580 stores a voltage control value Ya established by the CPU 220. This voltage control value Ya, together with the excitation interval signal Ea discussed later, functions as a value for setting application voltage of the motor; the value Ya can take a value of 0 to 1.0, for example. Assuming an instance where the excitation interval signal Ea has been set in such a way that all intervals are excitation intervals, with no non-excitation intervals being provided, Ya=0 will mean that the application voltage is zero, and Ya=1.0 will mean that the application voltage is the maximum value. The multiplier 550 performs multiplication of the voltage control value Ya and the sensor output value Xa output from the encoder 560 and conversion to an integer; the multiplication value Ma thereof is presented to the PWM unit 530.

FIGS. 10B to 10E depict operation of the PWM unit 530 in instances where the multiplication value Ma takes various different values. Here, it is assumed that all intervals are excitation intervals, with no non-excitation intervals. The PWM unit 530 is a circuit that, during each cycle of the clock signal SDC, generates one pulse with a duty factor of Ma/N. Specifically, as shown in FIGS. 10B to 10E, in association with increase of the multiplication value Ma, the pulse duty factor of the drive signals DRVA1, DRVA2 increases as well. The first drive signal DRVA1 is a signal that generates a pulse only when the sensor output SSA is positive, and the second drive signal DRVA2 is a signal that generates a pulse only when the sensor output SSA is negative; in FIGS. 10B to 10E, these are shown together. For convenience, the second drive signal DRVA2 is shown as negative pulses.

FIGS. 11A to 11D depict correspondence relationships between sensor output waveforms and waveforms of drive signals generated by the PWM unit 530. In the drawing, "Hiz" denotes high impedance. As explained in FIGS. 10A to 10E, the Phase A drive signals DRVA1, DRVA2 are generated by PWM control using the analog waveform of the Phase A sensor output as-is. This is true for the Phase B drive signals DRVB1, DRVB2 as well. Consequently, it is possible for the Phase A coils and Phase B coil to be presented with effective voltage that exhibits change in level corresponding to change in the sensor outputs SSA, SSB.

Figure 11A:
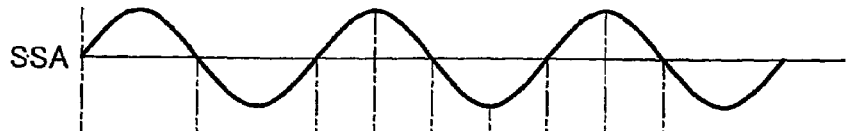
FIGS. 11A through 11F illustrate correspondence relationships between sensor output waveform and drive signal waveform.
Figure 11B:
Figure 11C:
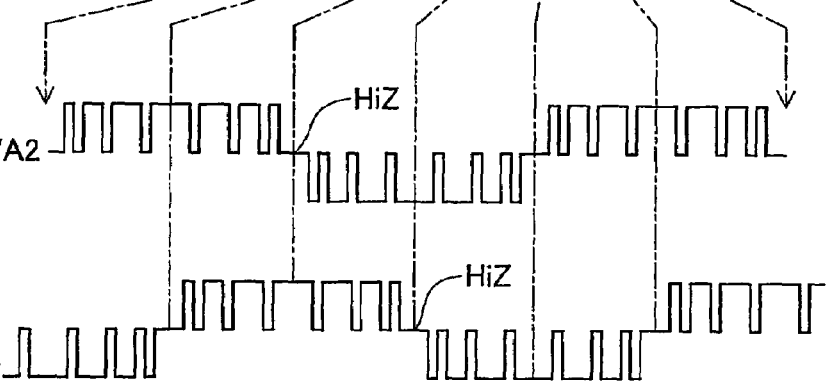
Figure 11D:
Figure 11E:
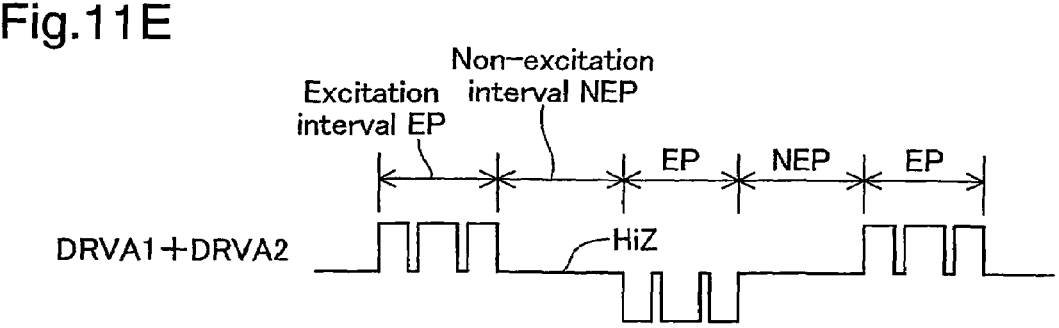
Figure 11F:
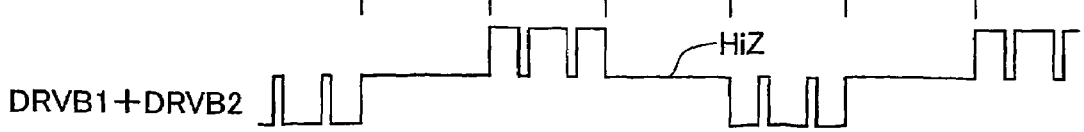

The PWM unit 530 is furthermore designed so that a drive signal is output during excitation intervals that are indicated by the excitation interval signals Ea, Eb supplied by the excitation interval setting unit 590, and so that no drive signal is output during intervals other than the excitation intervals (non-excitation intervals). FIGS. 11E and 11F depict drive signal waveforms produced in the case where excitation intervals EP and non-excitation intervals NEP have been established by the excitation interval signals Ea, Eb. In the excitation intervals EP, the drive signal pulses of FIGS. 11C and 11D are generated as is; in the non-excitation intervals NEP, no pulses are generated. By establishing excitation intervals EP and non-excitation intervals NEP in this way, there is no application of voltage to the coils in proximity to the middle points of the back electromotive force waveform (i.e. in proximity to the middle points of sensor output), thus making possible further improvement of motor efficiency. In preferred practice excitation intervals EP will be established in intervals that are symmetric about the peaks of the back electromotive force waveform (the induced voltage waveform), and the non-excitation intervals NEP will be established in intervals that are symmetric about the middle points of the back electromotive force waveform.

As discussed previously, if the voltage control value Ya is set to a value less than 1, the multiplication value Ma will be small compared with the voltage control value Ya. Consequently, effective adjustment of application voltage through the voltage control value Ya is possible as well.

As will be understood from the preceding discussion, with the motor of the present embodiment, it is possible to adjust the application voltage using both the voltage control value Ya and the excitation interval signal Ea. This is true for Phase B as well. In preferred practice, relationships between the preferred application voltage on the one hand, and the voltage control value Ya and the excitation interval signal Ea on the other, will be stored in advance in table format in memory in the drive control circuit 300. By so doing it is possible, when the drive control circuit 300 has received the preferred application voltage from the outside, for the CPU 220 in response to the drive signal to set the voltage control value Ya and the excitation interval signal Ea in the PWM controller 240. Adjustment of application voltage does not require the use of both the voltage control value Ya and the excitation interval signal Ea, and it would be acceptable to use either of these instead.

Figure 12:
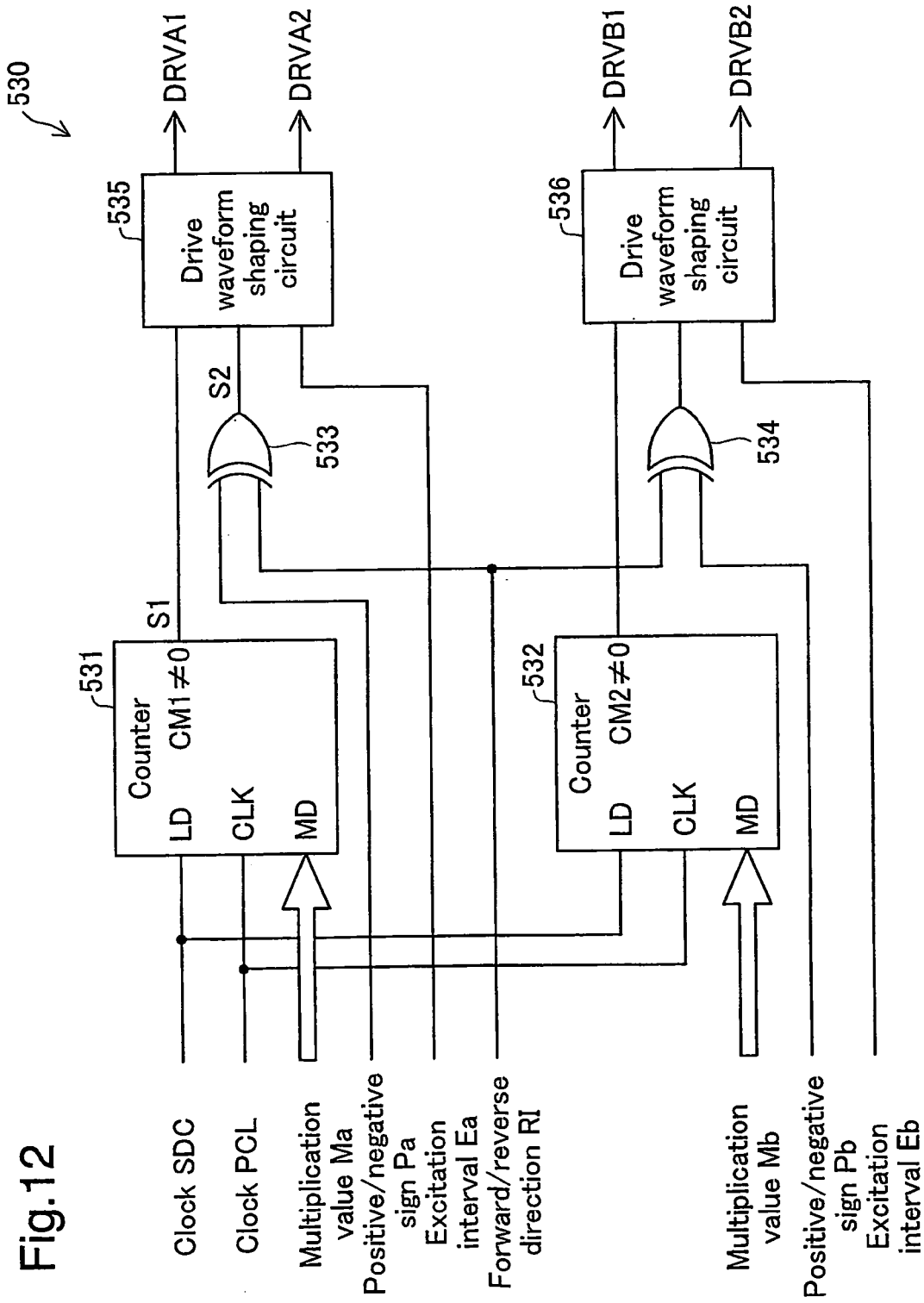
FIG. 12 is a block diagram depicting the internal configuration of a PWM unit.

FIG. 12 is a block diagram depicting the internal configuration of the PWM unit 530 (FIG. 10A). The PWM unit 530 has counters 531, 532, EXOR circuits 533, 534, and drive waveform shaping units 535, 536. The counter 531, the EXOR circuit 533, and the drive waveform shaping unit 535 are circuits used for Phase A; the counter 532, the EXOR circuit 534, and the drive waveform shaping unit 536 are circuits used for Phase B. Their operation will be described below.

Figure 13:
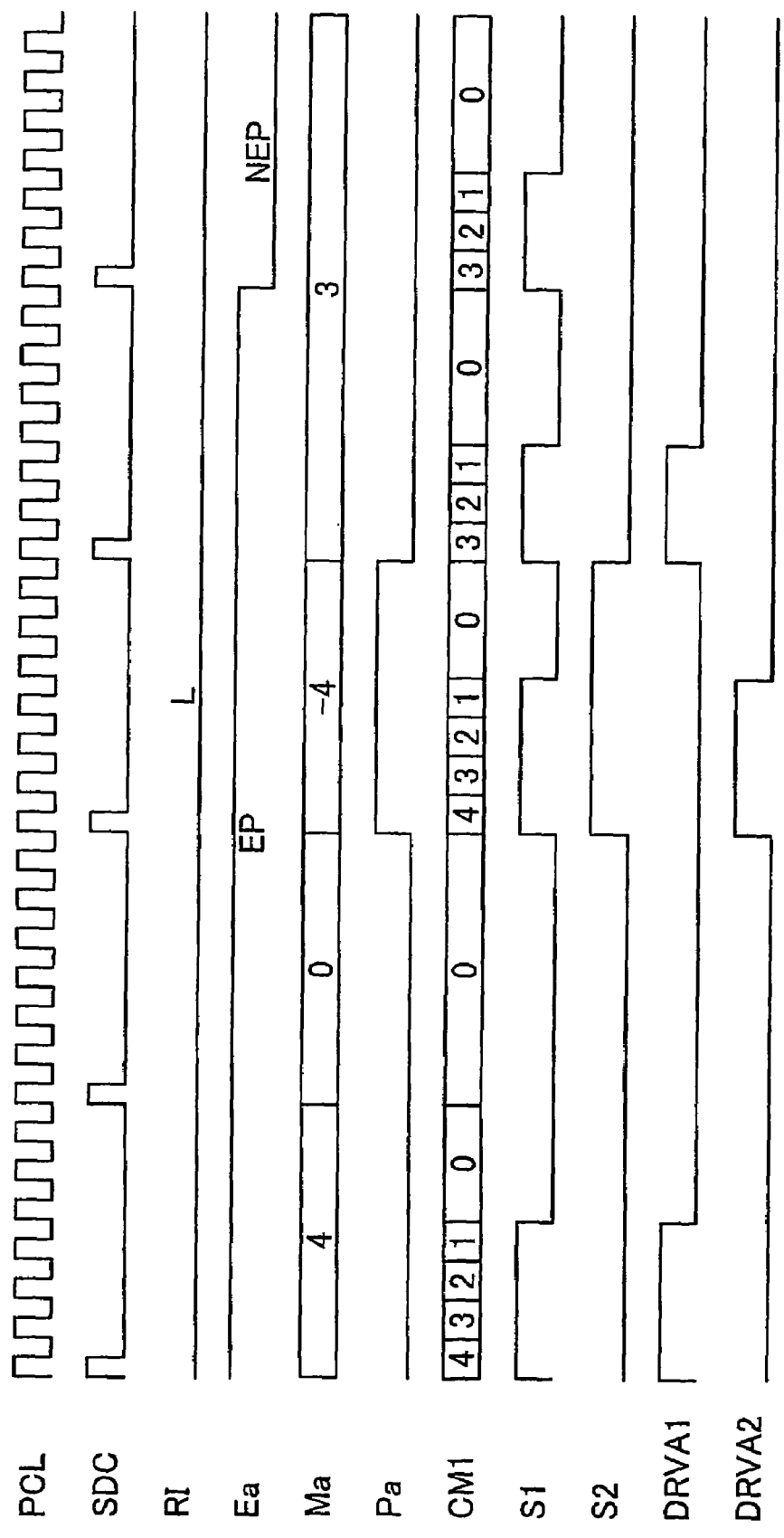
FIG. 13 is a timing chart depicting operation of the PWM unit during forward rotation of the motor.

FIG. 13 is a timing chart depicting operation of the PWM unit 530 during forward rotation of the motor. There are shown the two clock signals PCL and SDC, the moving direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping unit 535. For each cycle of the clock signal SDC, the counter 531 repeats an operation decrementing the count value CM1 to 0 in sync with the clock signal PCL. The initial value of the count value CM1 is set to the multiplication value Ma. In FIG. 13, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 representing exclusive OR of the positive/negative sign signal Pa and the moving direction value RI. When the motor is running forward, the moving direction value RI is L level. Consequently, the output S2 of the EXOR circuit 533 will be a signal identical to the positive/negative sign signal Pa. The drive waveform shaping unit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is L level is output as the drive signal DRVA1, and the signal during intervals in which the output S2 of the EXOR circuit 533 is H level is output as the drive signal DRVA2. The excitation interval signal Ea falls to L level in proximity to the right end in FIG. 13, thereby setting up a non-excitation interval NEP. Consequently, neither of the drive signals DRVA1, DRVA2 is output during this non-excitation interval NEP, and a state of high impedance is maintained.

Figure 14:
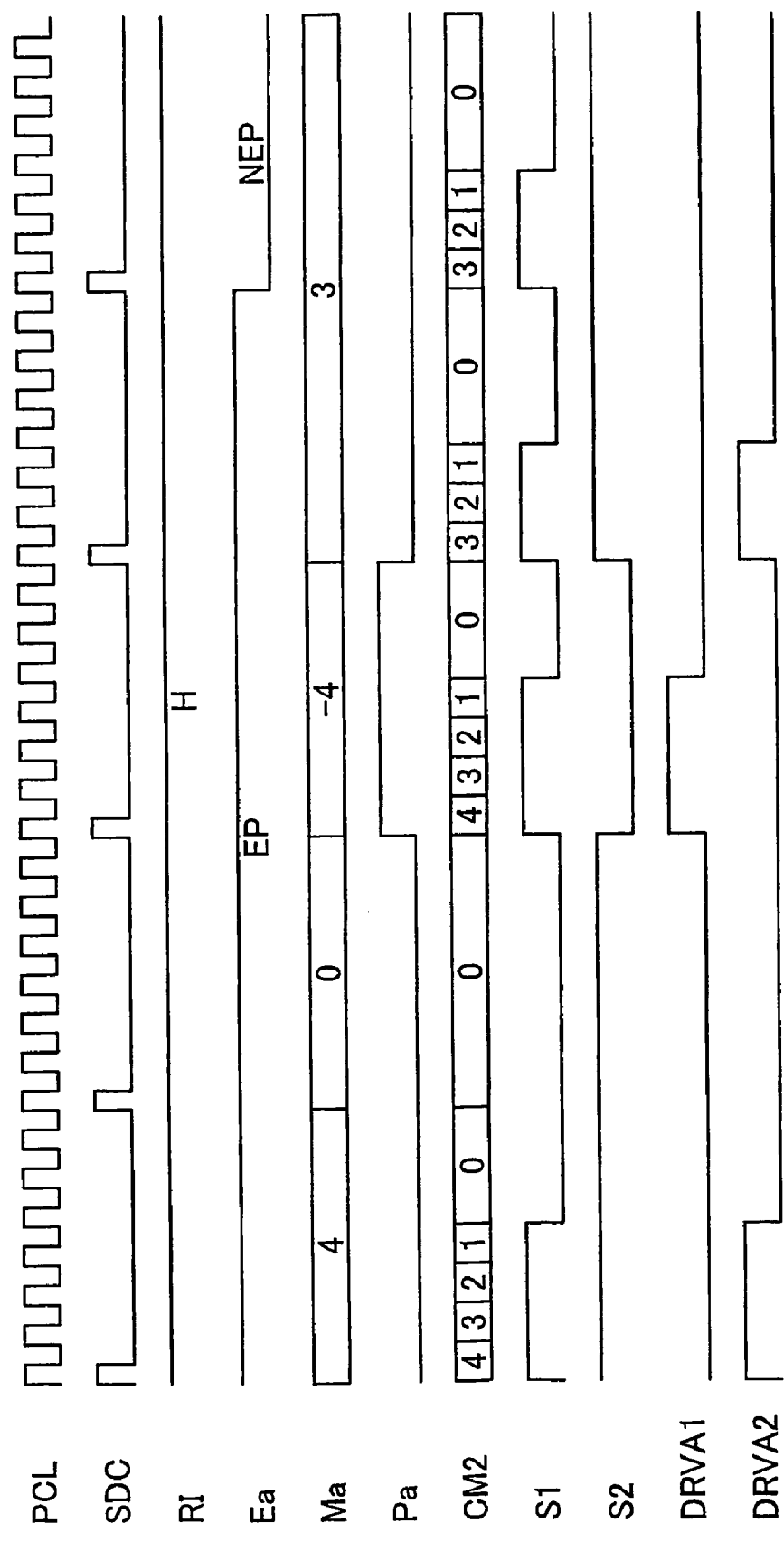
FIG. 14 is a timing chart depicting operation of the PWM unit during reverse rotation of the motor.

FIG. 14 is a timing chart depicting operation of the PWM unit 530 during reverse rotation of the motor. When the motor is running in reverse, the moving direction value RI is H level. As a result, the two drive signals DRVA1, DRVA2 switch position with those in FIG. 13, and it will be appreciated that the motor runs in reverse as a result. The Phase B circuits 532, 534, 536 of the PWM unit 530 operate the same as those discussed above.

Figure 15A:
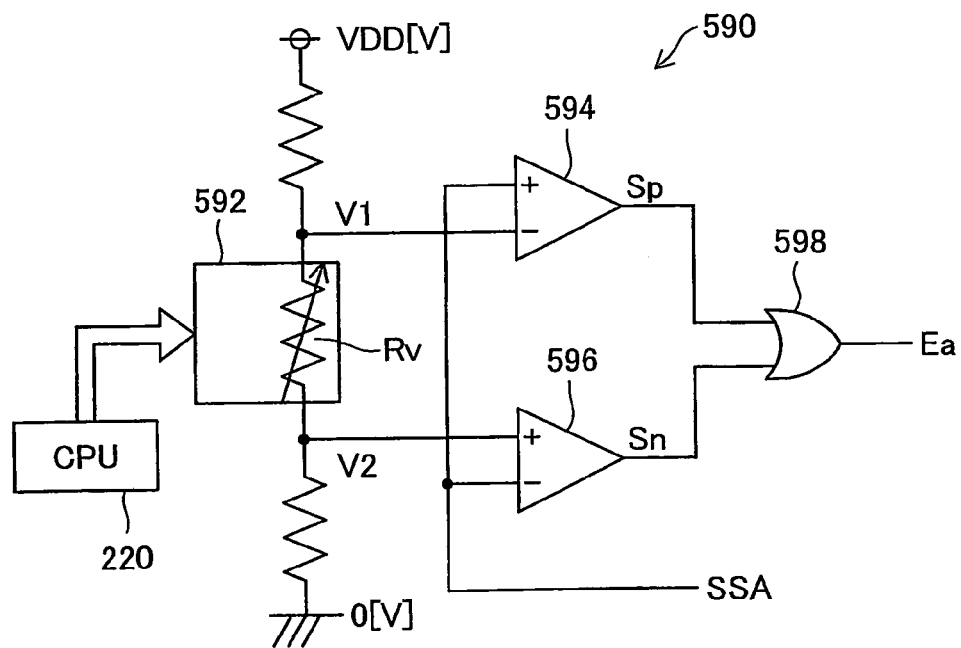
FIGS. 15A and 15B show the internal configuration and operation of an excitation interval setting unit.
Figure 15B:
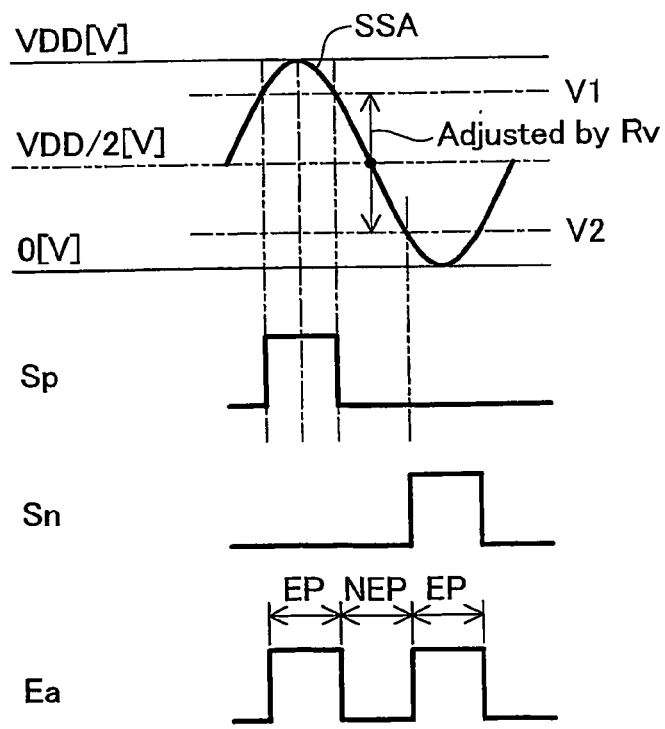

FIGS. 15A and 15B show the internal configuration and operation of the excitation interval setting unit 590. The excitation interval setting unit 590 has an electronic variable resistor 592, voltage comparators 594, 596, and an OR circuit 598. The resistance Rv of the electronic variable resistor 592 is set by the CPU 220. The voltages V1, V2 at the two terminals of the electronic variable resistor 592 are presented to one input terminal of each of the voltage comparators 594, 596. The sensor output SSA is presented to the other input terminal of the voltage comparators 594, 596. In FIG. 15A, for convenience the Phase B circuits have been eliminated from the illustration. The output signals Sp, Sn of the voltage comparators 594, 596 are input to the OR circuit 598. The output of the OR circuit 598 is the excitation interval signal Ea, used for distinguishing excitation intervals from non-excitation intervals.

FIG. 15B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal assuming the logical sum of the these output signals Sp, Sn. Consequently, as shown at bottom in FIG. 15B, the excitation interval signal Ea can be used as a signal indicating excitation intervals EP and non-excitation intervals NEP. The excitation intervals EP and non-excitation intervals NEP are established by means of adjustment of the variable resistance Rv by the CPU 220.

The setting of the excitation interval EP and the non-excitation interval NEP may be executed by any circuitry other than the CPU 220. This is also the case with the function of the CPU 220 as an adjuster unit for adjusting both the control value Ya and the excitation interval signal Ea in response to a request from an external device, such as a motor output request, thereby achieving the required output.

At the startup of the motor, it is preferable that the excitation intervals EP is set as large as possible while the non-excitation intervals NEP is set as small as possible. This is because when the motor is stopping at a position corresponding to the non-excitation interval NEP, the PWM signals are masked by the drive waveform shaping unit 535 (FIG. 12), and the motor may not be able to start. Therefore the non-excitation interval NEP is preferably set at the smallest value in its permissible range at the motor startup. The smallest value of the non-excitation interval NEP is preferably a non-zero value. This is because the zero value of the non-excitation interval NEP may cause a countercurrent in the driver circuit 250 at the timing when the polarity of the sensor output SSA (that is, the polarity of the drive signals) is reversed, thereby damaging the switching transistors.

1-C. Correction of Sensor Output

Figure 16A:
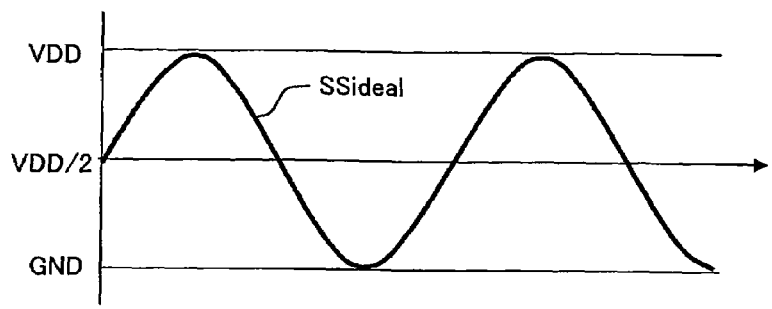
FIGS. 16A through 16C show the specifics of offset correction of sensor output.
Figure 16B:
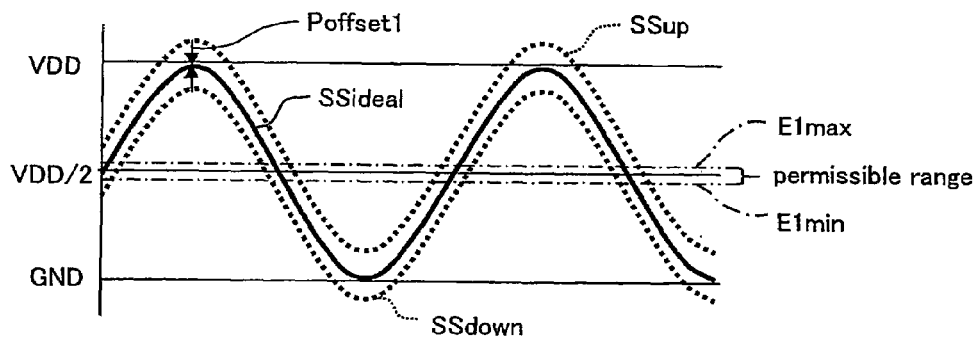
Figure 16C:
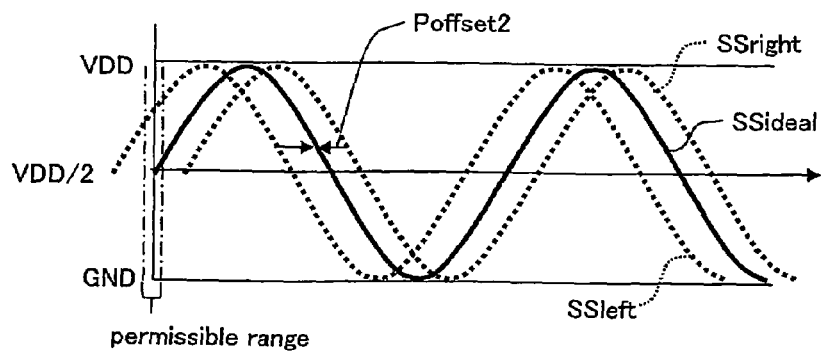

FIGS. 16A to 16C show the specifics of offset correction of sensor output. FIG. 16A shows the desired waveform SSideal of sensor output. FIG. 16B depicts an example of sensor output SSup shifted upward from the desired waveform SSideal, and sensor output SSdown shifted downward. In such instances, by applying vertical offset Poffset1 to the shifted sensor output (e.g. SSup), it can be corrected to a waveform approximating the desired waveform SSideal. This correction is carried out in such a way that, for example, the middle point of the output waveform (the location where output level assumes its median value) falls within a prescribed permissible range, from the median value VDD/2 of the sensor output voltage range (GND to VDD).

FIG. 16C depicts an example of sensor output SSright shifted rightward from the desired waveform SSideal, and sensor output SSleft shifted leftward. In such instances, by applying sideways offset Poffset2 to the shifted sensor output (e.g. SSright), it can be corrected to a waveform approximating the desired waveform SSideal. This correction is carried out in such a way that the phase of the middle point of the output waveform (the location where output level assumes its median value) falls within a prescribed permissible range, from the phase of the median value VDD/2 of the sensor output voltage range (GND to VDD). The determination as to whether the sensor output is offset to the sideways direction can be made by stopping the rotor of the motor at a prescribed reference location (the location that should properly be the middle point of the output waveform), and checking whether the sensor output is equal to the median value VDD/2 of the sensor output voltage range.

In this way it is possible to correct both vertical offset Poffset1 and sideways offset Poffset2. However, in many instances it will suffice for practical purposes to correct only one of these two types of offset. Accordingly, in the procedure described below, it is assumed that, of the two types of offset, only vertical offset Poffset1 is to be corrected.

Figure 17A:
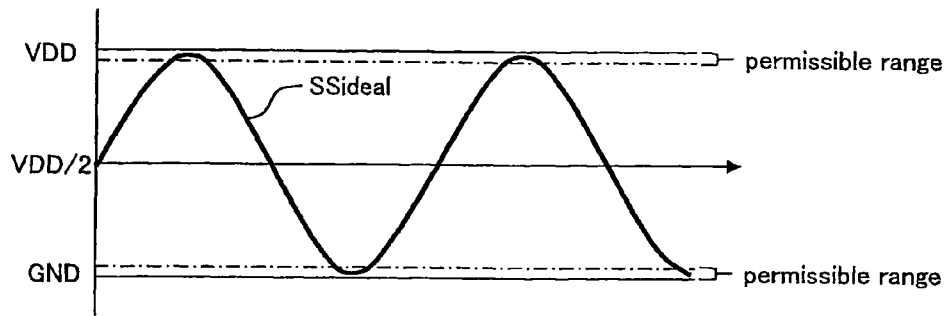
FIGS. 17A through 17C show the specifics of gain correction of sensor output.
Figure 17B:
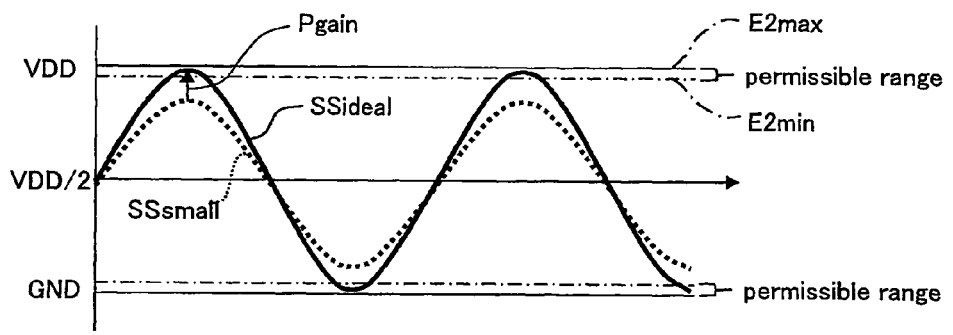
Figure 17C:
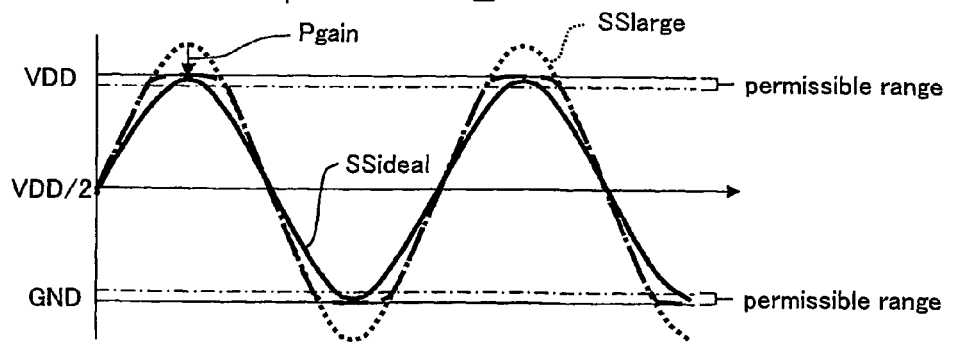

FIGS. 17A to 17C show the specifics of gain correction of sensor output. FIG. 17A depicts the desired output waveform SSideal for sensor output; it is the same as that in FIG. 16A. FIG. 17B depicts a sensor output waveform SSmall having a smaller peak than the desired output waveform SSideal. In this case, by multiplying the sensor output waveform SSmall by gain Pgain greater than 1, it can be corrected to a waveform approximating the desired waveform SSideal. More specifically, this gain correction is carried out in such a way that the peak value of the corrected sensor output falls within a prescribed permissible range. FIG. 17C depicts a sensor output waveform SSlarge having a larger peak than the desired output waveform SSideal. With this sensor output waveform SSlarge, since points that would go above the maximum value VDD of the voltage range (i.e. the power supply voltage) come to a halt at VDD, the peaks are observed to have a flattened waveform as indicated by the dot-and-dash line. In this case, by multiplying the sensor output waveform SSlarge by gain Pgain smaller than 1, it can be corrected to a waveform approximating the desired waveform SSideal.

Figure 18:
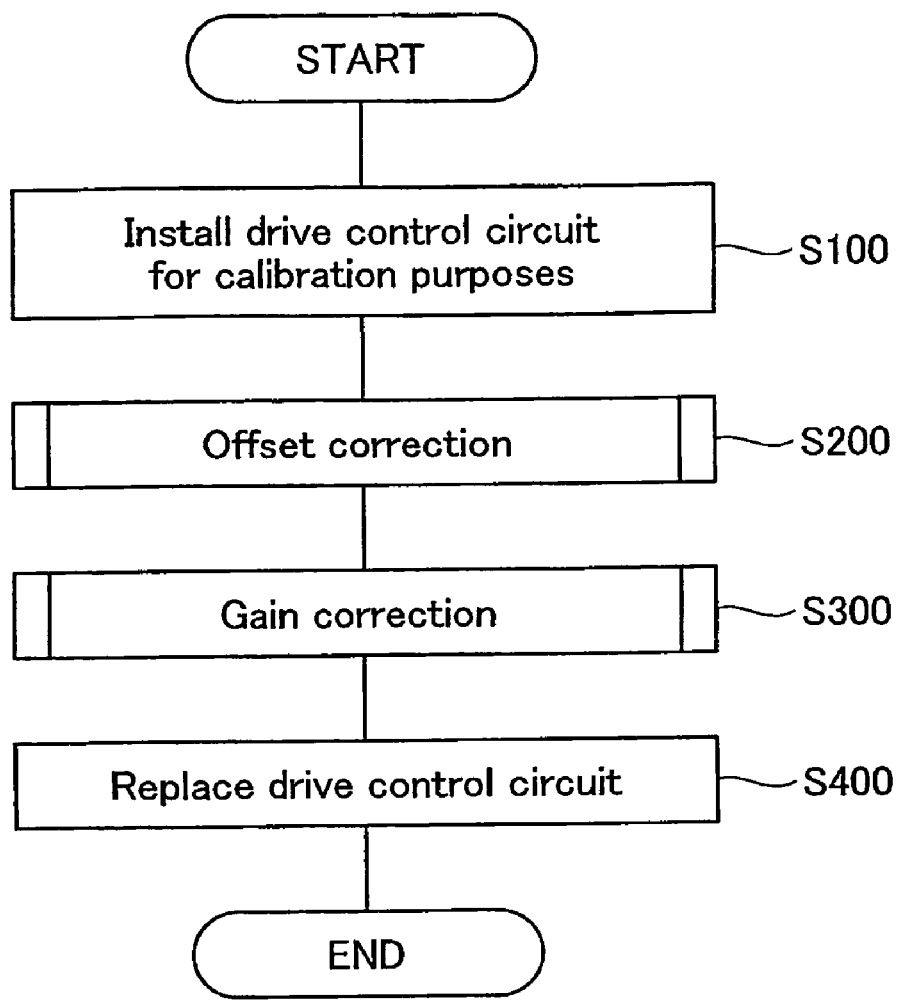
FIG. 18 is a flowchart depicting the calibration procedure of sensor output.

FIG. 18 is a flowchart depicting the calibration procedure of sensor output. In Step S100, the drive control circuit 200 for calibration purposes is installed in the motor unit 100 (FIG. 7A). In Step S200, offset correction as described in FIG. 16B is performed, and in Step S300 gain correction as described in FIGS. 17B and 17C is performed. In Step S400, the drive control circuit is replaced with the circuit 300 for actual use (FIG. 7B).

Figure 19:
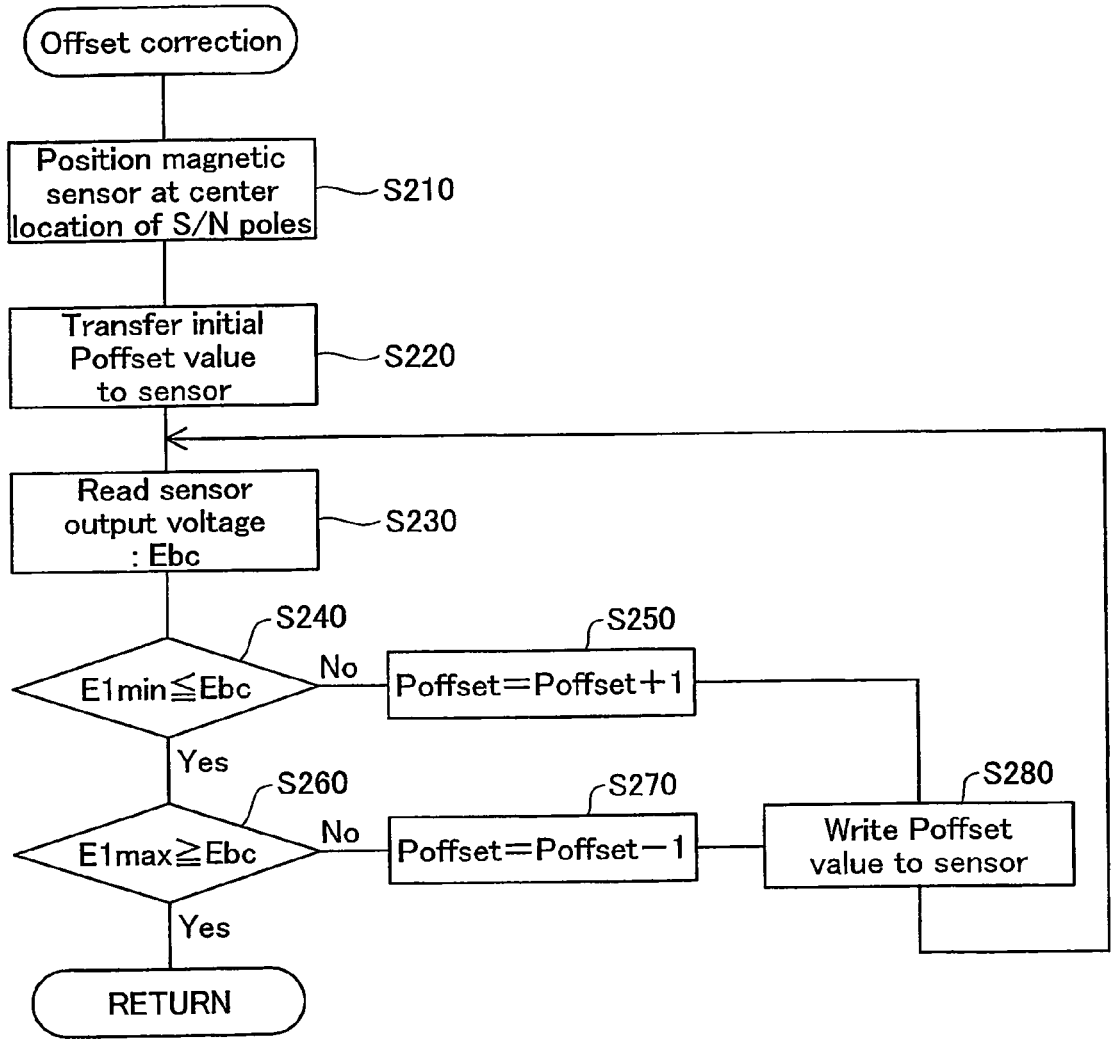
FIG. 19 is a flowchart depicting in detail the procedure of offset correction.

FIG. 19 is a flowchart depicting in detail the procedure of offset correction. While the following description pertains to offset correction of the Phase A sensor, correction would be performed in the same way for the Phase B sensor. When offset correction is performed for one magnetic sensor, the ID of the magnetic sensor targeted for correction is initially specified by the CPU 220, and the correction process is initiated for the specified magnetic sensor.

In Step S210, the rotor unit 30 (FIG. 1A) is rotated and halted where the magnetic sensor 16A is at the location of a magnet N/S pole boundary. This operation can be carried out manually, with the cover of the motor unit open, for example. In Step S220, an initial value of offset Poffset is transmitted from the drive control circuit 200 to the magnetic sensor 16A and stored in the offset memory 440 (FIG. 9) in the magnetic sensor 16A. Any value can be used as the initial value for Poffset. However in preferred practice the initial value will be set to a positive non-zero value, so as permit increase or decrease of the offset Poffset by means of offset correction.

In Step S230, the voltage Ebc of the output signal SSA output by the magnetic sensor 16A is measured. In Step S240, it is decided whether the measured voltage Ebc is equal to or greater than the minimum value E1min (see FIG. 16B) of a permissible range. In the event that the voltage Ebc is smaller than the minimum value E1min of the permissible range, since the voltage Ebc falls outside of the permissible range, the routine moves to Step S250, the offset value Poffset is incremented by one, and then in Step S280 the offset value Poffset is written to the magnetic sensor 16A. On the other hand, in the event that the voltage Ebc is equal to or greater than the minimum value E1min of the permissible range in Step S240, it is then decided in Step S260 whether the voltage Ebc is equal to or less than the maximum value E1max of the permissible range. In the event that the voltage Ebc is greater than the maximum value E1max of the permissible range, since the voltage Ebc falls outside of the permissible range, the routine moves to Step S270, the offset value Poffset is decremented by one, and then in Step S280 the offset value Poffset is written to the magnetic sensor 16A. If on the other hand in Step S260 the voltage Ebc is equal to or less than the maximum value E1max of the permissible range, the voltage Ebc falls within the permissible range, and therefore the process of FIG. 19 terminates.

Figure 20:
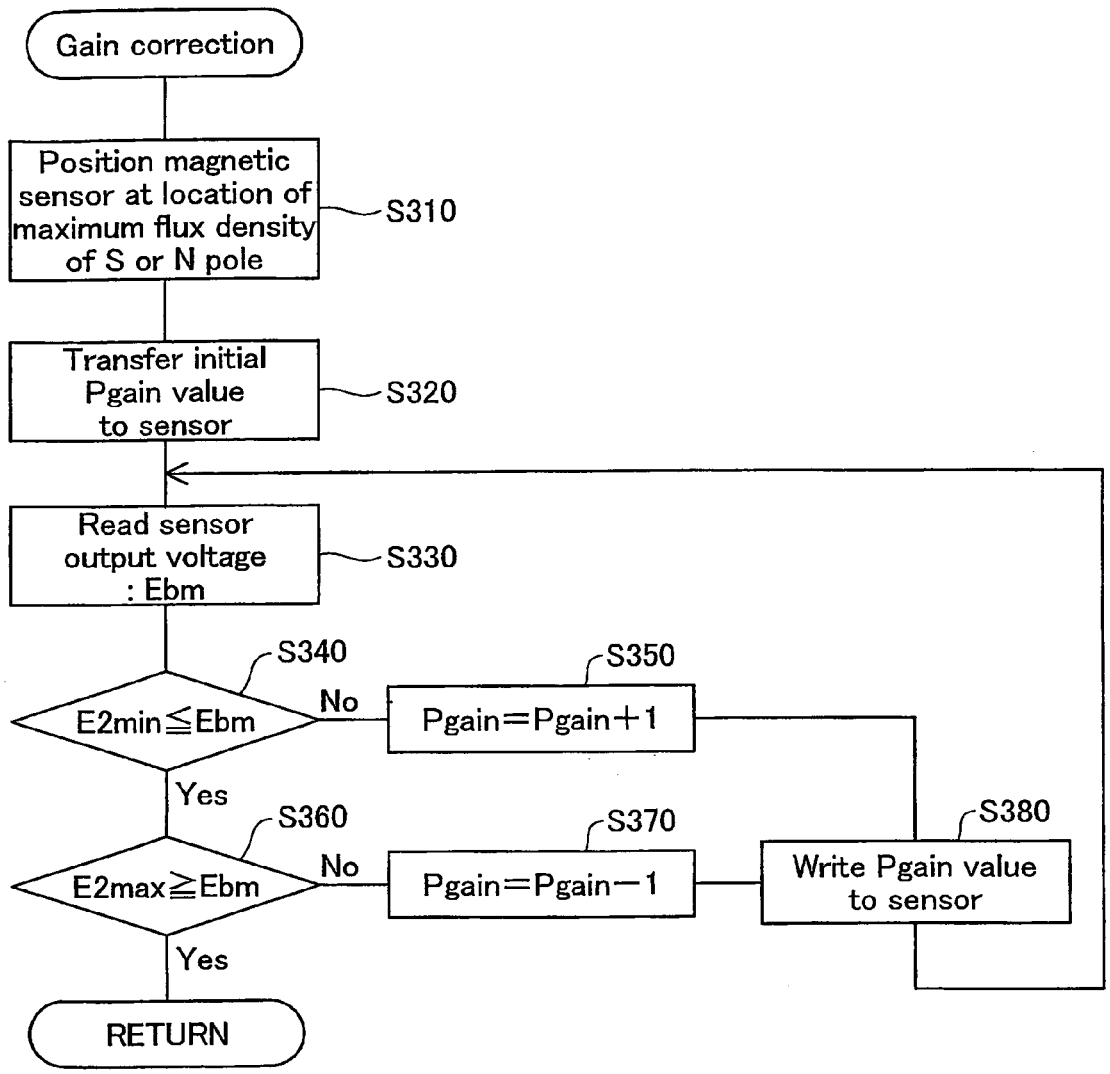
FIG. 20 is a flowchart depicting in detail the procedure of gain correction.

FIG. 20 is a flowchart depicting in detail the procedure of gain correction in Step S300. With regard to gain correction as well, only correction of the Phase A sensor will be discussed. When gain correction is carried out for one sensor, the ID of the magnetic sensor targeted for correction is initially specified by the CPU 220, and the correction process is initiated for the specified magnetic sensor.

In Step S310, the rotor unit 30 (FIG. 1A) is rotated and halted where the magnetic sensor 16A is at a location directly opposite the S pole or N pole of a magnet. This location is the location of maximum magnetic flux density of the magnetic sensor 16A. This operation can be carried out manually, with the cover of the motor unit open, for example. In Step S320, an initial value of gain Pgain is transmitted from the drive control circuit 200 to the magnetic sensor 16A and stored in the gain memory 450 (FIG. 9) in the magnetic sensor 16A. While any value can be used as the initial value for gain Pgain, in preferred practice it will be set to a positive non-zero value.

In Step S330, the voltage Ebm of the output signal SSA of the magnetic sensor 16A is measured. In Step S340, it is decided whether the measured voltage Ebm is equal to or greater than the minimum value E2min (see FIG. 17B) of a permissible range. In the event that the voltage Ebm is smaller than the minimum value E2min of the permissible range, since the voltage Ebm falls outside of the permissible range, the routine moves to Step S350, the gain value Pgain is incremented by one, and then in Step S380 the gain value Pgain is written to the magnetic sensor 16A. On the other hand, in the event that the voltage Ebm is equal to or greater than the minimum value E2min of the permissible range in Step S340, it is then decided in Step S360 whether the voltage Ebm is equal to or less than the maximum value E2max of the permissible range. In the event that the voltage Ebm is greater than the maximum value E2max of the permissible range, since the voltage Ebm falls outside of the permissible range, the routine moves to Step S370, the gain value Pgain is decremented by one, and then in Step S380 the gain value Pgain is written to the magnetic sensor 16A. If on the other hand in Step S360 the voltage Ebm is equal to or less than the maximum value E2max of the permissible range, the voltage Ebm falls within the permissible range, and therefore the process of FIG. 20 terminates.

In preferred practice, the maximum value E2max of the permissible range during gain correction will be a value slightly smaller than the maximum value possible for sensor output (i.e. the power supply voltage VDD). The reason is that since sensor output voltage cannot go above the power supply voltage VDD, if the maximum value E2max of the permissible range is set to the power supply voltage VDD, there exists a possibility that it will not be possible to determine if the peak of the sensor output SSA prior to correction is flattened as depicted by the dot-and-dash line in FIG. 17C.

In this way, with the electric motor of the present embodiment, it is possible for offset correction and gain correction of output waveform to be carried out respectively, for the respective magnetic sensors 16A, 26B. Moreover, the drive control circuit 300 generates drive signals utilizing continuous change in analog output of the sensors. Consequently, through correction of the output of the magnetic sensors 16A, 26B to prescribed waveform shape, it is possible to achieve a high efficiency motor that experiences minimal noise and vibration.

1-D. Modification Example of Drive Control Circuit

Figure 21:
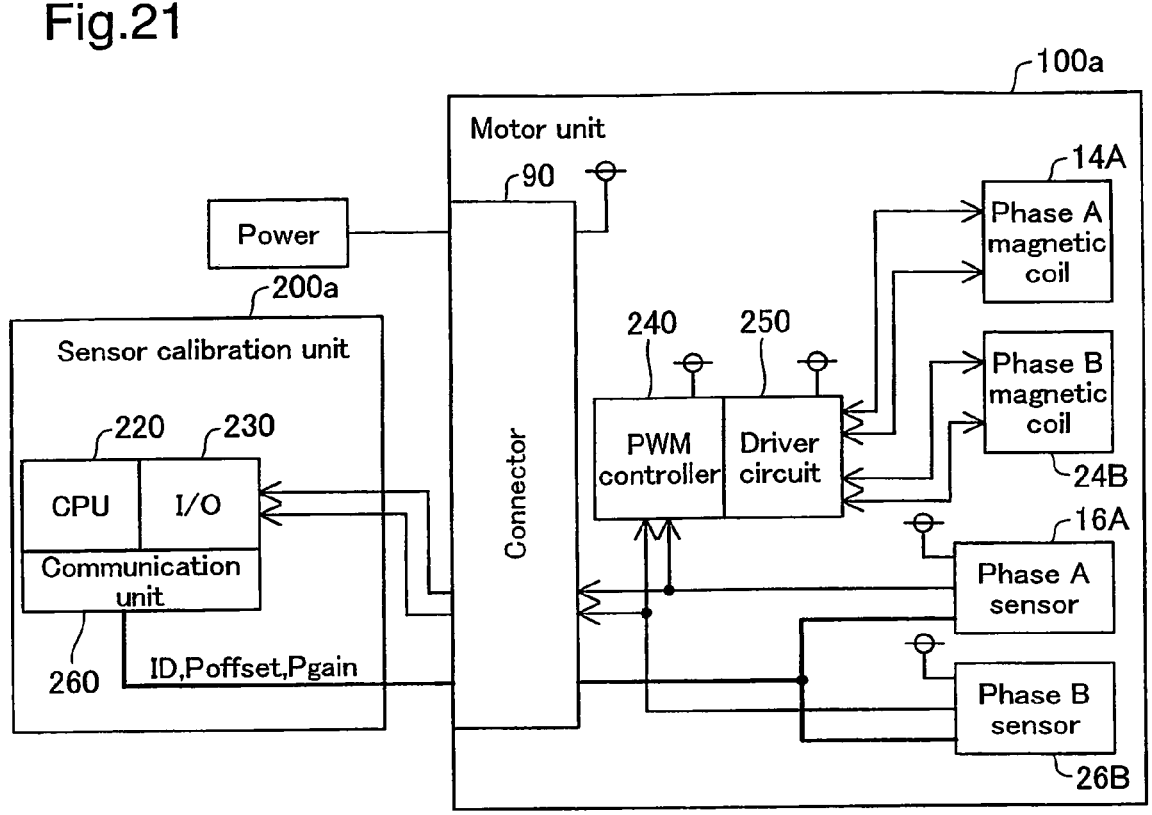
FIG. 21 is a block diagram depicting a modification example of the drive control circuit for calibration.

FIG. 21 is a block diagram depicting a modification example of the drive control circuit for calibration. This drive control circuit 200a is similar to the drive control circuit 200 depicted in FIG. 7A, but omits the power supply circuit 210, the PWM controller 240, and the driver circuit 250. Power to the motor unit 100a is supplied directly to the motor unit 100a via the connector 90. The PWM controller 240 and the driver circuit 250 are provided inside the motor unit 100a. With this arrangement as well, sensor waveform can be corrected and the motor operated with high efficiency, in the same manner as the motor depicted in FIGS. 7A and 7B.

Figure 22:
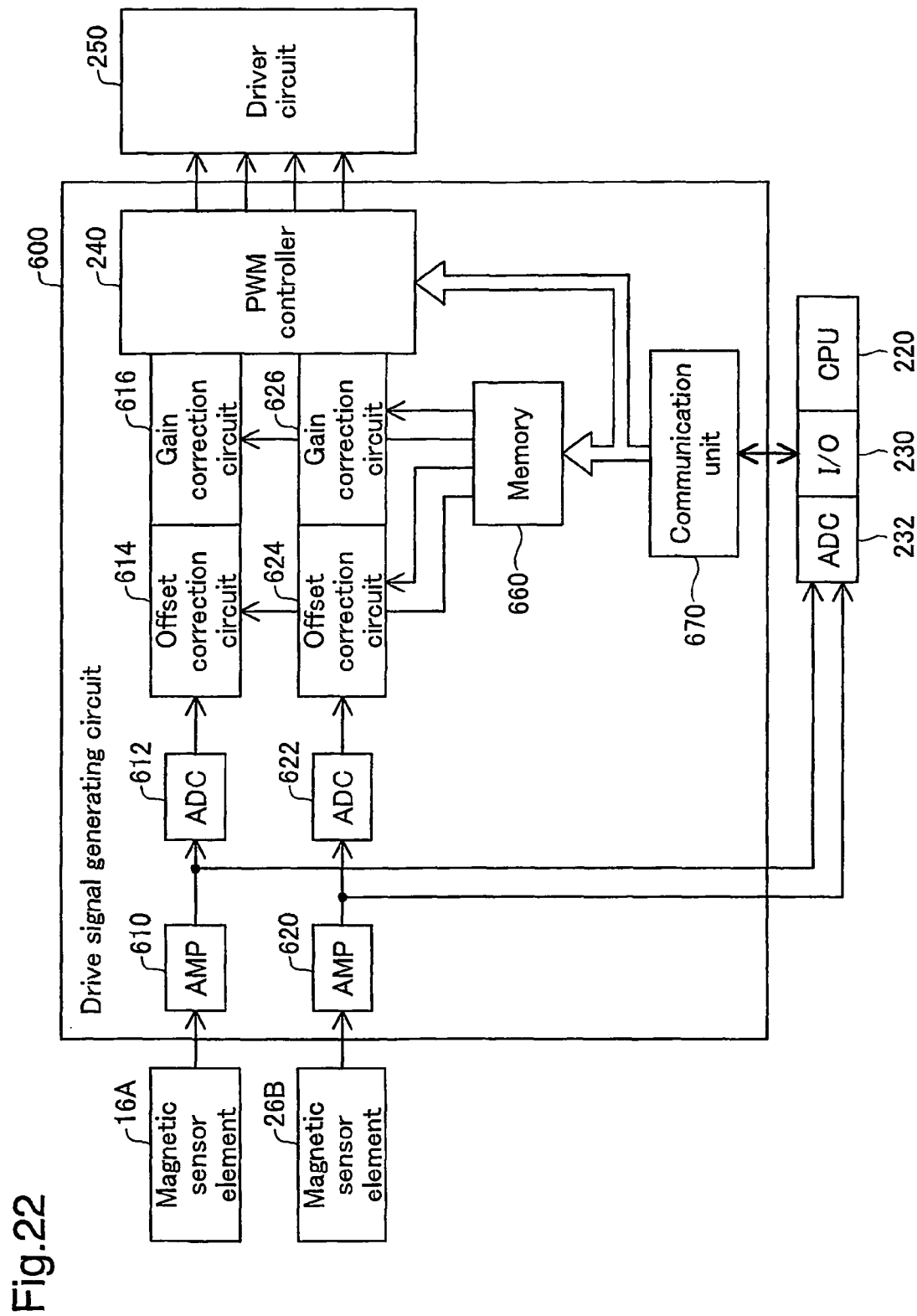
FIG. 22 is a block diagram depicting magnetic sensors and a drive signal generating circuit in a modification example of Embodiment 1.

FIG. 22 is a block diagram depicting the magnetic sensors and drive signal generating circuit in another modification example of Embodiment 1. In this modification example, the magnetic sensors 16A, 26B contain magnetic sensor elements only; the other circuit elements 420-480 within the magnetic sensors depicted in FIG. 9 are not included in these magnetic sensors. The drive signal generating circuit 600 has amplifiers 610, 620, AD converters 612, 622, offset correction circuits 614, 624, gain correction circuits 616, 626, a PWM controller 240, a correction value memory 660, and a communication unit 670. The offset correction circuits 614, 624 are the same as the offset correction circuit 420 shown in FIG. 9, and the gain correction circuits 616, 626 are the same as the gain correction circuit 430 shown in FIG. 9. The correction value memory 660 stores offset correction values and gain correction values relating to both the Phase A sensor 16A and the Phase B sensor 26B, with these values being associated with the respective ID codes. The PWM controller 240 is the same as that shown in FIG. 10A. The communication unit 670 is coupled to the CPU 220 via the I/O interface 230. During calibration, the outputs of the sensors 16A, 26B are amplified by the amplifiers 610, 620, converted to a digital signal by the AD converter 232, and presented to the CPU 220 via the I/O interface 230.

With the circuit design of FIG. 22, it is possible, for example, for the drive signal generating circuit 600 and the driver circuit 250 to be installed in the motor unit, and for a circuit including the CPU 220, the I/O interface 230, and the AD converter 232 to connect with the connector 90 of the motor unit (FIG. 7A). With this circuit design, as with the embodiment discussed previously, it is possible for sensor waveform to be corrected and the motor operated with high efficiency.

Figure 23:
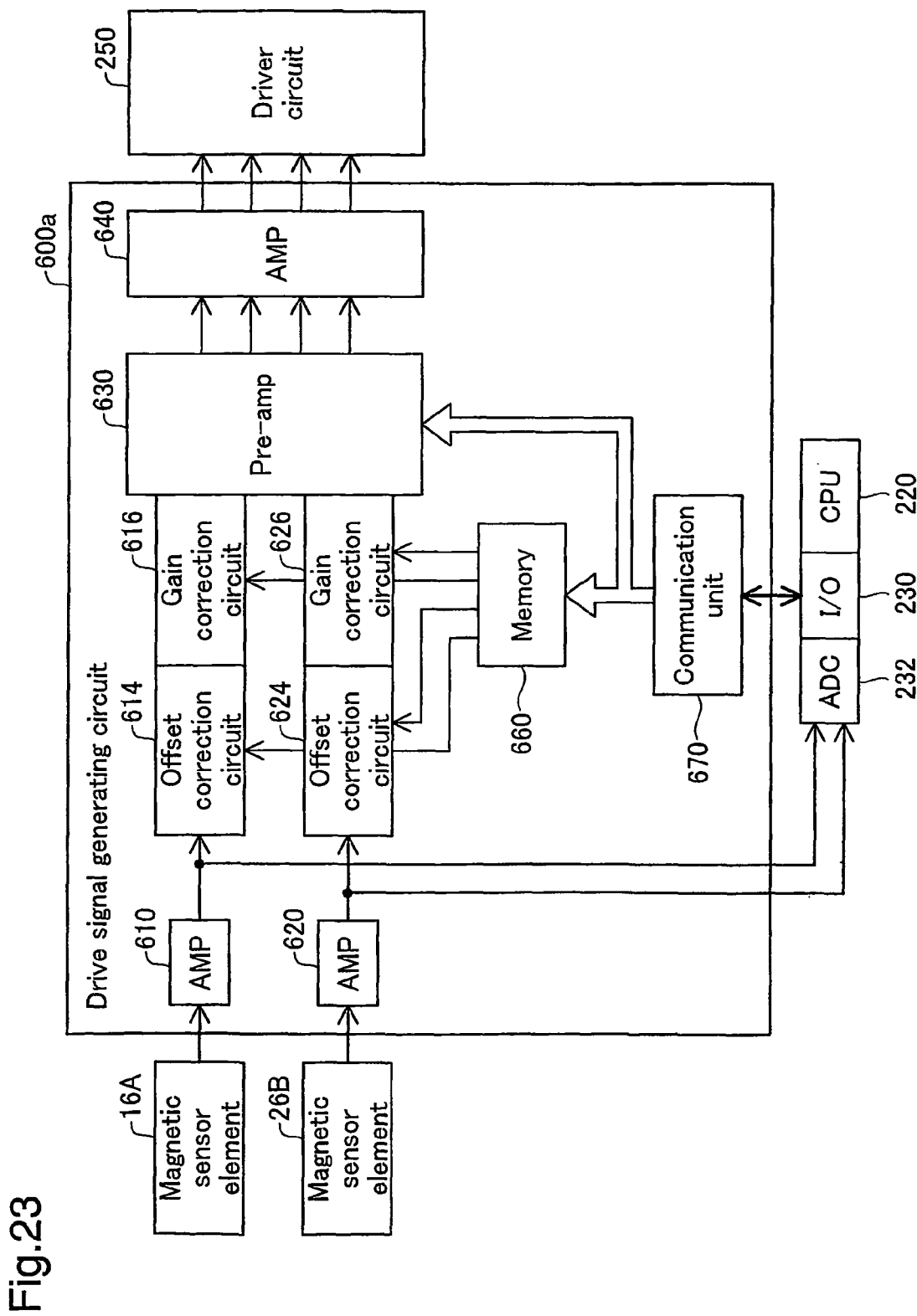
FIG. 23 is a block diagram depicting another modification example of the drive signal generating circuit.

FIG. 23 is a block diagram depicting a modification example of the drive signal generating circuit. In this drive signal generating circuit 600a, the PWM controller 240 of the drive signal generating circuit 600 shown in FIG. 22 is replaced with a pre-amplifier 630 and an amplifier 640. The configuration is otherwise the same as that shown in FIG. 22. The pre-amp 630 and the amp 640 generate drive signals by amplifying as-is the corrected analog sensor outputs. In this way, even where sensor output is amplified using analog circuits and without employing PWM control, it is possible nevertheless to operate the motor with high efficiency, by means of carrying out correction of sensor waveform as described above.

1-E. Other Procedure for Implementing Sensor Output Correction

Figure 24:
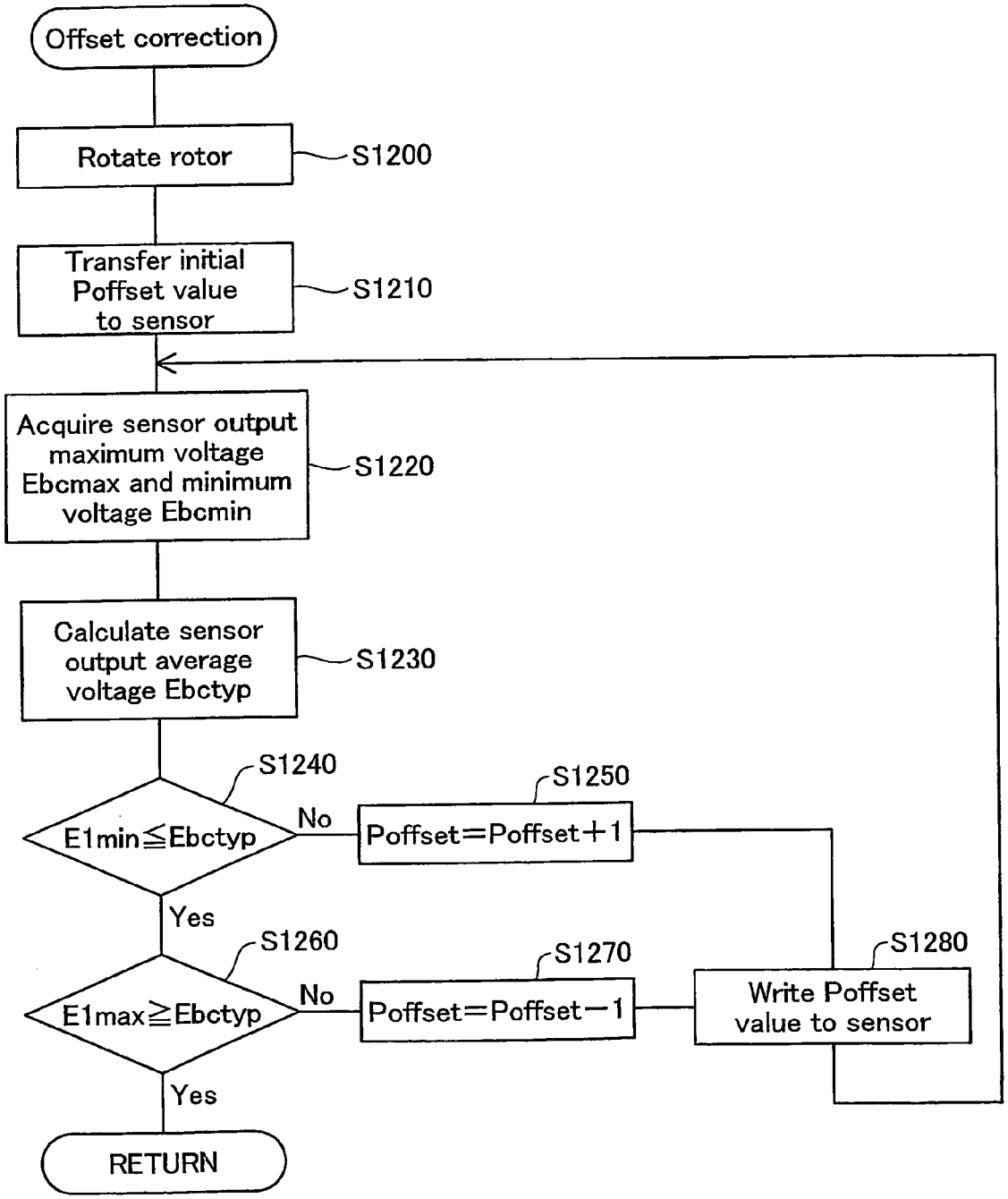
FIG. 24 is a flowchart depicting another procedure for carrying out offset correction.

FIG. 24 is a flowchart depicting another procedure for carrying out offset correction. In Step S1200, the CPU 220 rotates the rotor 30. In the procedure of FIG. 24, with the rotor 30 continuing to rotate, the CPU 220 executes offset correction beginning with Step S1210. In Step S1210, an initial value of offset Poffset is sent from the drive control circuit 200 to the magnetic sensor 16A, and is stored in the offset memory 440 (FIG. 9) of the magnetic sensor 16A. This process is the same as Step S220 of FIG. 19.

In Step S1220, the maximum voltage Ebcmax and minimum voltage Ebcmin of sensor output are acquired. These voltages Ebcmax, Ebcmin correspond to the upper peak value and lower peak value of the sensor output SSup (or SSdown) shown in FIG. 16B, for example. In Step S1230, an average value Ebctyp of the maximum voltage Ebcmax and minimum voltage Ebcmin is calculated. This average value Ebctyp is a voltage value corresponding to the middle point of the sensor output waveform.

Steps S1240 to S1280 are substantially identical to Steps S240 to S280 of FIG. 19, but with the average value Ebctyp mentioned above replacing the voltage value Ebc of FIG. 19. Specifically, in Steps S1240 to S1280, the offset value Poffset is adjusted so that the average value Ebctyp lies within the permissible range shown in FIG. 16B.

As will be understood from this example, it is also possible for offset correction to be carried out utilizing the peak voltage of sensor voltage. In the procedure of FIG. 24, there is no need to position the rotor at a location corresponding to a point of interest of the sensor output waveform as in the procedure of FIG. 19, and a resultant advantage is that the correction operation is easier.

Figure 25:
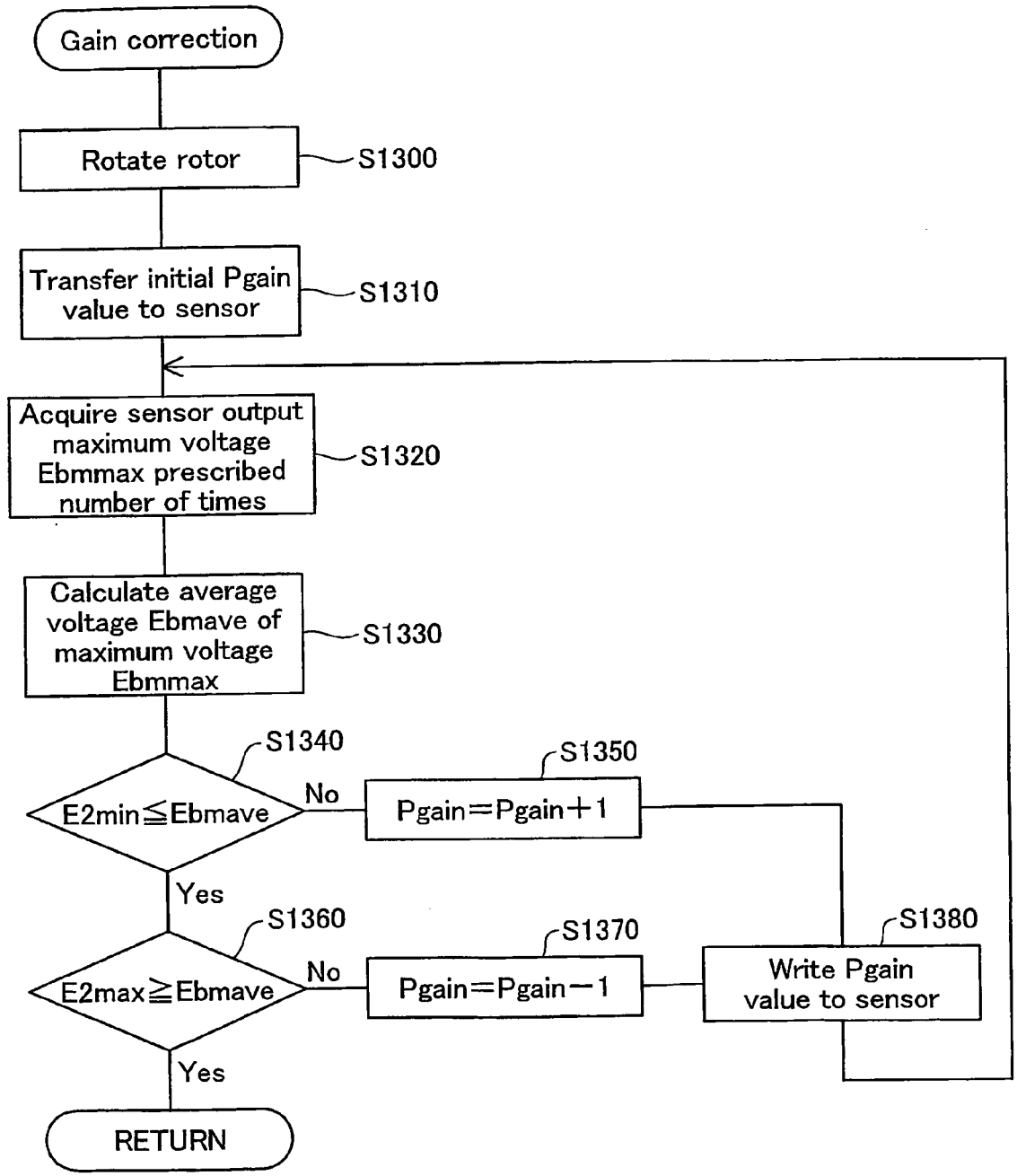
FIG. 25 is a flowchart depicting another procedure for carrying out gain correction.

FIG. 25 is a flowchart depicting another procedure for carrying out gain correction. In Step S1300, the CPU 220 rotates the rotor 30. In the procedure of FIG. 25, with the rotor 30 continuing to rotate, the CPU 220 executes gain correction beginning with Step S1310. In Step S1310, an initial value of gain Pgain is sent from the drive control circuit 200 to the magnetic sensor 16A, and is stored in the gain memory 450 (FIG. 9) of the magnetic sensor 16A. This process is the same as Step S320 of FIG. 20.

In Step S1320, the maximum voltage Ebmmax of sensor output is acquired a prescribed number of times. This maximum voltage Ebmmax corresponds, for example, to the upper peak value of the sensor output SSsmall shown in FIG. 17B (or SSlarge of FIG. 17C). Alternatively, instead of the upper peak value, the lower peak value may be acquired a prescribed number of times. The number of times that the upper peak value appears in the course of one revolution of the rotor is equal to one-half the pole number P of the motor. With the 6-pole motor depicted in FIGS. 1A to 1D, the upper peak value will appear three times in the course of one revolution. In Step S1320, in preferred practice maximum voltage Ebmmax will be sampled (P×N)/2 times. Here, N is a prescribed integer equal to 1 or greater, preferably 2 or greater. In Step S1230, an average value Ebmave is calculated for the (P×N)/2 sampled maximum voltages Ebmmax.

Steps S1340 to S1380 are substantially identical to Steps S340 to S380 of FIG. 20, but with the average value Ebmave mentioned above replacing the voltage value Ebm of FIG. 20. Specifically, in Steps S1340 to S1380, the gain value Pgain is adjusted so that the average value Ecmave lies within the permissible range shown in FIG. 17B.

In the procedure of FIG. 25, there is no need to position the rotor at a location corresponding to a point of interest of the sensor output waveform as in the procedure of FIG. 20, and a resultant advantage is that the correction operation is easier. Moreover, since gain correction is carried out using an average value of several peak voltages, it is possible to establish ideal gain in consideration of the multiple magnets overall.

Figure 26:
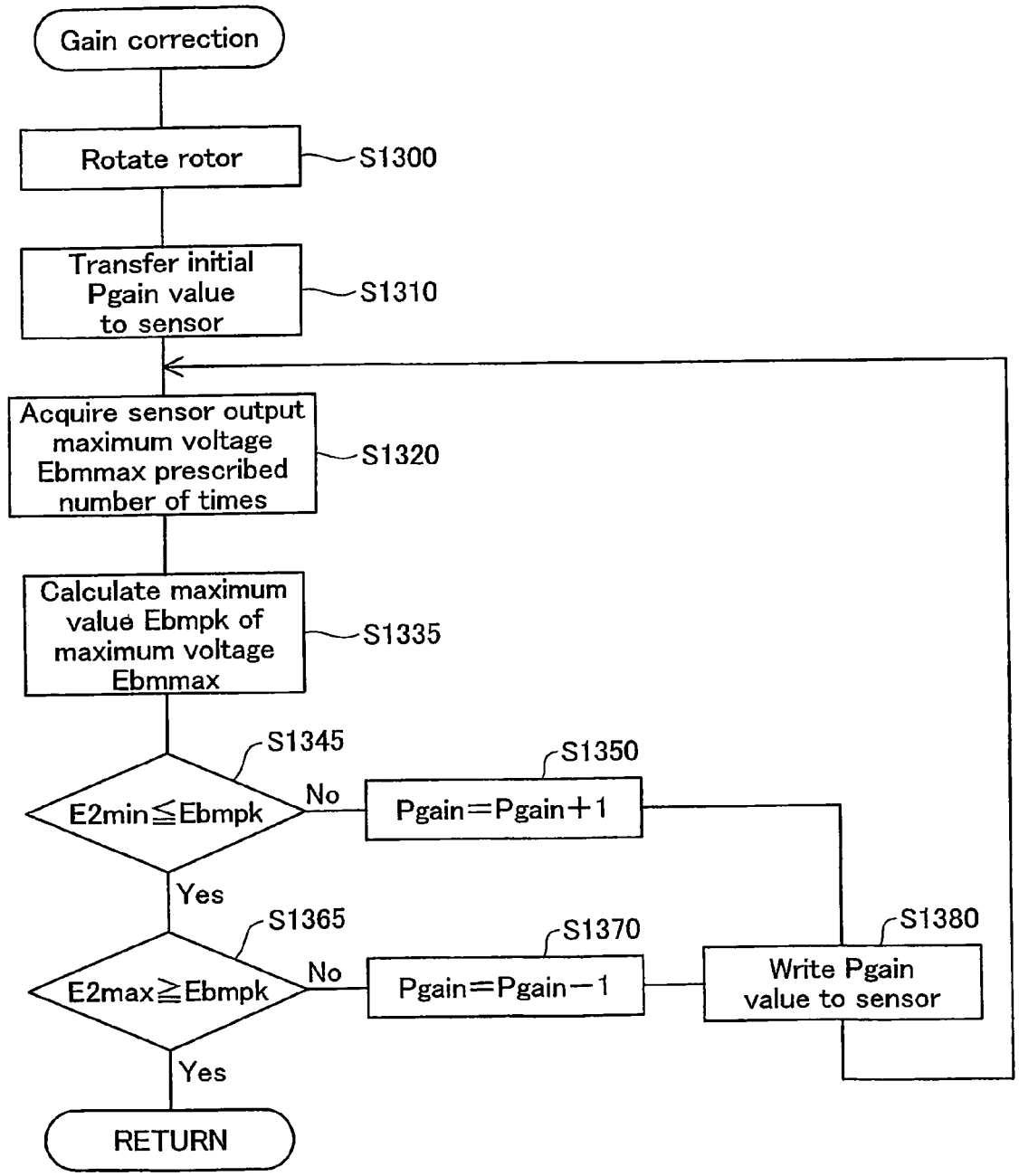
FIG. 26 is a flowchart depicting yet another procedure for carrying out gain correction.

FIG. 26 is a flowchart depicting yet another procedure for carrying out gain correction. In the procedure of FIG. 26, Steps S1330, S1340, and S1360 of FIG. 25 are replaced by Steps S1335, S1345, and S1365, but the procedure is otherwise the same as in FIG. 25.

In Step S1335, a maximum voltage Ebmpk is selected from among the (P×N)/2 maximum voltages Ebmmax. In Steps S1345 and S1365, gain correction is carried out using this maximum voltage Ebmpk. It is possible to derive appropriate gain correction values Pgain in this manner as well.

The values of the threshold values E2min and E2max used in Steps S1345 and S1365 of FIG. 26 can be different from those of the threshold values E2min and E2max used in Steps S1340 and S1360 of FIG. 25.

2. Embodiment 2

Figure 27:
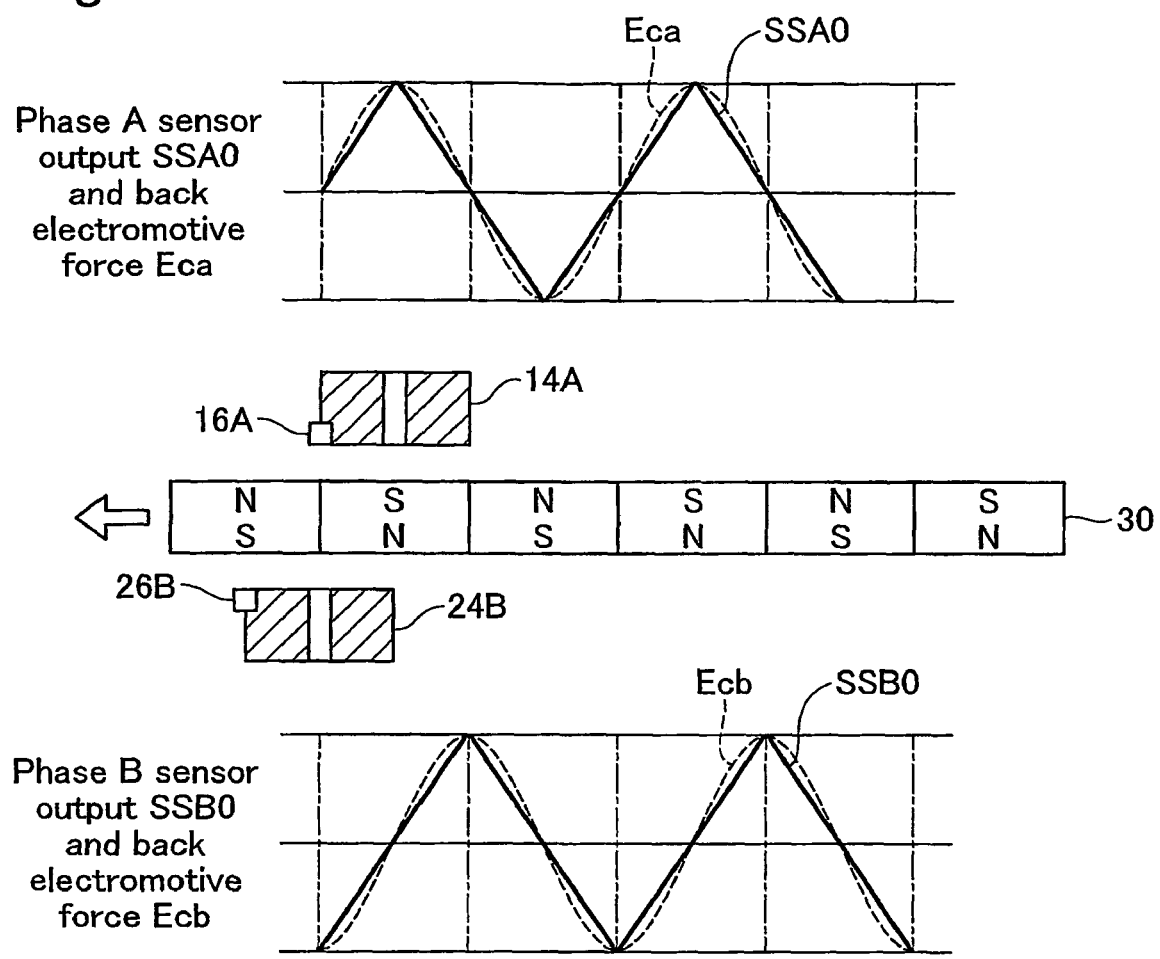
FIG. 27 shows magnetic sensor output waveforms and back electromotive force of the coils in Embodiment 2.

FIG. 27 is an illustration depicting an example of magnetic sensor output waveforms and back electromotive force of the coils in Embodiment 2. In this example, the Phase A sensor output SSA0 and the Phase B sensor output SSB0 prior to correction both have waveform shape somewhat different from the back electromotive force waveform. The waveforms of the Phase A coil back electromotive force Eca and the Phase B coil back electromotive force Ecb are dependent upon the shape of the coils and the positional relationship of the magnets and the coils, but are typically sine waves or shapes very close to a sine wave.

As noted in Embodiment 1, where a motor is driven through application of voltage having the same waveform as the back electromotive force, efficiency of the motor can be improved, and vibration and noise can be reduced. For this reason, in Embodiment 2, the waveforms of the sensor outputs SSA0, SSB0 shown in FIG. 27 are corrected to waveforms approximating that of back electromotive force, and the corrected sensor outputs are used for driving the motor.

Figure 28A:
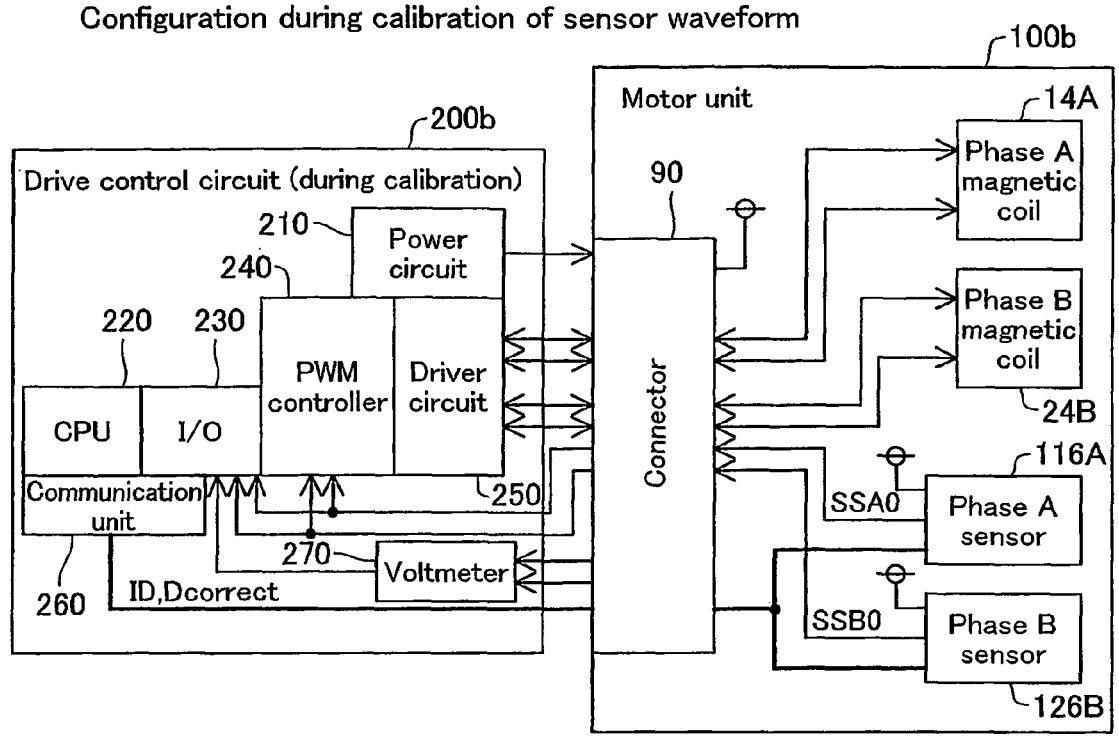
FIGS. 28A and 28B show block diagrams depicting the configuration of a drive control circuit of the motor of Embodiment 2.
Figure 28B:
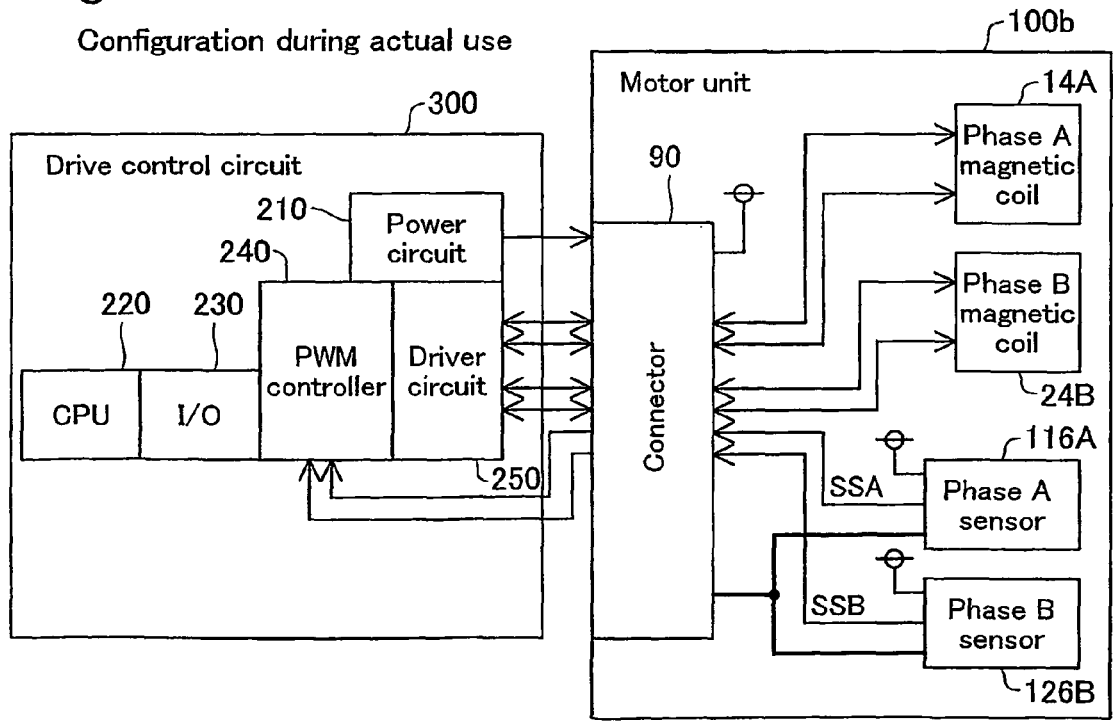

FIGS. 28A and 28B are block diagrams depicting the configuration of drive control circuits for the motor of Embodiment 2. FIG. 28A depicts the configuration during calibration of sensor waveform, and FIG. 28B depicts the configuration during actual use. "Calibration of sensor waveform" is used synonymously with "correction of sensor output waveform."

As shown in FIG. 28A, during calibration, a drive control circuit 200b for calibration purposes is connected to the connector 90 of the motor unit 100b. This drive control circuit 200b has a power circuit 210, a CPU 220, an I/O interface 230, a PWM controller 240, a driver circuit 250, a communication unit 260, and a voltmeter 270. The power circuit 210 supplies power to the circuits in the drive control circuit 200b and to the motor unit 100b. The CPU 220 controls the operation of the drive control circuit 200b by means of making settings in the various circuits in the drive control circuit 200b. The I/O interface 230 has the function of receiving sensor outputs SSA0, SSB0 supplied from the motor unit 100b, and supplying these to the CPU 2220. The CPU 220 determines correction data Dcorrect for correcting the sensor outputs SSA0, SSB0 to the desired waveform shape (back electromotive force waveform or sine wave). The content of this correction data Dcorrect and the method for determining it will be discussed later. The configuration of the motor unit 100b is substantially identical to that of the motor unit 100 of Embodiment 1 shown in FIG. 7A, differing only in terms of the internal configuration of the sensors 116A, 126B (described later). The drive control circuit 200b is similar to the drive control circuit 200 of Embodiment 1 shown in FIG. 7A, except for addition of the voltmeter 270.

The PWM controller 240 generates a PWM signal for driving the coils. The driver circuit 250 is a bridge circuit for driving the coils. The communication unit 260 has a function whereby the sensors 116A, 126B are presented with and store in memory the correction data Dcorrect that is determined through calibration. The communication unit 260 also has a function for transmitting the correction data Dcorrect stored in the sensors 116A, 126B to an external device. In order to distinguish between correction data for the Phase A sensor 116A and correction data for the Phase B sensor 126B, the communication unit 260 sends and receives an ID code (identification signal) for each sensor, together with the correction data. Where correction data is transmitted using ID codes in this way, it is possible to transmit correction data for multiple sensors via a single communication bus, while distinguishing the sets of data from each other.

The voltmeter 270 is capable of measuring the back electromotive force of the Phase A coil array 14A and the Phase B coil array 24B respectively. This voltmeter 270 is connected to the coil arrays through the connection relationship described in FIG. 4. It is not necessary for the voltmeter 270 to simultaneously measure back electromotive force of the Phase A coil array and the Phase B coil array; it is sufficient for it to switch between the coil arrays targeted for measurement and measure them individually. As will be discussed later, the CPU 220 determines the correction data Dcorrect on the basis of the waveform shape of back electromotive force measured by the voltmeter 270, and the output waveforms of the magnetic sensors.

As shown in FIG. 28B, during actual use of the motor, a drive control circuit 300 which is different from that used during calibration is connected to the connector 90 of the motor unit 100b. This drive control circuit 300 corresponds to the drive control circuit 200 for calibration, except that the communication unit 260 and the voltmeter 270 have been omitted, and is identical to the drive control circuit 300 shown in FIG. 7B.

Figure 29:
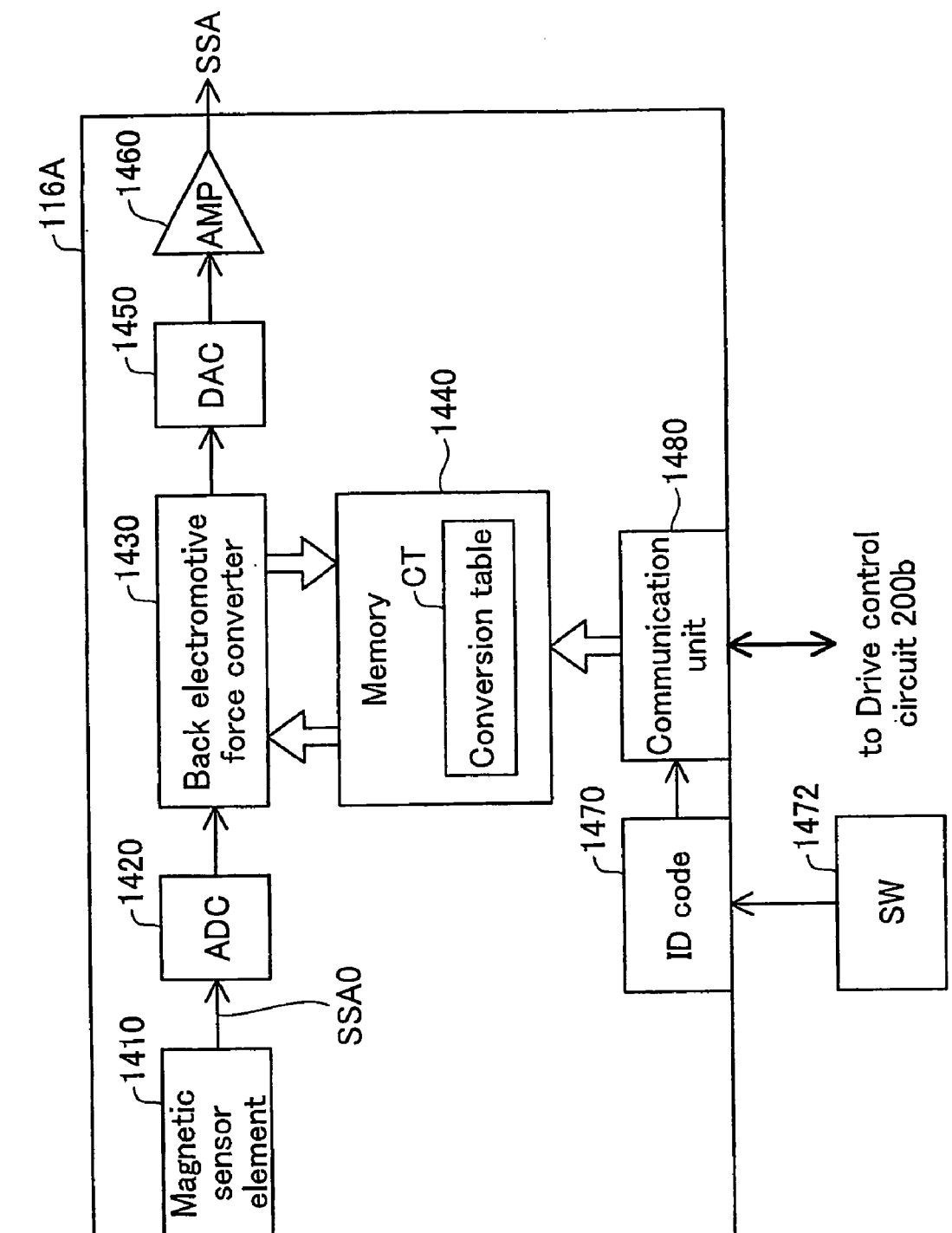
FIG. 29 is a block diagram depicting the internal configuration of a magnetic sensor in Embodiment 2.

FIG. 29 is a block diagram depicting the internal configuration of the magnetic sensor 116A in Embodiment 2. Since the Phase A sensor 116A and the Phase B sensor 126B have identical configuration, only the Phase A sensor 116A will be discussed below.

The magnetic sensor 116A has a magnetic sensor element 1410, an AD converter 1420, a back electromotive force converter 1430, a memory 1440, a DA converter 1450, an amplifier 1460, an ID code register 1470, and a communication unit 1480. The magnetic sensor element 1410 is a Hall element, for example.

During calibration (FIG. 28A), the communication unit 1480 communicates with the drive control circuit 200b and receives sensor output correction data Dcorrect, together with a sensor ID. An ID unique to the sensor may be recorded in the ID code register 1470 inside the sensor, or an ID may be set using an external switch. In the example of FIG. 29, it is possible to set the ID using an external switch 1472 such as a DIP switch. However, it is possible for the ID to be recorded in the motor or set by any of various other means besides a DIP switch. For example, it would be possible to eliminate the external switch 1472 and instead construct the ID code register 1470 from nonvolatile memory. In the event that the ID provided by the drive control circuit 200b matches the ID in the ID code register 1470, the communication unit 1480 will store the correction data Dcorrect in the memory 1440. In the example of FIG. 29, the correction data Dcorrect is data representing the contents of a conversion table CT, the conversion table CT being stored in the memory 1440. The back electromotive force converter 1430, utilizing the conversion table CT, corrects the output SSA0 of the magnetic sensor 1410. Specifically, the correction is carried out so that the sensor output has the back electromotive force waveform. The corrected sensor output is then converted by the DA converter 1450, amplified by the amplifier 1460, and output as the sensor output SSA.

Tables such as the following can be used as the conversion table CT.

(1) A first lookup table having the level of the output SSA0 prior to correction as input, and the level of the output SSA after correction as output.

(2) A second lookup table having the level of the output SSA0 prior to correction as input, and the differential between the output SSA0 prior to correction and the output SSA after correction as the output.

(3) A third lookup table having the level of the output SSA0 prior to correction as the argument, and the ratio of the output SSA0 prior to correction to the output SSA after correction as the output.

Where the first lookup table is used, the converter 1430 can obtain the corrected sensor output directly, through lookup in the first lookup table. On the other hand, where the second lookup table is used, the converter 1430 can obtain the corrected sensor output by adding the differential obtained through lookup in the second lookup table, to the output of the magnetic sensor 1410. Where the third lookup table is used, the converter 1430 can obtain the obtain the corrected sensor output by multiplying the ratio obtained through lookup in the third lookup table, by the output of the magnetic sensor 1410. The corrected output waveform need not strictly be the back electromotive force waveform; it would be possible to employ a sine wave instead, for example.

Figure 30:
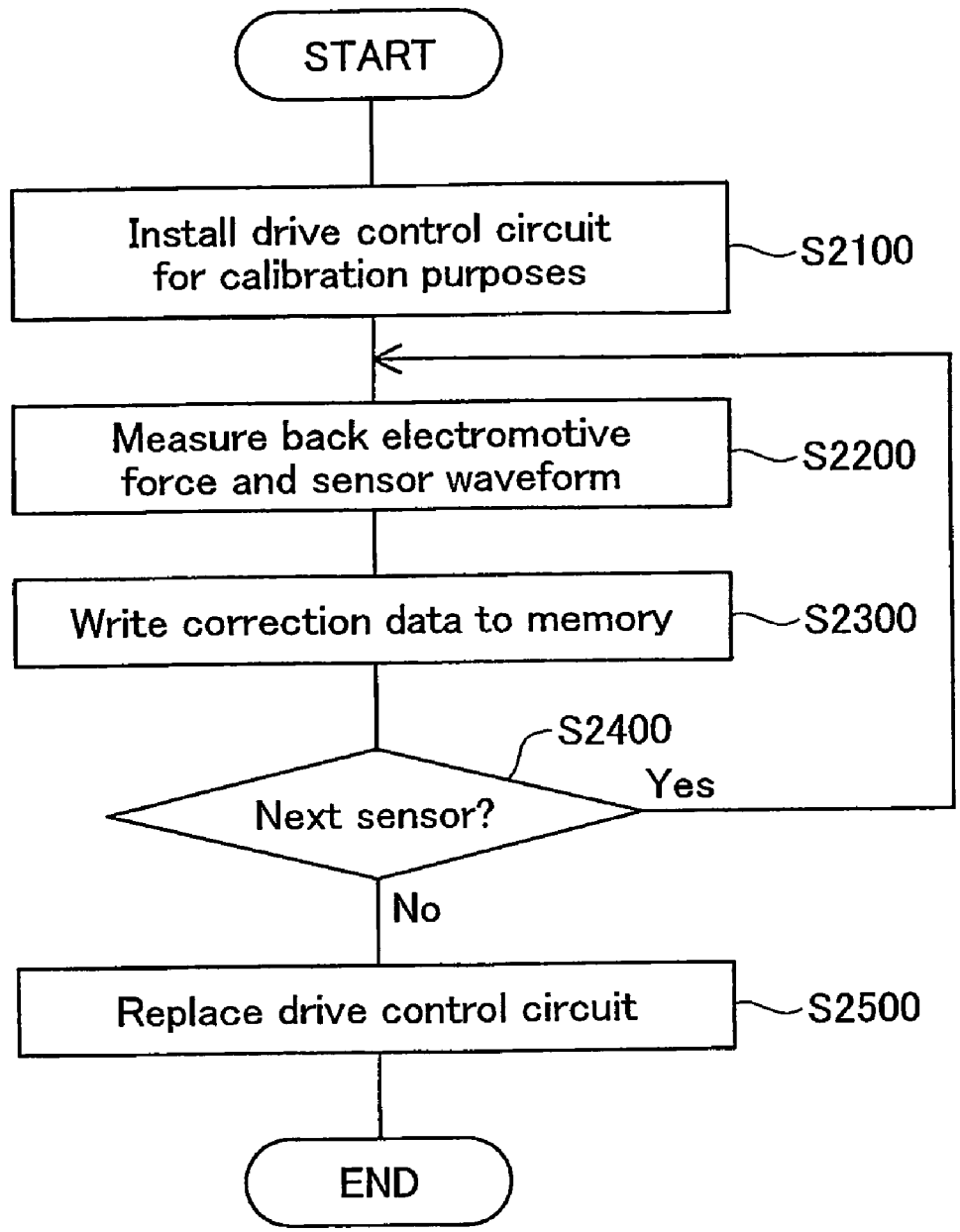
FIG. 30 is a flowchart depicting the calibration procedure of sensor output in Embodiment 2.

FIG. 30 is a flowchart depicting the calibration procedure of sensor output in Embodiment 2. In Step S2100, the drive control circuit 200*b* for calibration purposes is installed in the motor unit 100*b* (FIG. 28A). In Step S2200, measurement of the back electromotive force waveform of the coil array, as well as measurement of the magnetic sensor output waveform, are performed in relation to Phase A or Phase B. In Step S2300, the CPU 220 determines correction data Dcorrect depending on the results of these measurements, and stores the data in the memory 1440 (FIG. 29) in the sensor. In Step S2400, it is determined whether there are any sensors that have not yet been processed, and in the event that there is a sensor that has not yet been processed, the routine returns to Step S2200 and the process of Steps S2200 and S2300 is repeated. Where the process of Step S2200 is carried out for the second and subsequent sensors, since measurement of the back electromotive force waveform has been completed already, only the magnetic sensor output waveform may be measured. In Step S2500, the drive control circuit is replaced with the circuit 300 for actual use (FIG. 28B).

The circuit elements 1430, 1440 of FIG. 29 can be understood to function as output waveform correction units for correcting the output waveform of the sensor 116A. In preferred practice the memory 1440 will be composed of non-volatile memory. The PWM controller 240 (FIG. 28B), using the waveform shape of the corrected sensor output SSA, SSB, generates the drive signal.

Figure 31A:
FIGS. 31A through 31F show correspondence relationships between sensor output waveforms and drive signal waveforms.
Figure 31B:
Figure 31C:
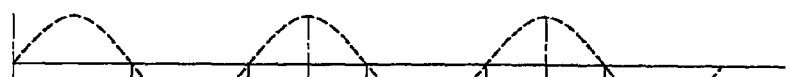
Figure 31D:
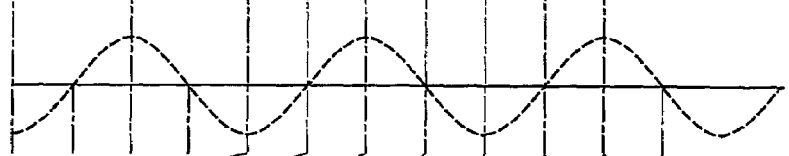
Figure 31E:
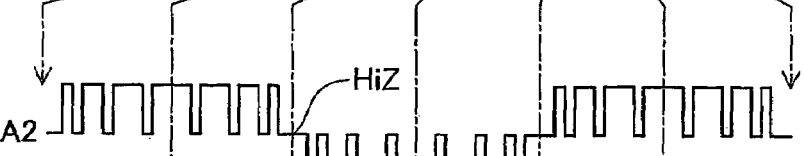
Figure 31F:

FIGS. 31A to 31F depict correspondence relationships between sensor output waveform and waveforms of the drive signals generated by the PWM controller 240 in Embodiment 2. FIGS. 31A and 31B depict the sensor outputs SSA0, SSB0 prior to correction; FIGS. 31C and 31D depict the corrected sensor outputs SSA, SSB. The corrected sensor outputs SSA, SSB have the same waveform shape as the back electromotive force Eca, Ecb (FIG. 27). FIGS. 31E and 31F depict drive signals generated using the corrected sensor outputs SSA, SSB. In the drawing, "Hiz" means a state of high impedance. The Phase A drive signals DRVA1, DRVA2 are generated by PWM control using the analog waveform of the Phase A sensor output SSA. The Phase B drive signals DRVB1, DRVB2 are similar. Consequently, using these drive signals it is possible to present the Phase A coils and the Phase B coils with effective voltage indicating change in level that corresponds to change in the sensor outputs SSA, SSB. As a result, the waveform of the effective voltage of the drive signals is equivalent to the waveform of the back electromotive force, and thus efficiency will be improved, and a motor with negligible noise and vibration will be achieved.

Figure 32:
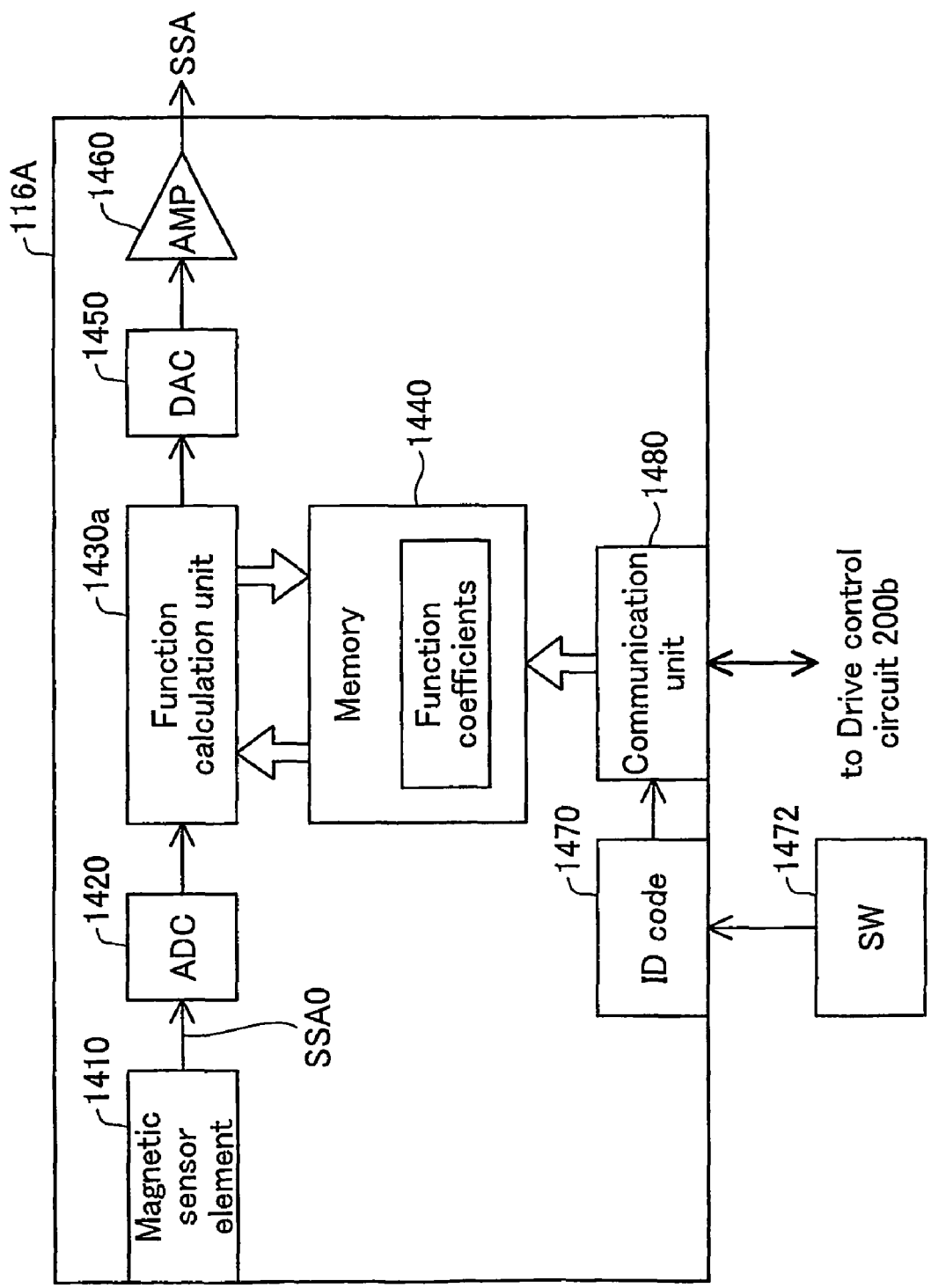
FIG. 32 is a block diagram depicting another configuration of a magnetic sensor.

FIG. 32 is a block diagram depicting another configuration of a magnetic sensor 116A of Embodiment 2. In this magnetic sensor 116A, the back electromotive force converter 1430 shown in FIG. 29 is replaced with a function calculation unit 1430*a*; the configuration is otherwise the same as in FIG. 29. The memory 1440 stores a function coefficient instead of a conversion table.

The function calculation unit 1430*a* corrects the output SSA0 of the magnetic sensor element 1410 to the back electromotive force waveform, by means of correction using a specific mathematical function. It is possible to use a function such as the following, for example, as the function.

(1) A first function in which the level of the output SSA0 prior to correction is the argument (variable), and the level of the corrected output SSA is the value of the function.
(2) A second function in which the level of the output SSA0 prior to correction is the argument (variable), and the differential between the output SSA0 prior to correction and the output SSA after correction is the value of the function.
(3) A third function in which the level of the output SSA0 prior to correction is the argument (variable), and the ratio of the output SSA0 prior to correction to the output SSA after correction is the value of the function.

As the function, it would be possible to use a polynomial expression f(x) of the level (x) of the output SSA0 prior to correction. The function coefficient stored in the memory 1440 is the coefficient of a specific function f(x) such as this. Like the configuration of FIG. 29, the configuration of FIG. 32 makes it possible to easily correct the output of a sensor element to desired waveform shape.

Figure 33:
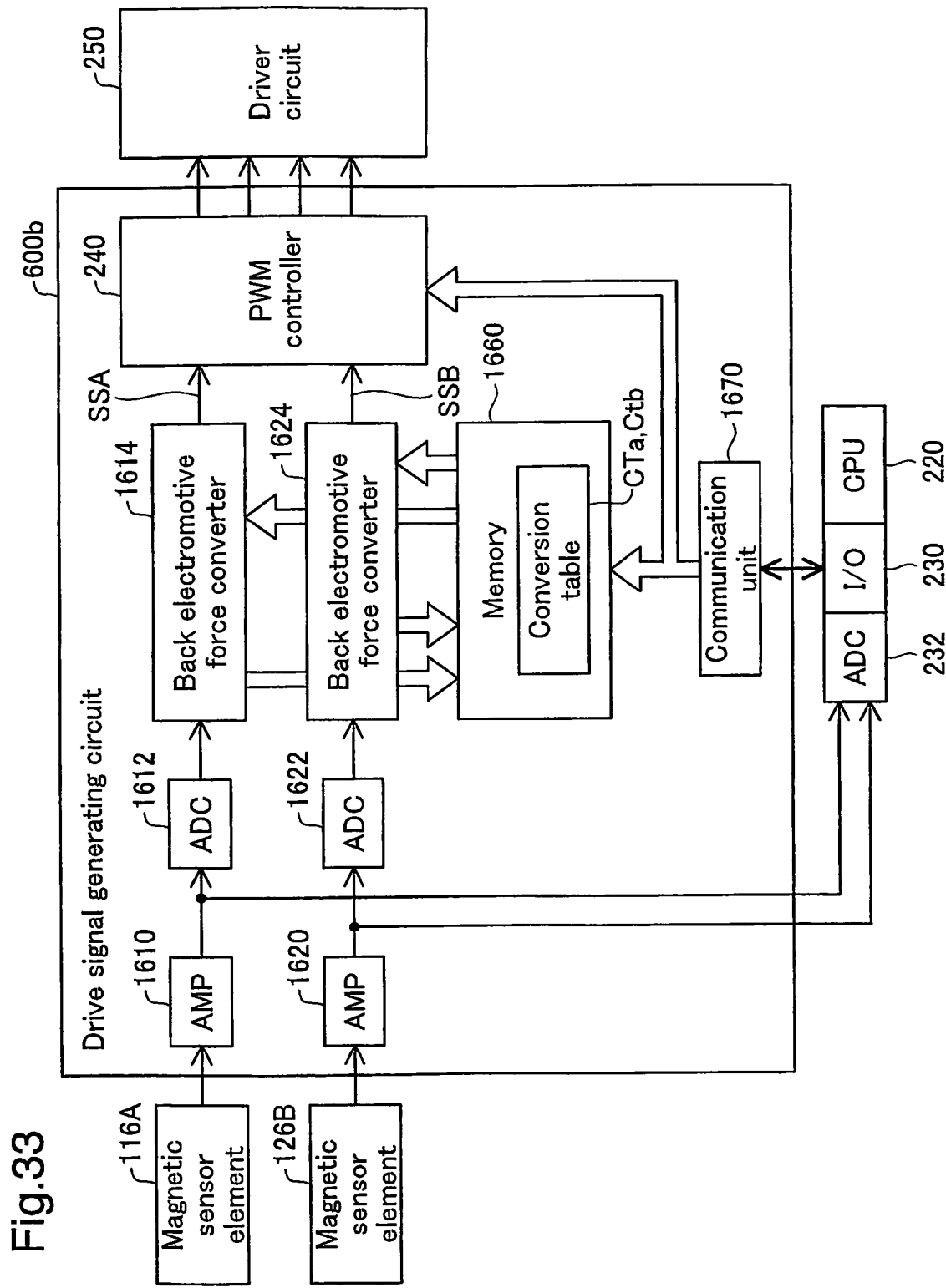
FIG. 33 is a block diagram depicting another example of magnetic sensors and a drive signal generating circuit in a modification example of Embodiment 2.

FIG. 33 is a block diagram depicting another example of magnetic sensors and a drive signal generating circuit in a modification example of Embodiment 2. In this modification example, the magnetic sensors 116A, 126B include magnetic sensor elements only; the other circuit elements 1420-1480 within the magnetic sensors depicted in FIG. 29 are not included in these magnetic sensors. The drive signal generating circuit 600*b* has amplifiers 1610, 1620, AD converters 1612, 1622, back electromotive force converters 1614, 1624, a PWM controller 240, a memory 1660, and a communication unit 1670. The back electromotive force converters 1614, 1624 are the same as the back electromotive force converter 1430 shown in FIG. 29. The memory 1660 stores correction tables CTa, CTb relating to both the Phase A sensor 116A and the Phase B sensor 126B, with these tables being associated with the respective ID codes. The PWM controller 240 is the same as that shown in FIG. 28B. The communication unit 1670 connects to the CPU 220 via the I/O interface 230. During calibration, the outputs of the sensors 116A, 126B are amplified by the amplifiers 1610, 1620, converted to a digital signal by the AD converter 1232, and presented to the CPU 220 via the I/O interface 230.

With the circuit design of FIG. 33, it is possible, for example, for the drive signal generating circuit 600*b* and the driver circuit 250 to be installed in the motor unit, and for a circuit including the CPU 220, the I/O interface 230, and the AD converter 232 to connect with the connector 90 of the motor unit (FIG. 28B). With this circuit design, as with the Embodiment 2 discussed previously, it is possible for sensor waveform to be corrected and the motor to be operated with high efficiency.

Figure 34:
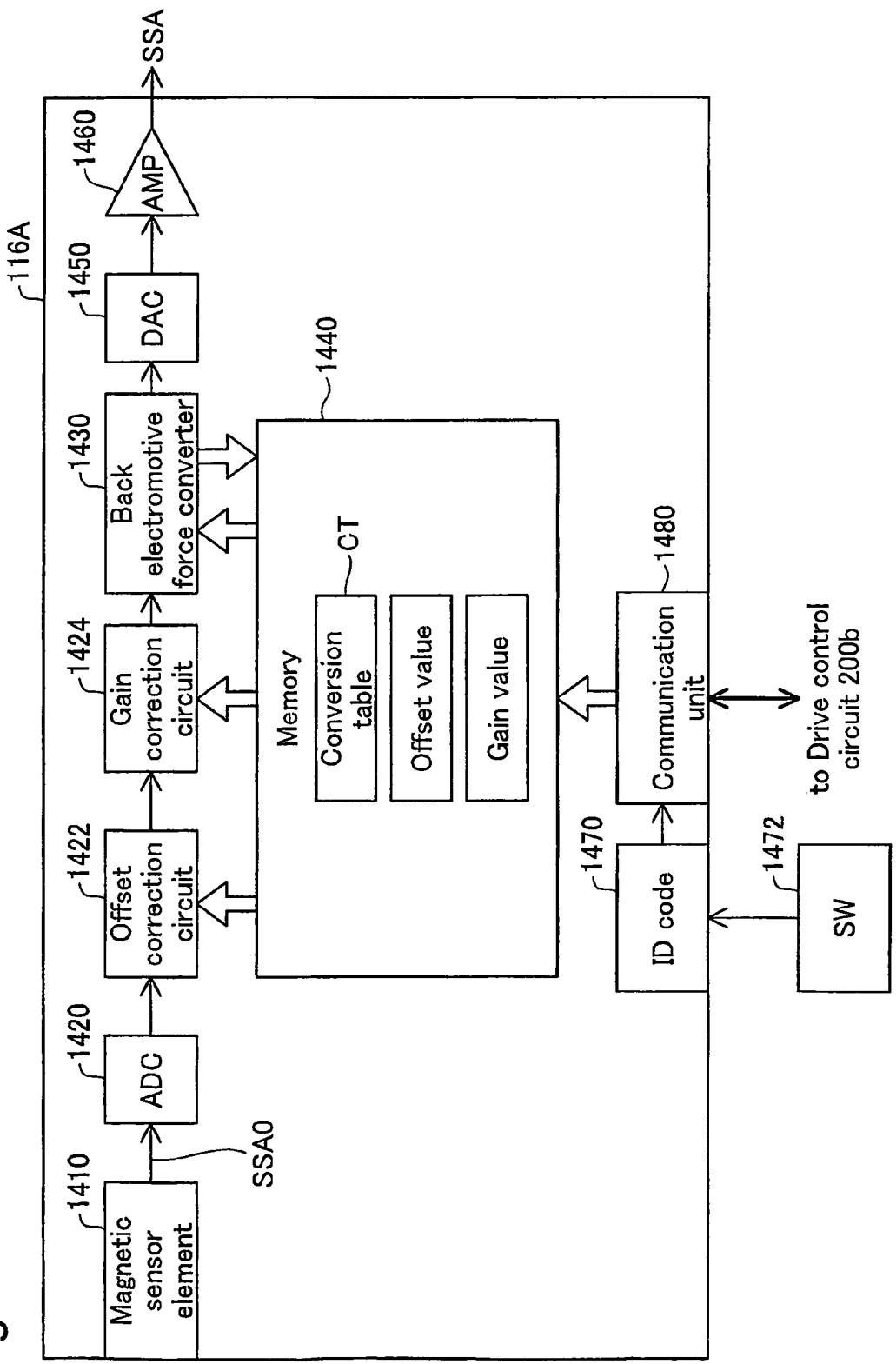
FIG. 34 is a block diagram depicting yet another configuration of a magnetic sensor.

FIG. 34 is a block diagram depicting yet another configuration of the magnetic sensor 116A. This magnetic sensor 116A is similar in configuration to FIG. 29, except that an offset correction circuit 1422 and a gain correction circuit 1424 have been added to the configuration shown in FIG. 29. The offset correction circuit 1422 has the function of correcting offset (deviation) of sensor output, prior to conversion to the back electromotive force waveform. The gain correction circuit 1424 has the function of keeping the maximum value of sensor output within a prescribed permissible range. The memory 1440 stores offset values and gain values, instead of conversion tables CT. The offset correction circuit 1422 and the gain correction circuit 1424 have the same functions as the offset correction circuit 420 and the gain correction circuit 430 in Embodiment 1 shown in FIG. 9. The offset and gain correction method and correction procedure employed are the same as those described in Embodiment 1.

Using offset values and gain values determined by the procedures described in Embodiment 1 (FIGS. 19, 20, 24, 25, 26 etc.), the offset correction circuit 1422 and the gain correction circuit 1424 perform correction of deviation and gain of the output SSA0 of the magnetic sensor element 1410. The back electromotive force converter 1430 of FIG. 34 executes conversion of the offset- and gain-corrected output to the back electromotive force waveform, and it is therefore possible to obtain an output signal SSA having a more accurate back electromotive force waveform. However, it is possible to omit either offset correction or gain correction, or both.

Where offset correction and gain correction are performed on sensor output, it is not necessary to again measure the sensor waveform in Step S2200 of FIG. 30; also, the back electromotive force waveform need be measured only once. Where offset correction and gain correction are performed on the output of each sensor, the output waveforms of the sensors can be considered as having substantially identical waveform. Consequently, it will be possible to use a single conversion table in common for all of the sensors, in order to correct the corrected sensor waveforms to the back electromotive force waveform. In this case, Step S2200 of FIG. 30 may be omitted, and the back electromotive force measured one time, prior to initiating the repeating processes of Steps S2300 and 2400.

3. Embodiment 3

Figure 35:
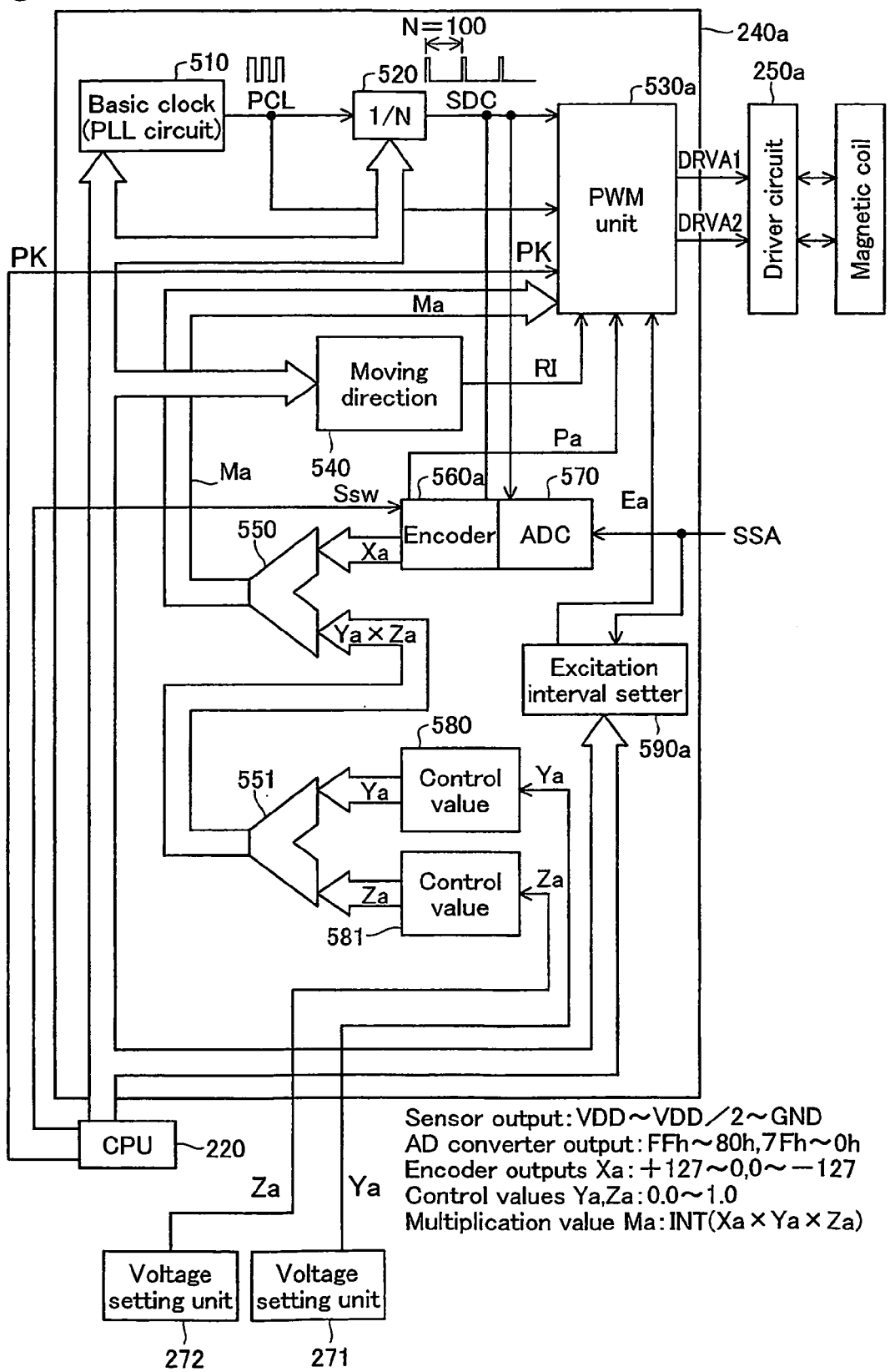
FIG. 35 shows the internal configuration and operation of a PWM controller in the third embodiment.

FIG. 35 shows the internal configuration of a PWM controller in the third embodiment. The PWM controller 240a is constructed as a single-phase circuit by omitting the Phase B elements 552, 562, 572, and 580 included in the circuit 240 shown in FIG. 10, and adding as Phase A elements a multiplier 551, a voltage control value register 381, and two voltage setting units 271, 272. As described later, the internal structures of the PWM unit 530a, the encoder 560a, and the excitation interval setting unit 590a are different from those of the corresponding elements in the circuit of the first embodiment. The CPU 220 supplies a braking control signal PK to the PWM unit 530a, and an operation enable signal Denb to the encoder 560a. The functions of these signals will be described later in detail.

The voltage setting units 271, 272 are circuits for setting voltage control values Ya and Za, respectively. For example, the first voltage setting value Ya may be set at a constant value according to the level of a voltage which is supplied to the power supply terminal of the driver circuit 250a from the external power supply. The second voltage setting value Za may be changed during the operation of the motor to adjust the effective voltage applied to the magnetic coils.

The first voltage setting unit 271 may be constructed to include an operation device for allowing a user to specify the value of the voltage to be applied to the coils. For example, the first voltage setting unit 271 may be constructed using various electronic elements, such as a fixed resistor switch, a DIP switch, a variable resistor, a writable non-volatile memory. Alternatively, the first voltage setting unit 271 may be constructed as a circuit for detecting the value of the supply voltage supplied to the power supply terminal of the driver circuit 250, and automatically determining the voltage control value Ya according the detected voltage value. The voltage setting unit 271 may be also constructed as a communication circuit or an interface circuit having an I²C bus so that the voltage control value Ya may be set from an external device. The second voltage setting unit 272 may be constructed in the similar manner to that of the first voltage control unit 271.

The voltage control values Ya, Za are supplied from the voltage setting units 271, 272 to the voltage control value registers 580, 581, respectively. The multiplier 551 multiplies the two voltage control values Ya, Za to obtain a multiplication value (Ya×Za), and supplies this value to another multiplier 550. The multiplier 550 multiplies the value (Ya×Za) with the sensor output value Xa to obtain a multiplication value (Xa×Ya×Za), and supplies this value to the PWM unit 530a.

The two multipliers 550, 551 achieve adjustment of the effective voltage applied to the magnetic coils with the two control values Ya, Za. For example, the first control value Ya may be used by the vendor of the motor in determining a rated voltage of the motor, while the second control value Za may be used by a system constructor that constructs a system including the motor in order to variably control the effective voltage during the system operation. Three or more multipliers may be used for three or more voltage control values. In other words, the multiplication unit for calculating the multiplication value Ma which is subject to the PWM control may be constructed as a single stage multiplier unit having only one multiplier, or a multi-stage multiplier unit having a plurality of multipliers.

Figure 36:
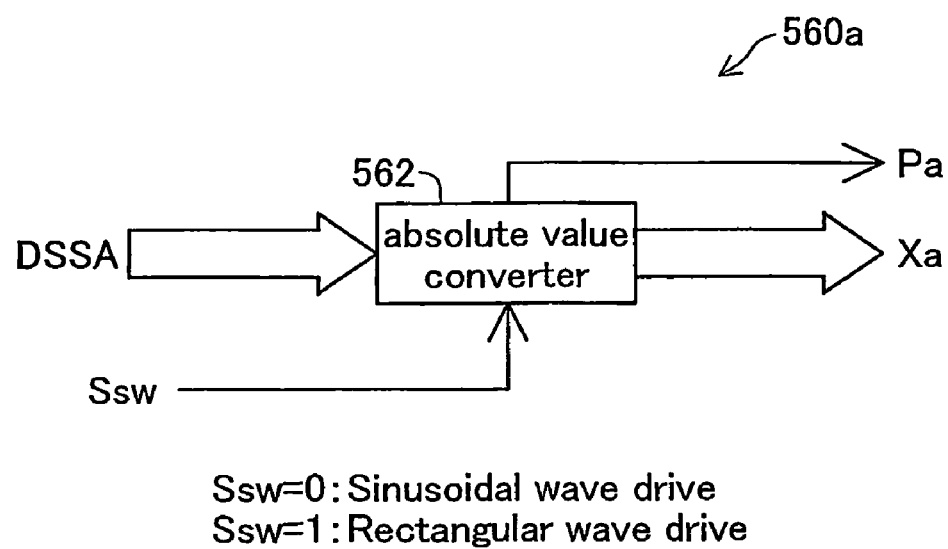
FIG. 36 is a block diagram showing another structure of the encoder.

FIG. 36 is a block diagram showing the structure of the encoder 560a. The encoder 560a includes an absolute value converter 562. The absolute value converter 562 generates the sensor output value Xa and the positive/negative sign signal Pa, responsive to the sensor output DSSA which is converted by the A-D converter 570 (FIG. 35), and the waveform switching signal Ssw. The waveform switching signal Ssw is used to select either a sinusoidal wave drive operation or a rectangular wave drive operation. The absolute value converter 562 generates the sensor output value Xa indicating the level change of the sensor signal DSSA when Ssw is at the zero or low level, while it generates the value Xa having a constant value irrespective of the level change of the sensor signal DSSA when Ssw is at the 1 or high level FIGS. 37A and 37B are timing charts showing the operation of the encoder 560a. As shown in FIG. 37A, the sensor output value Xa and the positive/negative sign signal Pa are generated in the following manner when Ssw is set at the zero level.

(1a) if the digital signal value DSSA is equal to or less than a predetermined value (e.g. 128):

$Xa = DSSA - 128$

Pa=1 (indicating that the sensor output waveform is in the positive range)

(1b) if the digital signal value DSSA is more than the predetermined value (e.g. 128):

$Xa = 127 - DSSA$

Pa=0 (indicating that the sensor output waveform is in the negative range)

In other words, the sensor output value Xa has a value indicating the level change of the sensor output SSA when Ssw is set at the 0 level.

As shown in FIG. 37B, the sensor output value Xa and the positive/negative sign signal Pa are generated in the following manner when Ssw is set at the 1 level.

(2a) if the digital signal value DSSA is equal to or less than a predetermined value (e.g. 128):

$Xa = 127$ (constant)

Pa=1 (indicating that the sensor output waveform is in the positive range)

(2b) if the digital signal value DSSA is more than the predetermined value (e.g. 128):

Xa=127 (constant)

Pa=0 indicating that the sensor output waveform is in the negative range)

In other words, the sensor output value Xa has a constant value irrespective of the level change of the sensor output SSA when Ssw is set at the 1 level.

The encoder 560*a* can select one of the two operation modes shown in FIGS. 37A and 37B to execute the selected operation mode according to a requirement. For example, the rectangular wave operation mode may be used to assure the startup of the motor, while the sinusoidal wave operation mode may be used after the startup to improve the motor efficiency.

Figure 38:
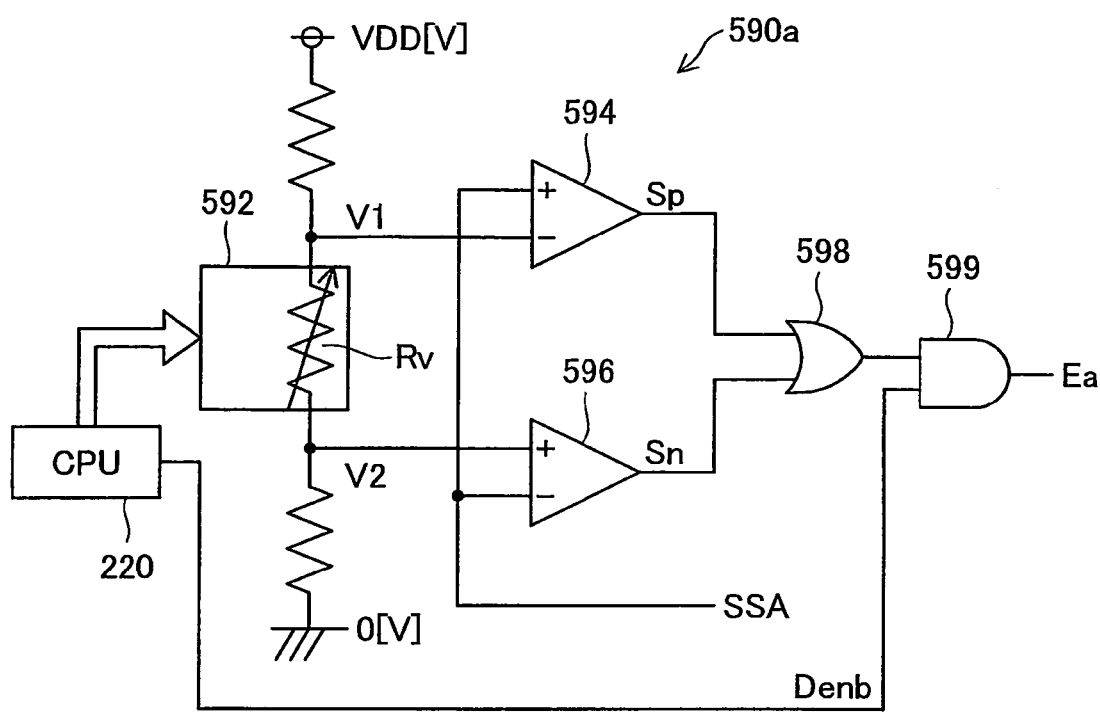
FIG. 38 is a block diagram showing another structure of an excitation interval setting unit.

FIG. 38 is a block diagram showing the structure of the excitation interval setting unit 590*a*. This unit 590*a* is constructed by adding another AND circuit 599 to the circuit shown in FIG. 15A. The AND circuit 599 receives, at its two input terminals, the output of the OR circuit 598 and an operation enable signal Denb supplied from the CPU 220. The output of the AND circuit 599 is used as the excitation interval signal Ea in FIGS. 15A and 15B. The function of the excitation interval signal Ea is the same as that described with reference to FIG. 15B. The operation enable signal Denb is used to put the motor in a non-excitation state as described below.

FIGS. 39A through 39D show operation of the driver circuit responsive to the operation enable signal Denb and the braking control signal PK. As shown in FIG. 39A, the driver circuit 250*a* includes four switching transistors 251-254, and level shifters 311, 313 for adjusting the level of the drive signals supplied to the upper arm transistors 251, 253. The level shifters 311, 313 may be omitted.

The drive signals DRVA1U, DRVA2L, DRVA2U, DRVA1L are set responsive to the operation enable signal Denb and the braking control signal PK to achieve various states as described below.

When Denb=1 and PK=0, the motor is put in the normal operation state shown in FIG. 39A. In this state, electric current flows in the first current direction IA1 when a pair of the drive signals DRVA1U, DRVA1L are set at the On state while the other pair of the drive signals DRVA2U, DRVA2L are set at the Off state. Conversely, the electric current flows in the second current direction IA2 when the first pair of the drive signals DRVA1U, DRVA1L are set at the Off state while the other pair of the drive signals DRVA2U, DRVA2L are set at the On state. The motor is driven according to these drive signals.

When the operation enable signal Denb is set at the zero level, the excitation signal Ea (FIG. 38) is set at the 0 level, making all the drive signals at the low (or off) level, whereby the motor is put at the non excitation state shown in FIG. 38B. In this state, the magnetic coils are electrically separated from the power supply and no current flows in the magnetic coils in response to rotation of the rotor, whereby the rotor may freely rotate. In other words, the zero level of the operation enable signal Denb puts the rotor in the free rotation state.

When, on the other hand, the braking control signal PK is set at the 1 level, the motor is put in the braking state shown in FIGS. 39C and 39D. In the state of FIG. 39C, the drive signals DRVA1U, DRVA2U for the upper arm transistors are at the H (or On) level while the other drive signals DRVA1L, DRVA2L for the lower arm transistors are at the L (or Off) level, and the coils are short circuited accordingly. In the state of FIG. 39D, the drive signals DRVA1U, DRVA2U for the upper arm transistors are at the L (or Off) level while the other drive signals DRVA1L, DRVA2L for the lower arm transistors are at the H (or On) level; this also makes the coils short circuited. In this way, the 1 level of the braking control signal PK will generate the drive signals to make the magnetic coils to be short circuited, whereby the rotor will be prevented from rotation due to the back electromagnetic force caused by the rotation.

Although the circuitry shown in FIGS. 35 through 39D is constructed as single-phase circuitry, control circuits for two or more phases will be constructed in the similar manner. It should be noted that some elements may be omitted, such as the positive/negative value register 540 and the excitation interval setting unit 590*a*. It should be also noted that the present invention is applicable to PWM control circuitry for use in controlling a control target device other than motors. In this case, the PWM control circuitry may execute the PWM control on a temporarily changing signal other than the sensor output SSA.

As can be understood from the various embodiments described above, the PWM control circuit may be constructed as circuitry for generating a PWM signal by executing PWM control on a multiplication value Ma, which is obtained by multiplication of a changing signal value Xa whose level is changing over time, and one or more control values. This PWM control circuit with the adjustable control values will generate a PWM signal which simulates the waveform of the changing signal, or represents an effective level change in proportion to the level change of the changing signal, and which have an effective amplitude in proportion to the levels of the control values.

4. Other Modification Examples

The present invention is not limited to the embodiments described hereinabove, and may be reduced to practice in various other ways without departing from the spirit thereof. Modifications such as the following would be possible, for example.

Modification Example 1

In the preceding embodiments, it is assumed that both gain correction and offset correction are performed by way of correction of the sensor output waveform; however, it is possible to correct only one of these instead. Alternatively, sensor output waveform may be corrected to desired waveform shape using some other type of correction besides these. In the preceding embodiments the sensor output and back electromotive force waveforms are assumed to be sine waves; however, it is also possible for the invention to be implemented in cases where these waveforms differ somewhat from sine waves. It is also possible to omit both the gain correction and offset correction. In this case, the drive control circuit 200 for calibration purposes may be omitted.

Modification Example 2

While analog magnetic sensors are employed in the preceding embodiments, it is possible to use digital magnetic sensors having multi-value analog output, instead of analog magnetic sensors. Like analog magnetic sensors, digital magnetic sensors having multi-value analog output also have an output signal that changes in analog fashion. Herein, an "output signal that changes in analog fashion" refers in the broad sense to include both analog output signals, and multilevel digital output signals having three or more levels, not On/Off binary output.

Modification Example 3

In the preceding embodiments, a drive control circuit for calibration and a drive control circuit for actual use are employed respectively, but it is possible instead to employ the drive control circuit for actual use as-is during calibration as well, and to connect the calibration circuit to the connector 90. Any circuit having the function of registering corrected values of sensor output waveforms in the motor may be used as this calibration circuit.

Modification Example 4

It is possible to employ for the PWM circuit various circuit configurations besides that shown in FIG. 10A. For example, it is possible to use a circuit that performs PWM control by comparing sensor output with a triangular reference wave. In this case, during PWM control, the gain of the sensor outputs will be adjusted according to the desired application voltage; this gain adjustment differs from the gain correction described in FIGS. 17A to 17C. In other words, the gain correction described in FIGS. 17A to 17C entails correction for the purpose of adjusting the sensor output to the desired waveform, irrespective of the desired application voltage level.

It is also possible to generate the drive signal using a DA converter and an analog amplifier instead of the PWM controller 240, by means of amplifying the corrected sensor outputs SSA, SSB.

Modification Example 5

In the preceding embodiments, six-pole, two-phase brushless DC motors are described, but it is possible to implement the invention with electric motors of various kind other than this. For example, the pole number and phase number can be any arbitrarily selected integers. For the motors that have only one sensor, such as single phase motors, the sensor ID may be omitted.

Modification Example 6

PWM control circuit according to the present invention is preferably implemented as an integrated circuit. It is possible to make a drive IC including both the PWM control circuit and the driver circuit described above.

The present invention is applicable to motors used in various devices, such as fan motors, watch motors for driving watch hands, motors for drum type washing machines with unidirectional rotation, motors for jet coasters, and vibration motors. The fan motors according to the present invention will give noticeable effects of the present invention such as low power consumption, low vibration, low noise, low rotation rate deviation, low heat generation, and long lifetime. The fan motors may be applied to various devices such as digital display devices, on-vehicle device, mobile phones with fuel cells. The present invention is also applicable to motors in various electric appliances and electronic devices. For example, motors according to the present invention may be used as the spindle motors in optical storage device, magnetic storage devices, and polygon mirror driving devices.

Industrial Applicability

The present invention is applicable to a motor, or an actuator employing a motor.

The invention claimed is:

1. A PWM control circuit for generating a PWM signal for use in controlling a control target device, comprising:
   a multiplier configured to multiply a signal value of a changing signal whose level is changing over time, and a control value which is set arbitrarily in a predetermined range, to thereby obtain a multiplication value, the changing signal being a sinusoidal wave signal outputted from a sensor installed in the control target device;
   a PWM signal generation circuit for generating a PWM signal having a pulse width corresponding to the multiplication value by executing PWM on the multiplication value; and
   a digital decoder for digitizing the sinusoidal wave signal outputted from the sensor installed in the control target device to thereby generate the changing signal value and to generate a positive/negative sign signal indicating either an upper half or a lower half of the sinusoidal wave signal,
   wherein the digital decoder is selectively operable in either of:
   (i) a first operation mode in which the digital decoder generates the changing signal value to indicate a change of the sinusoidal wave signal that changes in analog fashion; and
   (ii) a second operation mode in which the digital decoder generates the changing signal value to have a constant value irrespective of the change of the sinusoidal wave signal that changes in analog fashion.

2. The PWM control circuit according to claim 1, wherein the predetermined range of the control value is from 0% to 100%.

3. The PWM control circuit according to claim 1, wherein the PWM signal generation circuit generates the PWM signal to have a duty ratio which is equal to a ratio of the multiplication value to a predetermined constant value.

4. The PWM control circuit according to claim 1, wherein the PWM signal generation circuit has a braking mode in which the PWM signal generation circuit sets the PWM signal so as to put the control target device in a braking state where the control target device is prevented from operation.

* * * * *